US012603682B2

(12) United States Patent
Zhang et al.

(10) Patent No.: US 12,603,682 B2
(45) Date of Patent: Apr. 14, 2026

(54) NON-INTEGER MULTIPLE QUANTITIES OF TRANSMIT AND RECEIVE ANTENNA SUBARRAYS

(71) Applicant: QUALCOMM Incorporated, San Diego, CA (US)

(72) Inventors: Danlu Zhang, San Diego, CA (US); Meilong Jiang, Westfield, NJ (US); Juergen Cezanne, Ocean Township, NJ (US); Yu Zhang, San Diego, CA (US); Junyi Li, Greentown, PA (US); Ashwin Sampath, Skillman, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/721,161

(22) PCT Filed: Feb. 25, 2022

(86) PCT No.: PCT/CN2022/077909
§ 371 (c)(1),
(2) Date: Jun. 17, 2024

(87) PCT Pub. No.: WO2023/159467
PCT Pub. Date: Aug. 31, 2023

(65) Prior Publication Data
US 2025/0055513 A1 Feb. 13, 2025

(51) Int. Cl.
*H04L 1/02* (2006.01)
*H01Q 21/20* (2006.01)
*H04B 7/0456* (2017.01)

(52) U.S. Cl.
CPC ........... *H04B 7/0456* (2013.01); *H01Q 21/20* (2013.01)

(58) Field of Classification Search
CPC .. H04B 7/0691; H04B 7/0456; H04B 7/0697; H04B 7/0617; H04Q 21/061;
(Continued)

(56) References Cited

U.S. PATENT DOCUMENTS 11,177,990 B1 11/2021 Gil et al.
11,336,008 B2 5/2022 Hirabe
(Continued)

FOREIGN PATENT DOCUMENTS

CN 112930667 A 6/2021
EP 4170917 A1 4/2023
(Continued)

OTHER PUBLICATIONS

International Search Report and Written Opinion—PCT/CN2022/077907—ISA/EPO—Nov. 28, 2022.
(Continued)

*Primary Examiner* — Khai Tran
(74) *Attorney, Agent, or Firm* — Paul M. McAdams; Holland & Hart LLP

(57) ABSTRACT

Methods, systems, and devices for wireless communication are described. In some systems, a first device may include a first circular antenna array including a first quantity of antenna subarrays. A second device may include a second circular antenna array including a second quantity of antenna arrays. Each antenna subarray may include one or more antenna elements. The first device may transmit one or more reference signals to the second device. The second device may transmit a feedback message to the first device based on the reference signals. The feedback message may include an indication of sets of beamforming weights or information for determining the sets of beamforming weights based on the second quantity of antenna subarrays being different than the first quantity of antenna subarrays.

(Continued)

The first device may transmit one or more signals concurrently to the second device based on the sets of beamforming weights.

30 Claims, 18 Drawing Sheets

(58) Field of Classification Search
CPC ................. H04Q 21/205; H04Q 21/28; G01S 2013/0263; G01S 13/42
USPC ................................ 375/267, 260, 162, 299
See application file for complete search history.

(56) References Cited

U.S. PATENT DOCUMENTS

| | | | |
|---|---|---|---|
| 11,996,917 | B2 | 5/2024 | Zhu et al. |
| 2002/0187813 | A1 | 12/2002 | Guo |
| 2011/0286341 | A1* | 11/2011 | Sanayei ................. H04B 7/024 |
| | | | 375/267 |
| 2017/0117626 | A1 | 4/2017 | Sajuyigbe et al. |
| 2020/0296599 | A1 | 9/2020 | Sasaki et al. |
| 2024/0106516 | A1* | 3/2024 | Zhang ................. H04B 7/0697 |
| 2024/0413877 | A1* | 12/2024 | Qi ....................... H04B 7/06952 |
| 2025/0047336 | A1 | 2/2025 | Zhang et al. |
| 2025/0070844 | A1 | 2/2025 | Cezanne et al. |
| 2025/0132798 | A1* | 4/2025 | Huang ................. H04B 7/0626 |

FOREIGN PATENT DOCUMENTS

| | | | |
|---|---|---|---|
| JP | 2017212673 | A | 11/2017 |
| KR | 20200041286 | A | 4/2020 |
| WO | WO-2016164146 | A2 | 10/2016 |
| WO | WO-2018155795 | A1 | 8/2018 |
| WO | WO-2019078547 | A1 | 4/2019 |
| WO | WO-2021147613 | A1 | 7/2021 |
| WO | WO-2021162592 | A1 | 8/2021 |
| WO | WO-2021244532 | A1 | 12/2021 |
| WO | WO-2022000400 | A1 | 1/2022 |
| WO | WO-2022036577 | A1 | 2/2022 |

OTHER PUBLICATIONS

International Search Report and Written Opinion—PCT/CN2022/077918—ISA/EPO—Nov. 17, 2022.
International Search Report and Written Opinion—PCT/CN2022/077909—ISA/EPO—Nov. 21, 2022.
Opare K.A., et al., "Mode Combination in an Ideal Wireless OAM-MIMO Multiplexing System", IEEE Wireless Communications Letters, vol. 4, No. 4, Piscataway, NJ, USA, Aug. 1, 2015, XP011667139, ISSN: 2162-2337, pp. 449-452.
Jing H., et al., "Optimal UCA Design for OAM Based Wireless Backhaul Transmission", ICC 2020-2020 IEEE International Conference on Communications (ICC), IEEE, Jun. 7, 2020, 6 Pages, XP033797918, figures 1,2.
Supplementary European Search Report EP22927753 Search Authority Munich Nov. 11, 2025.

* cited by examiner

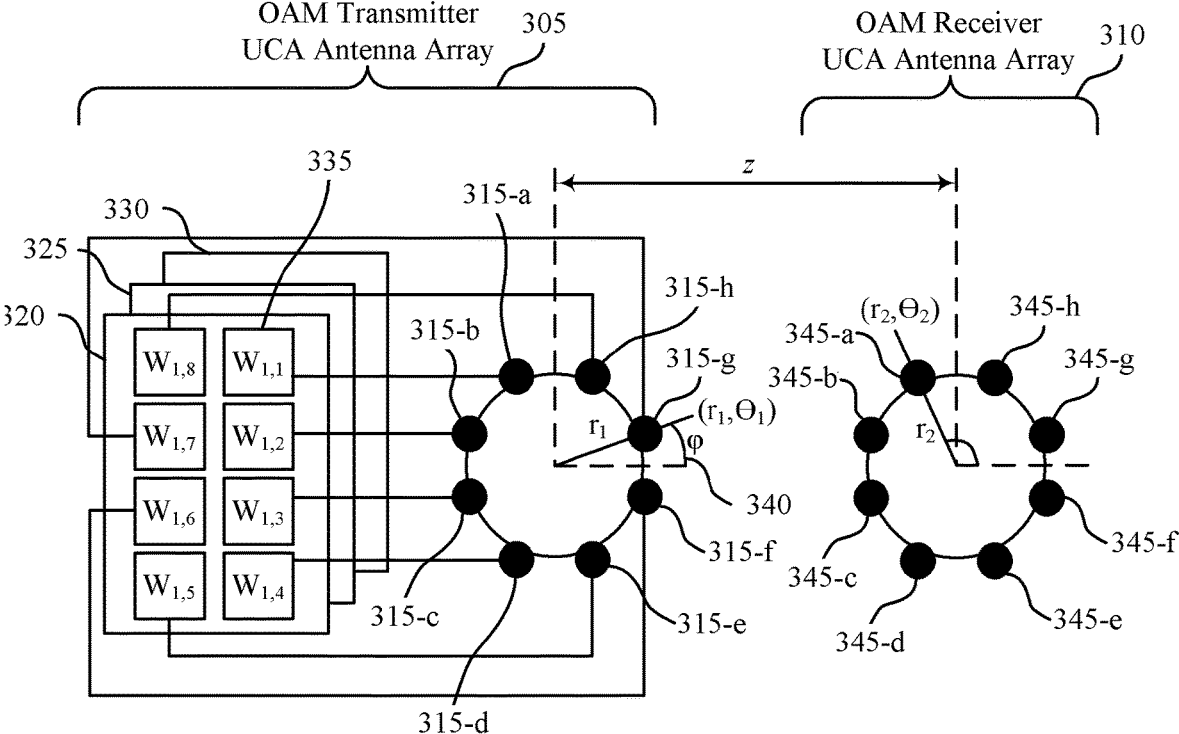
FIG. 3

| Index Of Approximate Beamforming Vector | OAM Vectors In Superposition | | | | |
|---|---|---|---|---|---|
| 0 | 0 ($\sigma_{0,0}$) | M ($\sigma_{0,M}$) | ... | (K-1)M ($\sigma_{0,(K-1)M}$) | KM ($\sigma_{0,KM}$) |
| 1 | 1 ($\sigma_{1,1}$) | M+1 ($\sigma_{1,M+1}$) | ... | (K-1)M+1 ($\sigma_{1,M+1}$) | KM+1 ($\sigma_{0,KM+1}$) |
| ... | ... | ... | ... | ... | ... |
| r-1 | r-1 ($\sigma_{r-1,r-1}$) | M+r-1 ($\sigma_{r-1,M+r-1}$) | ... | (K-1)M+r-1 ($\sigma_{r-1,(K-1)M+r-1}$) | KM+r-1 ($\sigma_{r-1,KM+r-1}$) |
| r | r ($\sigma_{r,r}$) | M+r ($\sigma_{r,M+r}$) | ... | (K-1)M+r ($\sigma_{r,(K-1)M+r}$) | (empty) |
| ... | ... | ... | ... | ... | (empty) |
| M-1 | M-1 ($\sigma_{M-1,M-1}$) | 2M-1 ($\sigma_{M-1,2M-1}$) | ... | (K-1)M+M-1 ($\sigma_{M-1,(K-1)M+M-1}$) | (empty) |

FIG. 5

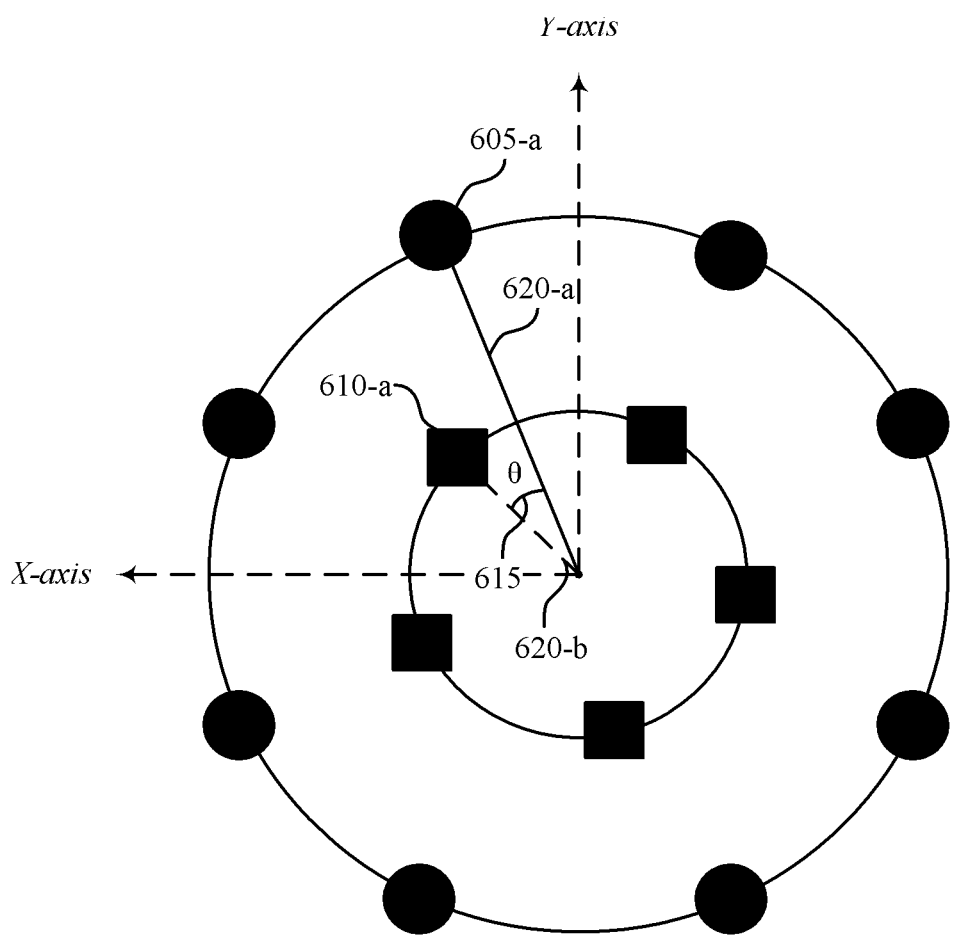
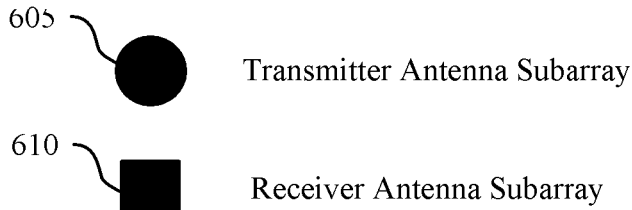
Transmitter Antenna Subarray
Receiver Antenna Subarray
600
FIG. 6

Figure 13:
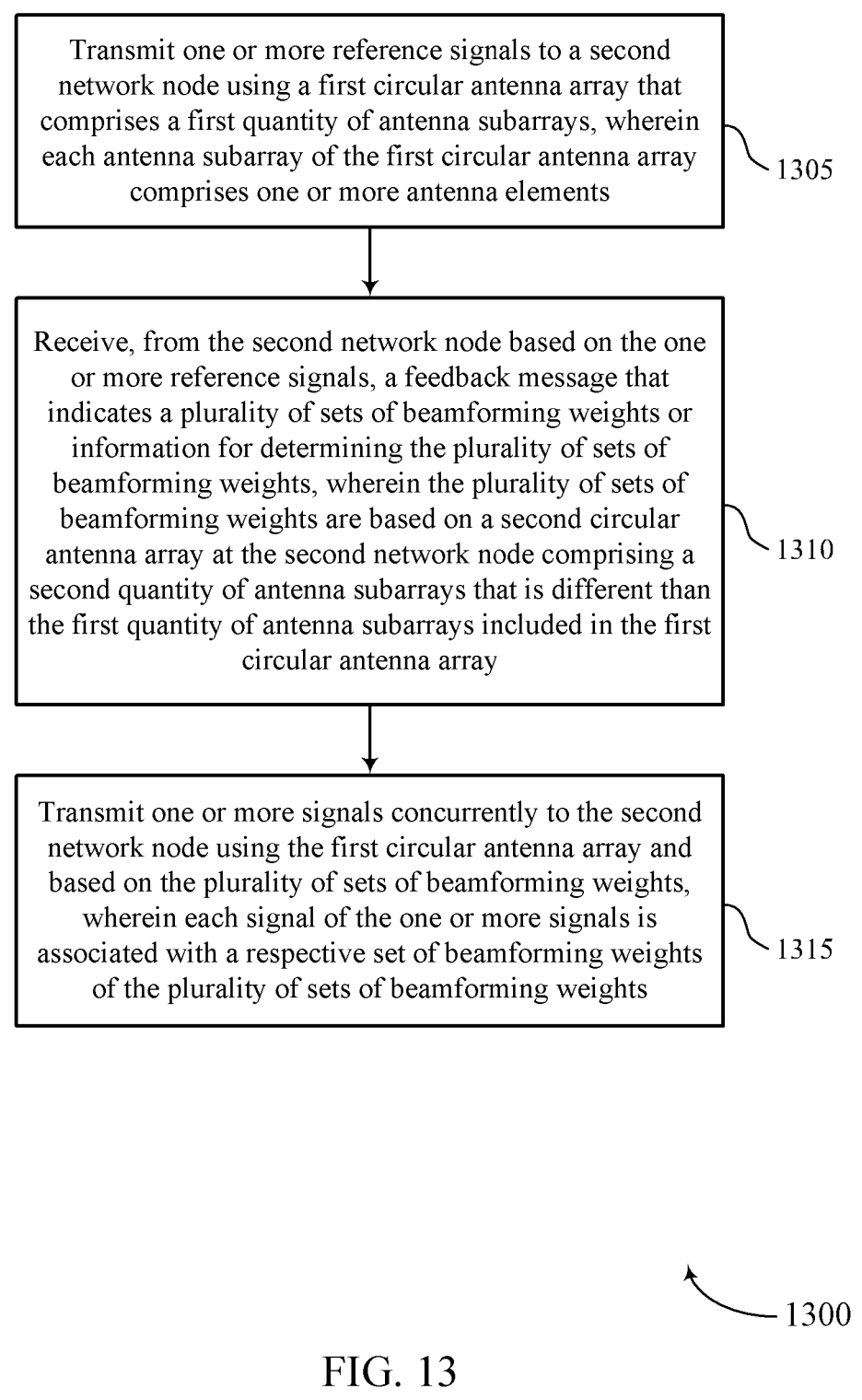

Transmit one or more reference signals to a second
network node using a first circular antenna array that
comprises a first quantity of antenna subarrays, wherein
each antenna subarray of the first circular antenna array
comprises one or more antenna elements

1305

Receive, from the second network node based on the one
or more reference signals, a feedback message that
indicates a plurality of sets of beamforming weights or
information for determining the plurality of sets of
beamforming weights, wherein the plurality of sets of
beamforming weights are based on a second circular
antenna array at the second network node comprising a
second quantity of antenna subarrays that is different than
the first quantity of antenna subarrays included in the first
circular antenna array

1310

Transmit one or more signals concurrently to the second
network node using the first circular antenna array and
based on the plurality of sets of beamforming weights,
wherein each signal of the one or more signals is
associated with a respective set of beamforming weights
of the plurality of sets of beamforming weights

Figure 14:
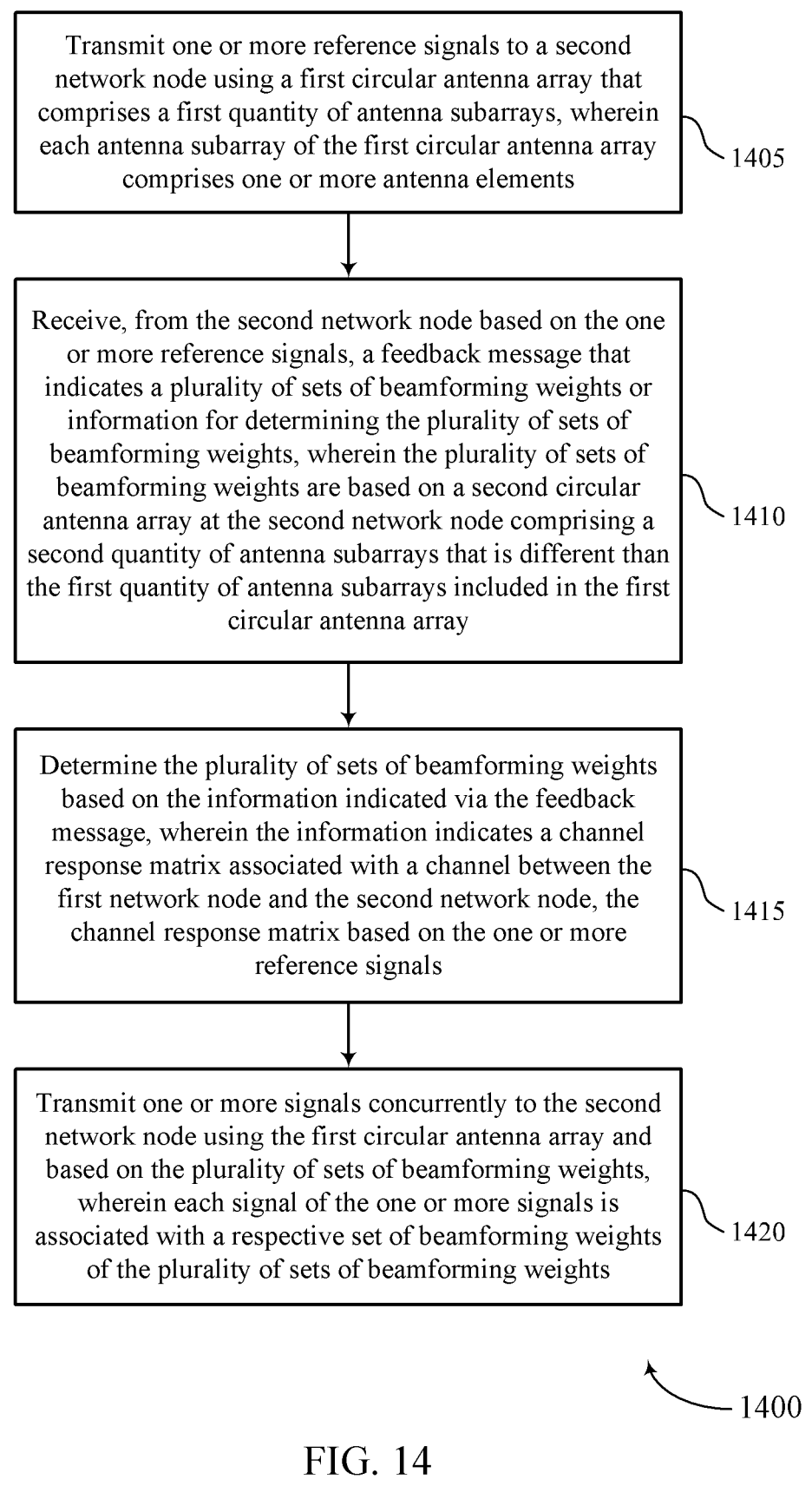

Transmit one or more reference signals to a second network node using a first circular antenna array that comprises a first quantity of antenna subarrays, wherein each antenna subarray of the first circular antenna array comprises one or more antenna elements

1405

Receive, from the second network node based on the one or more reference signals, a feedback message that indicates a plurality of sets of beamforming weights or information for determining the plurality of sets of beamforming weights, wherein the plurality of sets of beamforming weights are based on a second circular antenna array at the second network node comprising a second quantity of antenna subarrays that is different than the first quantity of antenna subarrays included in the first circular antenna array

1410

Determine the plurality of sets of beamforming weights based on the information indicated via the feedback message, wherein the information indicates a channel response matrix associated with a channel between the first network node and the second network node, the channel response matrix based on the one or more reference signals

1415

Transmit one or more signals concurrently to the second network node using the first circular antenna array and based on the plurality of sets of beamforming weights, wherein each signal of the one or more signals is associated with a respective set of beamforming weights of the plurality of sets of beamforming weights

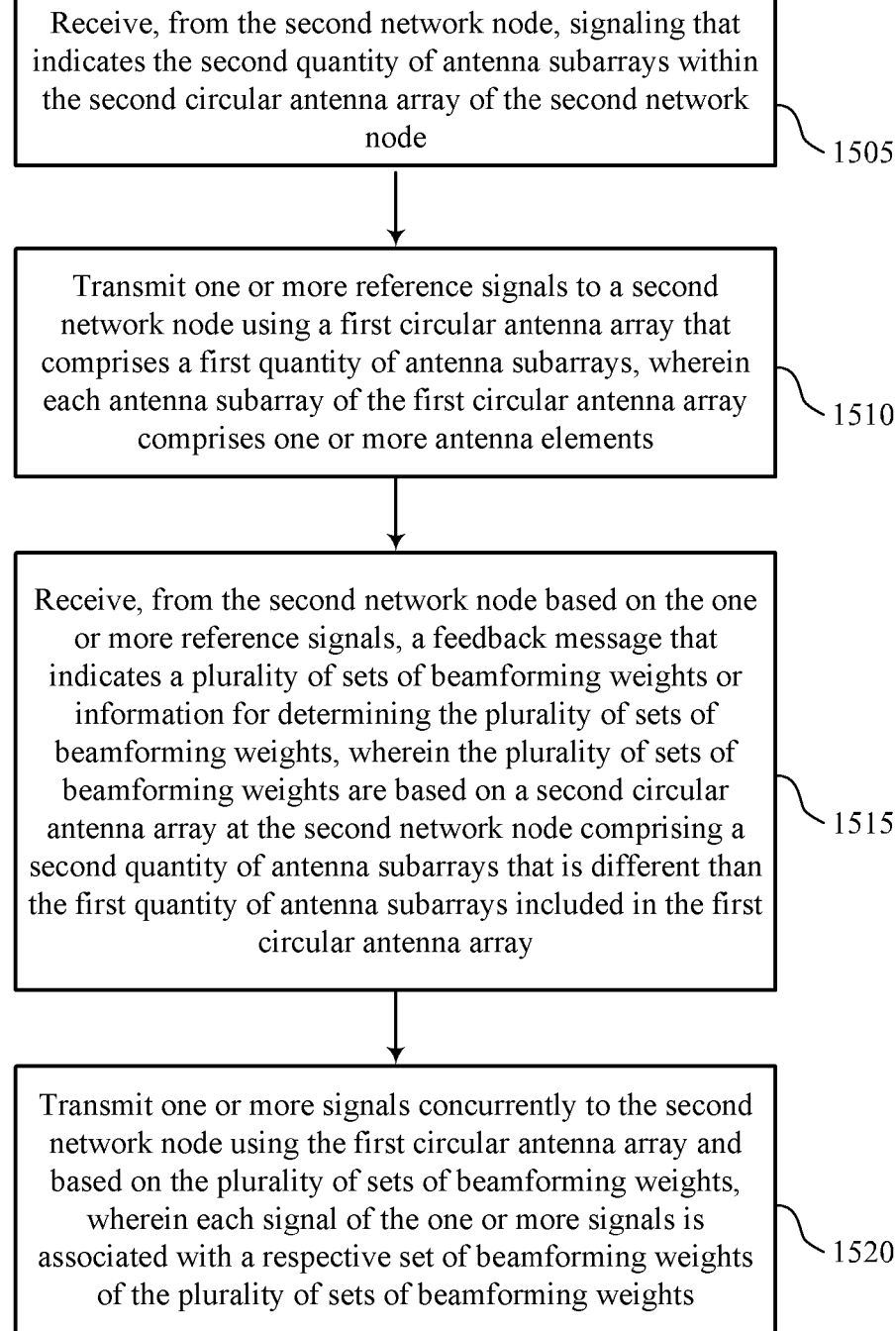

Receive, from the second network node, signaling that indicates the second quantity of antenna subarrays within the second circular antenna array of the second network node

⟍1505

Transmit one or more reference signals to a second network node using a first circular antenna array that comprises a first quantity of antenna subarrays, wherein each antenna subarray of the first circular antenna array comprises one or more antenna elements

⟍1510

Receive, from the second network node based on the one or more reference signals, a feedback message that indicates a plurality of sets of beamforming weights or information for determining the plurality of sets of beamforming weights, wherein the plurality of sets of beamforming weights are based on a second circular antenna array at the second network node comprising a second quantity of antenna subarrays that is different than the first quantity of antenna subarrays included in the first circular antenna array

⟍1515

Transmit one or more signals concurrently to the second network node using the first circular antenna array and based on the plurality of sets of beamforming weights, wherein each signal of the one or more signals is associated with a respective set of beamforming weights of the plurality of sets of beamforming weights

Figure 16:
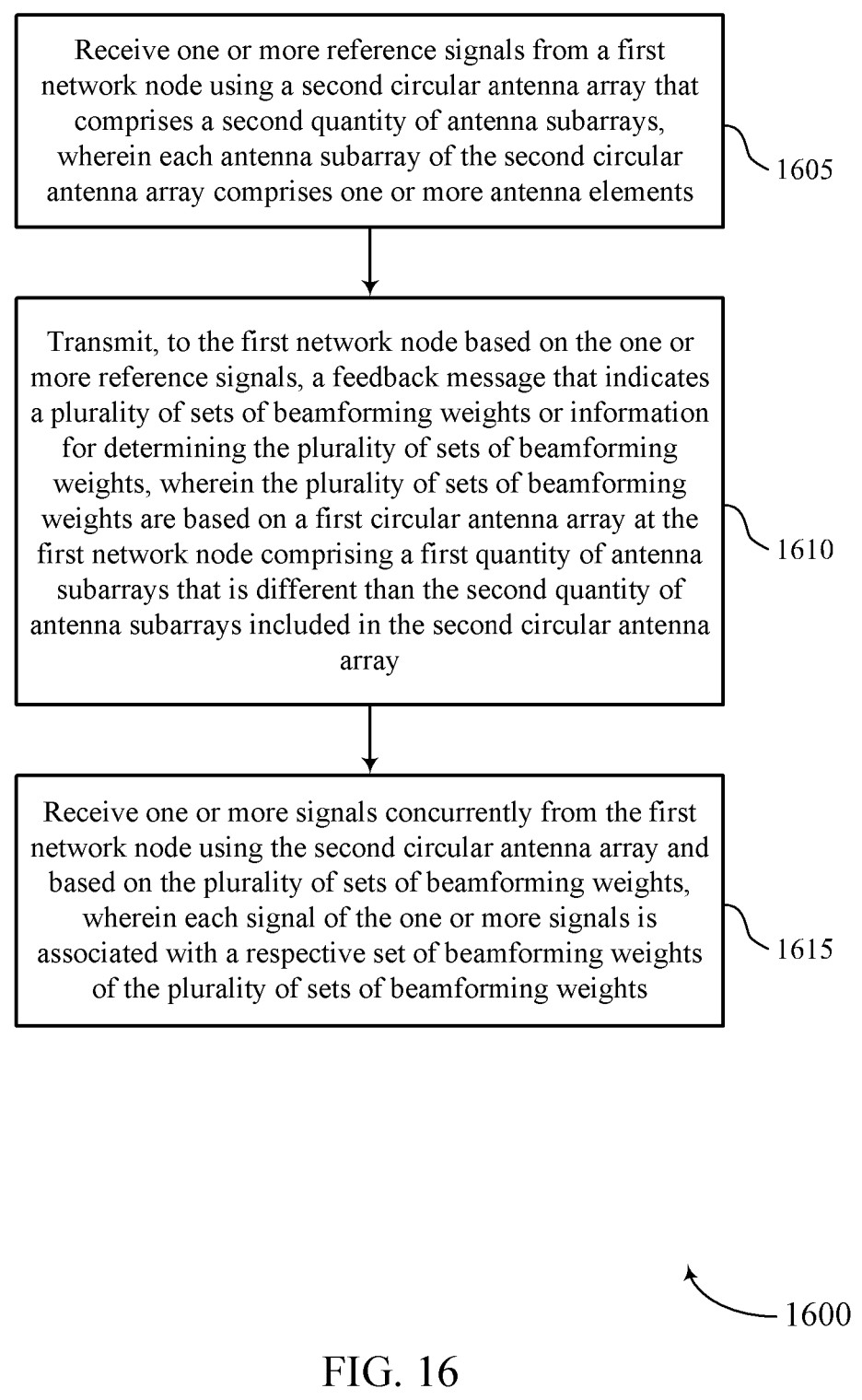

Receive one or more reference signals from a first network node using a second circular antenna array that comprises a second quantity of antenna subarrays, wherein each antenna subarray of the second circular antenna array comprises one or more antenna elements

1605

Transmit, to the first network node based on the one or more reference signals, a feedback message that indicates a plurality of sets of beamforming weights or information for determining the plurality of sets of beamforming weights, wherein the plurality of sets of beamforming weights are based on a first circular antenna array at the first network node comprising a first quantity of antenna subarrays that is different than the second quantity of antenna subarrays included in the second circular antenna array

1610

Receive one or more signals concurrently from the first network node using the second circular antenna array and based on the plurality of sets of beamforming weights, wherein each signal of the one or more signals is associated with a respective set of beamforming weights of the plurality of sets of beamforming weights

Figure 17:
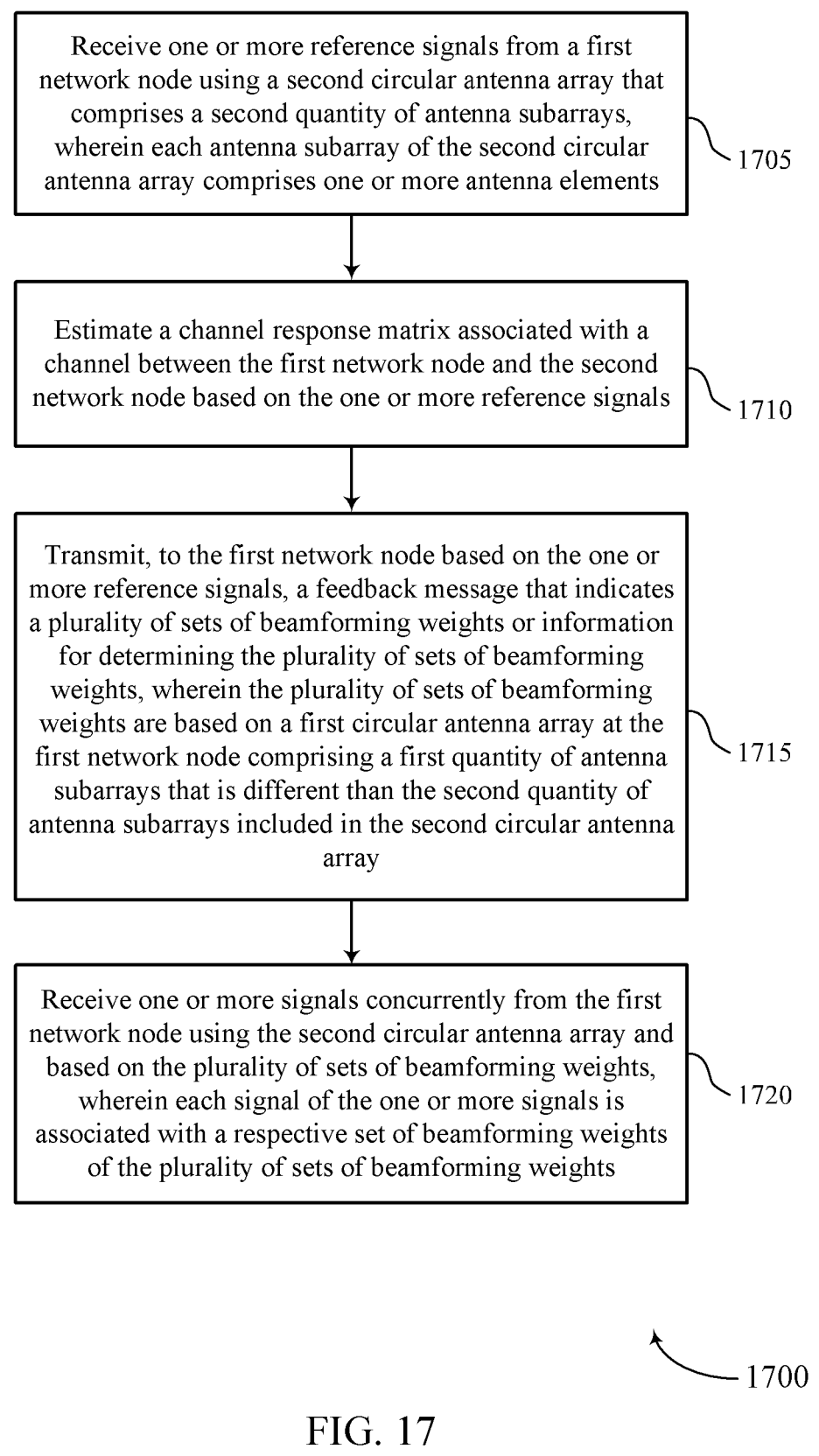

Receive one or more reference signals from a first network node using a second circular antenna array that comprises a second quantity of antenna subarrays, wherein each antenna subarray of the second circular antenna array comprises one or more antenna elements ⟋ 1705

↓

Estimate a channel response matrix associated with a channel between the first network node and the second network node based on the one or more reference signals ⟋ 1710

↓

Transmit, to the first network node based on the one or more reference signals, a feedback message that indicates a plurality of sets of beamforming weights or information for determining the plurality of sets of beamforming weights, wherein the plurality of sets of beamforming weights are based on a first circular antenna array at the first network node comprising a first quantity of antenna subarrays that is different than the second quantity of antenna subarrays included in the second circular antenna array ⟋ 1715

↓

Receive one or more signals concurrently from the first network node using the second circular antenna array and based on the plurality of sets of beamforming weights, wherein each signal of the one or more signals is associated with a respective set of beamforming weights of the plurality of sets of beamforming weights ⟋ 1720

NON-INTEGER MULTIPLE QUANTITIES OF TRANSMIT AND RECEIVE ANTENNA SUBARRAYS

CROSS REFERENCE

The present Application is a 371 national stage filing of International PCT Application No. PCT/CN2022/077909 by ZHANG et al. entitled "NON-INTEGER MULTIPLE QUANTITIES OF TRANSMIT AND RECEIVE ANTENNA SUBARRAYS," filed Feb. 25, 2022, which is assigned to the assignee hereof, and which is expressly incorporated by reference in its entirety herein.

FIELD OF TECHNOLOGY

The following relates to wireless communication, including orbital angular momentum (OAM) multiplexing using non-integer multiple quantities of transmit and receive antenna subarrays.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, nodes, devices, and apparatuses that support non-integer multiple quantities of transmit and receive antenna subarrays. Generally, the described techniques provide for a transmitting network node that includes a first quantity of antenna subarrays to support orbital angular momentum (OAM) communications with a receiving network node that includes a second quantity of antenna subarrays different from the first quantity. The first and second quantities may not be integer multiples. In some aspects, the first and second quantities may be mutually prime. The network nodes may each include the respective quantities of antenna subarrays disposed in a respective circular antenna array. For example, the transmitting network node may include a first circular antenna array including one or more antenna subarrays, which may be referred to as a transmitter circle, and the receiving network node may include a second circular antenna array including one or more antenna subarrays, which may be referred to as a receiver circle. Each antenna subarray may include one or more antenna elements.

The transmitting network node may transmit one or more reference signals to the receiving network node using the first circular antenna array. The receiving network node may perform a channel estimation of a channel between the transmitting network node and the receiving network node based on the one or more reference signals. For example, the receiving network node may estimate a channel response matrix associated with the channel. The receiving network node may transmit a feedback message to the transmitting network node based on the channel estimation. The feedback message may indicate multiple sets of beamforming weights for the transmitting network node to use for communications. For example, the receiving network node may calculate singular vectors of the channel response matrix and feedback the singular vectors to the transmitting network node, where the singular vectors may correspond to the beamforming vectors. Additionally or alternatively, the feedback message may indicate information for determining the beamforming weights. For example, the receiving network node may transmit the channel response matrix via the feedback message, or the receiving network node may transmit weighting factors for the transmitting network node to use to determine the beamforming weights. The beamforming weights may be based on the first quantity of antenna subarrays in the first circular antenna array at the transmitting network node being different than the second quantity of antenna subarrays in the second circular antenna array at the receiving network node. The transmitting network node may generate one or more OAM signals for transmission to the receiving network node and transmit the OAM signals concurrently to the receiving network node using the first circular antenna array based on the one or more sets of beamforming weights. Each set of beamforming weights may be referred to as a beamforming vector and may correspond to a respective OAM mode.

A method for wireless communication at a first network node is described. The method may include transmitting one or more reference signals to a second network node using a first circular antenna array that includes a first quantity of antenna subarrays, where each antenna subarray of the first circular antenna array includes one or more antenna elements, receiving, from the second network node based on the one or more reference signals, a feedback message that indicates multiple sets of beamforming weights or information for determining the multiple sets of beamforming weights, where the multiple sets of beamforming weights are based on a second circular antenna array at the second network node including a second quantity of antenna subarrays that is different than the first quantity of antenna subarrays included in the first circular antenna array, and transmitting one or more signals concurrently to the second network node using the first circular antenna array and based on the multiple sets of beamforming weights, where each signal of the one or more signals is associated with a respective set of beamforming weights of the multiple sets of beamforming weights.

An apparatus for wireless communication at a first network node is described. The apparatus may include a memory, a first circular antenna array comprising a first quantity of antenna subarrays, where each antenna subarray of the first circular antenna array includes one or more antenna elements, and at least one processor coupled to the memory. The at least one processor may be configured to cause the first network node to transmit one or more reference signals to a second network node using a first circular antenna array that includes a first quantity of antenna subarrays, where each antenna subarray of the first circular antenna array includes one or more antenna elements, receive, from the second network node based on the one or more reference signals, a feedback message that indicates multiple sets of beamforming weights or information for determining the multiple sets of beamforming weights, where the multiple sets of beamforming weights are based on a second circular antenna array at the second network node including a second quantity of antenna subarrays that is different than the first quantity of antenna subarrays included in the first circular antenna array, and transmit one or more signals concurrently to the second network node using the first circular antenna array and based on the multiple sets of beamforming weights, where each signal of the one or more signals is associated with a respective set of beamforming weights of the multiple sets of beamforming weights.

Another apparatus for wireless communication at a first network node is described. The apparatus may include means for transmitting one or more reference signals to a second network node using a first circular antenna array that includes a first quantity of antenna subarrays, where each antenna subarray of the first circular antenna array includes one or more antenna elements, means for receiving, from the second network node based on the one or more reference signals, a feedback message that indicates multiple sets of beamforming weights or information for determining the multiple sets of beamforming weights, where the multiple sets of beamforming weights are based on a second circular antenna array at the second network node including a second quantity of antenna subarrays that is different than the first quantity of antenna subarrays included in the first circular antenna array, and means for transmitting one or more signals concurrently to the second network node using the first circular antenna array and based on the multiple sets of beamforming weights, where each signal of the one or more signals is associated with a respective set of beamforming weights of the multiple sets of beamforming weights.

A non-transitory computer-readable medium storing code for wireless communication at a first network node is described. The code may include instructions executable by a processor to transmit one or more reference signals to a second network node using a first circular antenna array that includes a first quantity of antenna subarrays, where each antenna subarray of the first circular antenna array includes one or more antenna elements, receive, from the second network node based on the one or more reference signals, a feedback message that indicates multiple sets of beamforming weights or information for determining the multiple sets of beamforming weights, where the multiple sets of beamforming weights are based on a second circular antenna array at the second network node including a second quantity of antenna subarrays that is different than the first quantity of antenna subarrays included in the first circular antenna array, and transmit one or more signals concurrently to the second network node using the first circular antenna array and based on the multiple sets of beamforming weights, where each signal of the one or more signals is associated with a respective set of beamforming weights of the multiple sets of beamforming weights.

Some aspects of the method, apparatuses, and non-transitory computer-readable medium described herein may further include operations, features, means, or instructions for determining the multiple sets of beamforming weights based on the information indicated via the feedback message and the first quantity of antenna subarrays within the first circular antenna array being different than the second quantity of antenna subarrays within the second circular antenna array, where the information indicates a set of multiple weighting factors for combining sets of OAM weights to form the multiple sets of beamforming weights, and where each set of beamforming weights of the multiple sets of beamforming weights corresponds to a respective set of OAM weights of the sets of OAM weights.

In some aspects of the method, apparatuses, and non-transitory computer-readable medium described herein, determining the multiple sets of beamforming weights may include operations, features, means, or instructions for grouping a second set of multiple sets of OAM weights into a set of multiple groups based on a least common multiple of the first quantity and the second quantity, where the second set of multiple sets of OAM weights includes a first quantity of sets that may be equal to the first quantity of antenna subarrays within the first circular antenna array and combining one or more sets of OAM weights in each group of the set of multiple groups based on the set of multiple weighting factors to obtain the multiple sets of beamforming weights, where the multiple sets of beamforming weights includes a second quantity of sets that may be equal to the second quantity of antenna subarrays within the second circular antenna array.

In some aspects of the method, apparatuses, and non-transitory computer-readable medium described herein, each weighting factor of the set of multiple weighting factors corresponds to a discrete Fourier transform (DFT) value for a channel response associated with a channel between the first network node and the second network node, the channel response based on the one or more reference signals.

In some aspects of the method, apparatuses, and non-transitory computer-readable medium described herein, the set of multiple weighting factors includes weighting factors associated with each combination of a respective first set of OAM weights of a first set of multiple sets of OAM weights associated with the first network node and a respective second set of OAM weights of a second set of multiple OAM weights associated with the second network node.

Some aspects of the method, apparatuses, and non-transitory computer-readable medium described herein may further include operations, features, means, or instructions for determining the multiple sets of beamforming weights based on the information indicated via the feedback message, where the information indicates a channel response matrix associated with a channel between the first network node and the second network node, the channel response matrix based on the one or more reference signals.

In some aspects of the method, apparatuses, and non-transitory computer-readable medium described herein, determining the multiple sets of beamforming weights may include operations, features, means, or instructions for calculating a set of multiple singular vectors of the channel response matrix, where each singular vector of the set of multiple singular vectors corresponds to a respective set of beamforming weights of the multiple sets of beamforming weights.

In some aspects of the method, apparatuses, and non-transitory computer-readable medium described herein, the feedback message indicates the multiple sets of beamforming weights and each set of beamforming weights of the multiple sets of beamforming weights corresponds to a singular vector of a channel response matrix associated with a channel between the first network node and the second network node, the channel response matrix based on the one or more reference signals.

Some aspects of the method, apparatuses, and non-transitory computer-readable medium described herein may further include operations, features, means, or instructions for transmitting, to the second network node, signaling that indicates the first quantity of antenna subarrays within the first circular antenna array of the first network node.

Some aspects of the method, apparatuses, and non-transitory computer-readable medium described herein may further include operations, features, means, or instructions for receiving, from the second network node, signaling that indicates the second quantity of antenna subarrays within the second circular antenna array of the second network node.

Some aspects of the method, apparatuses, and non-transitory computer-readable medium described herein may further include operations, features, means, or instructions for adjusting the first quantity of antenna subarrays within the first circular antenna array based on a condition of a channel between the first network node and the second network node, a type of the first network node, a capability of the first network node, power consumption of the first network node, or any combination thereof.

In some aspects of the method, apparatuses, and non-transitory computer-readable medium described herein, each antenna subarray of the first quantity of antenna subarrays within the first circular antenna array of the first network node may be located at a respective first angular offset relative to a first axis that bisects the first circular antenna array, each antenna subarray of the second quantity of antenna subarrays within the second circular antenna array of the second network node may be located at a respective second angular offset relative to a second axis that bisects the second circular antenna array and may be parallel to the first axis, each respective second angular offset different than each respective first angular offset, and a difference between the respective first angular offset for a first antenna subarray of the first quantity of antenna subarrays and the respective second angular offset for a second antenna subarray of the second quantity of antenna subarrays may be based on the first quantity of antenna subarrays.

In some aspects of the method, apparatuses, and non-transitory computer-readable medium described herein, the first quantity of antenna subarrays included in the first circular antenna array may be not an integer multiple of the second quantity of antenna subarrays included in the second circular antenna array and the second quantity of antenna subarrays included in the second circular antenna array may be not an integer multiple of the first quantity of antenna subarrays included in the first circular antenna array.

In some aspects of the method, apparatuses, and non-transitory computer-readable medium described herein, the first quantity of antenna subarrays included in the first circular antenna array and the second quantity of antenna subarrays included in the second circular antenna array may be mutually prime.

In some aspects of the method, apparatuses, and non-transitory computer-readable medium described herein, transmitting the one or more signals may include operations, features, means, or instructions for applying, for each signal of the one or more signals, the respective set of beamforming weights for the signal to the first quantity of antenna subarrays within the first circular antenna array, where a quantity of beamforming weights in each set of the multiple sets of beamforming weights may be equal to the first quantity of antenna subarrays in the first circular antenna array and transmitting the one or more signals using the first circular antenna array based on applying the respective set of beamforming weights for each signal, where the respective set of beamforming weights corresponds to a respective set of OAM weights of multiple sets of OAM weights.

A method for wireless communication at a second network node is described. The method may include receiving one or more reference signals from a first network node using a second circular antenna array that includes a second quantity of antenna subarrays, where each antenna subarray of the second circular antenna array includes one or more antenna elements, transmitting, to the first network node based on the one or more reference signals, a feedback message that indicates multiple sets of beamforming weights or information for determining the multiple sets of beamforming weights, where the multiple sets of beamforming weights are based on a first circular antenna array at the first network node including a first quantity of antenna subarrays that is different than the second quantity of antenna subarrays included in the second circular antenna array, and receiving one or more signals concurrently from the first network node using the second circular antenna array and based on the multiple sets of beamforming weights, where each signal of the one or more signals is associated with a respective set of beamforming weights of the multiple sets of beamforming weights.

An apparatus for wireless communication at a second network node is described. The apparatus may include a memory, a second circular antenna array including a second quantity of antenna subarrays, where each antenna subarray of the second circular antenna array includes one or more antenna elements, and at least one processor coupled to the memory. The at least one processor may be configured to cause the second network node to receive one or more reference signals from a first network node using a second circular antenna array that includes a second quantity of antenna subarrays, where each antenna subarray of the second circular antenna array includes one or more antenna elements, transmit, to the first network node based on the one or more reference signals, a feedback message that indicates multiple sets of beamforming weights or information for determining the multiple sets of beamforming weights, where the multiple sets of beamforming weights are based on a first circular antenna array at the first network node including a first quantity of antenna subarrays that is different than the second quantity of antenna subarrays included in the second circular antenna array, and receive one or more signals concurrently from the first network node using the second circular antenna array and based on the multiple sets of beamforming weights, where each signal of the one or more signals is associated with a respective set of beamforming weights of the multiple sets of beamforming weights.

Another apparatus for wireless communication at a second network node is described. The apparatus may include means for receiving one or more reference signals from a first network node using a second circular antenna array that includes a second quantity of antenna subarrays, where each antenna subarray of the second circular antenna array includes one or more antenna elements, means for transmitting, to the first network node based on the one or more reference signals, a feedback message that indicates multiple sets of beamforming weights or information for determining the multiple sets of beamforming weights, where the multiple sets of beamforming weights are based on a first circular antenna array at the first network node including a first quantity of antenna subarrays that is different than the second quantity of antenna subarrays included in the second circular antenna array, and means for receiving one or more signals concurrently from the first network node using the second circular antenna array and based on the multiple sets of beamforming weights, where each signal of the one or more signals is associated with a respective set of beamforming weights of the multiple sets of beamforming weights.

A non-transitory computer-readable medium storing code for wireless communication at a second network node is described. The code may include instructions executable by a processor to receive one or more reference signals from a first network node using a second circular antenna array that includes a second quantity of antenna subarrays, where each antenna subarray of the second circular antenna array includes one or more antenna elements, transmit, to the first network node based on the one or more reference signals, a feedback message that indicates multiple sets of beamforming weights or information for determining the multiple sets of beamforming weights, where the multiple sets of beamforming weights are based on a first circular antenna array at the first network node including a first quantity of antenna subarrays that is different than the second quantity of antenna subarrays included in the second circular antenna array, and receive one or more signals concurrently from the first network node using the second circular antenna array and based on the multiple sets of beamforming weights, where each signal of the one or more signals is associated with a respective set of beamforming weights of the multiple sets of beamforming weights.

Some aspects of the method, apparatuses, and non-transitory computer-readable medium described herein may further include operations, features, means, or instructions for transmitting the feedback message including the information for determining the multiple sets of beamforming weights, where the information indicates a set of multiple weighting factors for combining sets of OAM weights to form the multiple sets of beamforming weights based on the first quantity of antenna subarrays within the first circular antenna array being different than the second quantity of antenna subarrays within the second circular antenna array, and where each set of beamforming weights of the multiple sets of beamforming weights corresponds to a respective set of OAM weights of the sets of OAM weights.

Some aspects of the method, apparatuses, and non-transitory computer-readable medium described herein may further include operations, features, means, or instructions for estimating a channel response associated with a channel between the first network node and the second network node based on the one or more reference signals and calculating a set of multiple DFT values for the channel response, where each weighting factor of the set of multiple weighting factors corresponds to a respective DFT value of the set of multiple DFT values.

In some aspects of the method, apparatuses, and non-transitory computer-readable medium described herein, the set of multiple weighting factors includes weighting factors associated with each combination of a respective first set of OAM weights of a first set of multiple sets of OAM weights associated with the first network node and a respective second set of OAM weights of a second set of multiple OAM weights associated with the second network node.

Some aspects of the method, apparatuses, and non-transitory computer-readable medium described herein may further include operations, features, means, or instructions for estimating a channel response matrix associated with a channel between the first network node and the second network node based on the one or more reference signals and transmitting the feedback message including the information for determining the multiple sets of beamforming weights, where the information includes an indication of the channel response matrix.

In some aspects of the method, apparatuses, and non-transitory computer-readable medium described herein, each set of beamforming weights of the multiple sets of beamforming weights corresponds to a respective singular vector of a set of multiple singular vectors of the channel response matrix.

Some aspects of the method, apparatuses, and non-transitory computer-readable medium described herein may further include operations, features, means, or instructions for estimating a channel response matrix associated with a channel between the first network node and the second network node based on the one or more reference signals, calculating a set of multiple singular vectors of the channel response matrix, where each singular vector of the set of multiple singular vectors corresponds to a respective set of beamforming weights of the multiple sets of beamforming weights, and transmitting the feedback message that indicates the multiple sets of beamforming weights based on calculating the set of multiple singular vectors.

Some aspects of the method, apparatuses, and non-transitory computer-readable medium described herein may further include operations, features, means, or instructions for receiving, from the first network node, signaling that indicates the first quantity of antenna subarrays within the first circular antenna array of the first network node.

Some aspects of the method, apparatuses, and non-transitory computer-readable medium described herein may further include operations, features, means, or instructions for transmitting, to the first network node, signaling that indicates the second quantity of antenna subarrays within the second circular antenna array of the second network node.

Some aspects of the method, apparatuses, and non-transitory computer-readable medium described herein may further include operations, features, means, or instructions for adjusting the second quantity of antenna subarrays within the second circular antenna array based on a condition of a channel between the first network node and the second network node, a type of the second network node, a capability of the second network node, power consumption of the second network node, or any combination thereof.

In some aspects of the method, apparatuses, and non-transitory computer-readable medium described herein, each antenna subarray of the first quantity of antenna subarrays within the first circular antenna array of the first network node may be located at a respective first angular offset relative to a first axis that bisects the first circular antenna array, each antenna subarray of the second quantity of antenna subarrays within the second circular antenna array of the second network node may be located at a respective second angular offset relative to a second axis that bisects the second circular antenna array and may be parallel to the first axis, each respective second angular offset different than each respective first angular offset, and a difference between the respective first angular offset for a first antenna subarray of the first quantity of antenna subarrays and the respective second angular offset for a second antenna subarray of the second quantity of antenna subarrays may be based on the first quantity of antenna subarrays.

BRIEF DESCRIPTION OF THE DRAWINGS

FIG. 3 illustrates an example of an OAM antenna array configuration that supports non-integer multiple quantities of transmit and receive antenna subarrays in accordance with aspects of the present disclosure.

FIG. 5 illustrates an example of an OAM weighting vector superposition table that supports non-integer multiple quantities of transmit and receive antenna subarrays in accordance with aspects of the present disclosure.

FIG. 6 illustrates an example of an OAM antenna array configuration that supports non-integer multiple quantities of transmit and receive antenna subarrays in accordance with aspects of the present disclosure.

FIGS. 13 through 18 show flowcharts illustrating methods that support non-integer multiple quantities of transmit and receive antenna subarrays in accordance with aspects of the present disclosure.

DETAILED DESCRIPTION

Figure 1:
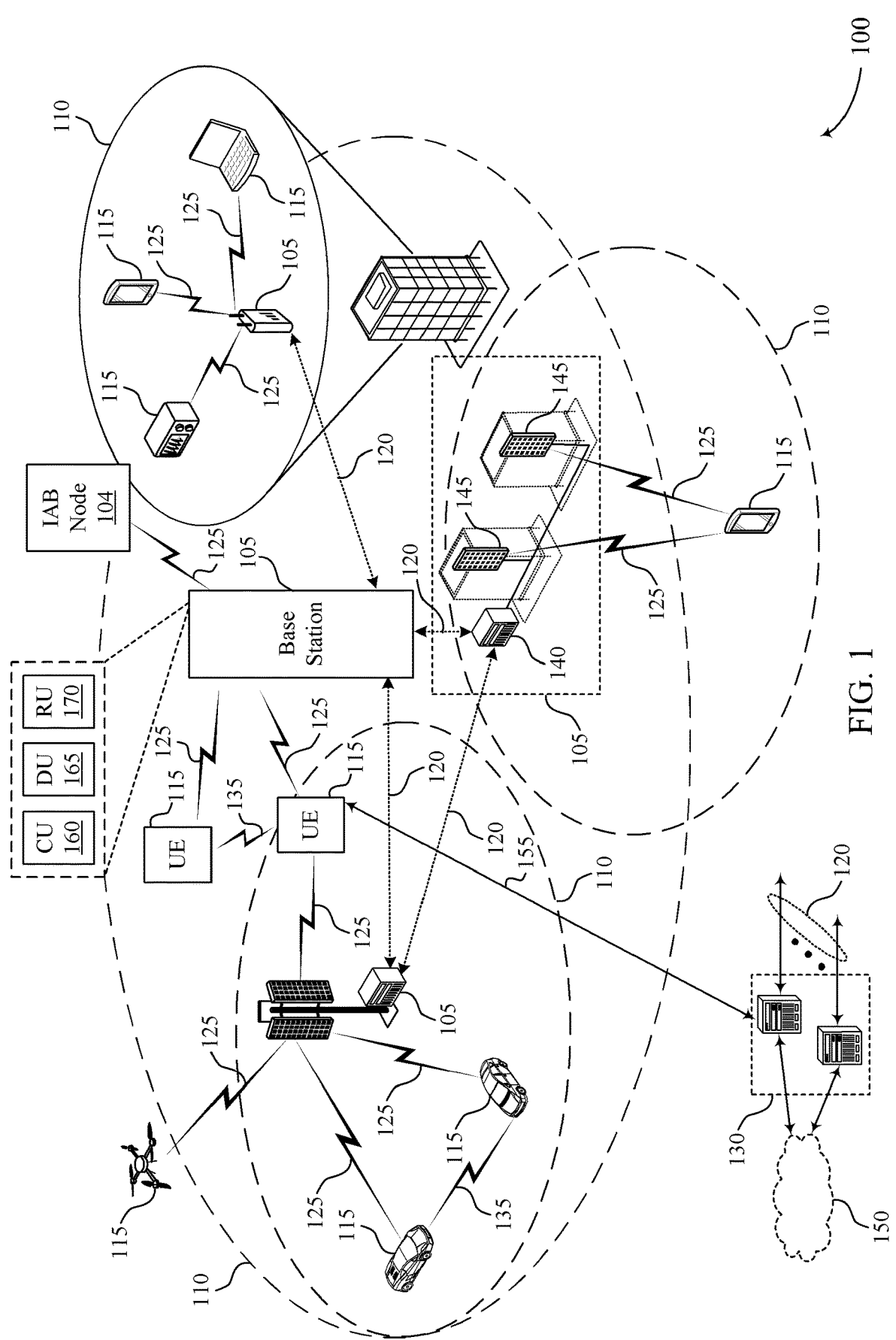
FIG. 1 illustrates an example of a wireless communications system that supports non-integer multiple quantities of transmit and receive antenna subarrays in accordance with aspects of the present disclosure.

In some wireless communications systems, wireless devices, such as base stations, user equipments (UEs), network nodes, or any combination thereof, may communicate directionally, for example, using beams to orient communication signals over one or more directions. Various wireless communication schemes, such as line-of-site multiple-input multiple-output (LoS-MIMO), are being considered for advanced wireless communication systems (e.g., 6G wireless communication systems) to, for example, support high throughput over short distances. In such environments, two network nodes or other devices may communicate using one or more antenna arrays. For example, the devices may support orbital angular momentum (OAM) multiplexing, in which a transmitting device and a receiving device may each be equipped with antenna arrays disposed in a circle, which may be referred to as a transmitter circle and a receiver circle, respectively. As used herein, a transmitter circle or receiver circle may refer to a circular arrangement of antenna subarrays configured to support OAM multiplexing, and the antenna subarrays of a transmitter circle or receiver circle may but need not be disposed in a perfect circle. Either a transmitter circle or a receiver circle may alternatively be referred to as a circular antenna array, and a transmitter circle may alternatively be referred to as a circular transmitter array while a receiver circle may alternatively be referred to as a circular receiver array.

The transmitter and receiver circles may be supportive of communication between the devices according to one or more OAM modes. In some cases, a set of orthogonal OAM modes may be configured based on a quantity of antenna subarrays in both the transmitter and receiver circles. Each OAM mode may correspond to a respective vector of OAM weights (e.g., an OAM weighting vector) to be applied to the antenna subarrays of the transmitter and receiver circles to generate and decode signals, respectively. In some cases, the quantity of antenna subarrays may differ between the transmitter circle at a transmitting device and the receiver circle at a receive device, in which case the different devices may support different quantities of OAM modes and corresponding OAM weighting vectors. However, a maximum quantity of orthogonal OAM modes that may be used for communication between the two devices may correspond to the number of antenna subarrays in the circle with the smallest quantity of antenna subarrays. As such, differences in OAM modes due to different antenna subarray quantities may result in increased complexity in decoding signals.

Techniques described herein provide for a configuration of an OAM mode and a corresponding OAM weighting vector when a quantity of antenna subarrays of a first circular array at a transmitting device is different from a quantity of antenna subarrays of a second circular array at a receiving device. The quantity of antenna subarrays in the receiver circle (M) and the quantity of antenna subarrays in the transmitter circle (N), may not be integer multiples (e.g., $N=KM+r$ or $M=KN+r$, where K is an integer factor greater than one and r is a remainder value). In some aspects, the quantity of antenna subarrays in the receiver circle and the quantity of antenna subarrays in the transmitter circle may be mutually prime. The receiving device and the transmitting device may be configured with the respective quantities of antenna subarrays (e.g., upon deployment of the devices). Additionally or alternatively, the receiving device and the transmitting device may dynamically change the quantity of antenna subarrays used for communications based on one or more conditions or parameters of the devices. For example, the devices may activate or deactivate one or more of the antenna subarrays at a given time. The receiving device and the transmitting device may exchange signaling to indicate the quantity of antenna subarrays in the respective circular arrays, where the signaling may be transmitted semi-statically or dynamically during communications.

The transmitting device may transmit one or more reference signals to the receiving device using the transmitter circle. The reference signals may include channel state information (CSI) reference signals, sounding reference signals (SRS), or any other type of reference signal. The transmitting device may transmit the reference signals using each antenna subarray within the transmitter circle and in accordance with one or more OAM modes. The receiving device may receive the reference signals using each antenna subarray within the receiver circle and in accordance with one or more OAM modes. The receiving device may perform a channel estimation of a channel between the transmitting device and the receiving device based on the reference signals. For example, the receiving device may estimate a channel response matrix. The channel response matrix may include respective values of the channel response for each combination of OAM modes and corresponding OAM weighting vectors at the receiving device and the transmitting device.

The receiving device may transmit a feedback message to the transmitting device to indicate beamforming vectors for the transmitting device, or to indicate information for the transmitting device to use to determine the beamforming vectors. For example, the receiving device may solve the channel response matrix and calculate a set of singular vectors of the channel response matrix. The singular vectors may correspond to beamforming vectors that the transmitting device may use to orthogonally transmit signals according to each OAM mode. In some aspects, the receiving device may transmit an indication of the channel response matrix to the transmitting device via the feedback message, and the transmitting device may solve the channel response matrix to determine the beamforming vectors.

Additionally or alternatively, the receiving device may determine one or more discrete Fourier transform (DFT) values of the channel response (e.g., a channel response matrix corresponding to the channel). Each DFT value may correspond to a respective weighting factor. A DFT vector may include one or more DFT values and may correspond to a set of one or more weighting factors. Each weighting factor may be associated with or based on an estimated channel response of a respective combination of an OAM mode at the transmitting device and an OAM mode at the receiving device. The receiving device may transmit an indication of the weighting factors to the transmitting device via the feedback message. The transmitting device may be configured with multiple OAM vectors corresponding to a set of OAM modes based on the quantity of antenna subarrays in the transmitter circle. If the quantity of transmitter antenna subarrays is greater than the quantity of receiver antenna subarrays, the transmitting device may utilize the weighting factors to combine the multiple OAM weighting vectors into groups of OAM weighting vectors, where a quantity of the groups may be the same as the quantity of receiver antenna subarrays. The transmitting device may average the OAM weighting vectors in each group based on the weighting factors and use the averaged OAM weighting vectors for communications with the receiving device. The superimposed or averaged OAM weighting vectors may be referred to as approximations of the beamforming vectors determined by solving the channel response matrix. The receiving device may determine an OAM weighting vector to use, for example, based on an OAM mode associated with the quantity of antenna subarrays in the receiver circle.

If there are more antenna subarrays in the receiver circle than the transmitter circle, the transmitting device may determine an OAM weighting vector, for example, based on an OAM mode associated with the quantity of antenna subarrays in the transmitter circle, and the receiving device may utilize the weighting factors (e.g., eigenvalues of the channel response matrix) to group and combine multiple OAM weighting vectors into a quantity of combined OAM weighting vectors that is the same as the quantity of transmitter antenna subarrays. The transmitting device may transmit one or more signals to the receiving device concurrently using the transmitter circle based on the determined OAM weighting vectors or the indicated beamforming vectors. The receiving device may receive and decode the one or more signals using the receiver circle based on the determined OAM weighting vectors or beamforming vectors. Such techniques may provide for reliable OAM beamforming between two devices that include different quantities of antenna subarrays.

Each antenna subarray of the transmitter circle may be aligned with each antenna subarray of the receiver circle, or the antenna subarrays may be offset. If the antenna subarrays are aligned, each antenna subarray of the transmitter circle may be located at a respective angular offset relative to an axis that bisects the transmitter circle and each antenna subarray of the receiver circle may be located at the same respective angular offset relative to an axis that bisects the receiver circle. To reduce aliasing and interference as described herein, an angular offset between the antenna subarrays of the transmitter circle and the antenna subarrays of the receiver circle may be configured, such that each antenna subarray of the transmitter circle is located at a respective first angular offset relative to the axis that bisects the transmitter circle and each antenna subarray of the receiver circle is located at a respective second angular offset relative to the axis that bisects the receiver circle, where each second angular offset is different than each first angular offset. The angular offsets may be based on a function of the quantity of transmitting and receiving antenna subarrays to improve communication reliability.

Aspects of the disclosure are initially described in the context of wireless communications systems. Additional aspects of the disclosure are described with reference to OAM antenna array configurations, OAM weighting vector superposition tables, and process flows. Aspects of the disclosure are further illustrated by and described with reference to apparatus diagrams, system diagrams, and flowcharts that relate to non-integer multiple quantities of transmit and receive antenna subarrays.

FIG. 1 illustrates an example of a wireless communications system 100 that supports non-integer multiple quantities of transmit and receive antenna subarrays in accordance with aspects of the present disclosure. The wireless communications system 100 may include one or more base stations 105, one or more UEs 115, and a core network 130. In some aspects, the wireless communications system 100 may be a Long Term Evolution (LTE) network, an LTE-Advanced (LTE-A) network, an LTE-A Pro network, or a New Radio (NR) network. In some aspects, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some aspects, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some aspects, the backhaul links 120 may be or include one or more wireless links. A UE 115 may communicate with the core network 130 through a communication link 155.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other aspects. A UE 115 may also include or may be referred to as a personal electronic device such as a cellular phone, a personal digital assistant (PDA), a tablet computer, a laptop computer, or a personal computer. In some aspects, a UE 115 may include or be referred to as a wireless local loop (WLL) station, an Internet of Things (IoT) device, an Internet of Everything (IoE) device, or a machine type communications (MTC) device, among other aspects, which may be implemented in various objects such as appliances, or vehicles, meters, among other aspects.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other aspects, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some aspects (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some aspects the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some aspects, the wireless communications system 100 may include base stations 105 or UEs 115 that support simultaneous communications via carriers associated with multiple carrier bandwidths. In some aspects, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some aspects, a UE 115 may be configured with multiple BWPs. In some aspects, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some aspects, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some aspects, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some aspects, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other aspects.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some aspects, a carrier may support multiple cells, and different cells may be configured according to different protocol types (e.g., MTC, narrowband IoT (NB-IoT), enhanced mobile broadband (eMBB)) that may provide access for different types of devices.

In some aspects, a base station 105 may be movable and therefore provide communication coverage for a moving geographic coverage area 110. In some aspects, different geographic coverage areas 110 associated with different technologies may overlap, but the different geographic coverage areas 110 may be supported by the same base station 105. In other aspects, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some aspects, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some aspects, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Aspects of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some aspects, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private commu-nication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some aspects, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some aspects, groups of the UEs 115 communicating via D2D communications may utilize a one-to-many (1:M) system in which each UE 115 transmits to every other UE 115 in the group. In some aspects, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some aspects, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some aspects, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some aspects, the wireless communications system 100 may support millimeter wave (mmW) communications between the UEs 115 and the base stations 105, and EHF antennas of the respective devices may be smaller and more closely spaced than UHF antennas. In some aspects, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some aspects, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other aspects.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some aspects, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some aspects, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some aspects, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some aspects, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some aspects, a device may support same-slot HARQ feedback, where the device may provide HARQ feedback in a specific slot for data received in a previous symbol in the slot. In other cases, the device may provide HARQ feedback in a subsequent slot, or according to some other time interval.

Techniques described herein, in addition to or as an alternative to being carried out between UEs 115 and base stations 105, may be implemented via additional or alternative wireless nodes, including integrated access and backhaul (IAB) nodes 104, distributed units (DUs) 165, centralized units (CUs) 160, radio units (RUs) 170, and the like. For example, in some implementations, aspects described herein may be implemented in the context of a disaggregated radio access network (RAN) architecture (e.g., open RAN architecture). In a disaggregated architecture, the RAN may be split into three areas of functionality corresponding to the CU 160, the DU 165, and the RU 170. The split of functionality between the CU 160, DU 165, and RU 175 is flexible and as such gives rise to numerous permutations of different functionalities depending upon which functions (e.g., MAC functions, baseband functions, radio frequency functions, and any combinations thereof) are performed at the CU 160, DU 165, and RU 175. For example, a functional split of the protocol stack may be employed between a DU 165 and an RU 170 such that the DU 165 may support one or more layers of the protocol stack and the RU 170 may support one or more different layers of the protocol stack.

Some wireless communications systems (e.g., wireless communications system 100), infrastructure and spectral resources for NR access may additionally support wireless backhaul link capabilities in supplement to wireline backhaul connections, providing an IAB network architecture. One or more base stations 105 may include CUs 160, DUs 165, and RUs 170 and may be referred to as donor base stations 105 or IAB donors. One or more DUs 165 (e.g., and/or RUs 170) associated with a donor base station 105 may be partially controlled by CUs 160 associated with the donor base station 105. The one or more donor base stations 105 (e.g., IAB donors) may be in communication with one or more additional base stations 105 (e.g., IAB nodes 104) via supported access and backhaul links. IAB nodes 104 may support mobile terminal (MT) functionality controlled and/or scheduled by DUs 165 of a coupled IAB donor. In addition, the IAB nodes 104 may include DUs 165 that support communication links with additional entities (e.g., IAB nodes 104, UEs 115, etc.) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In some aspects, the wireless communications system 100 may include a core network 130 (e.g., a next generation core network (NGC)), one or more IAB donors, IAB nodes 104, and UEs 115, where IAB nodes 104 may be partially controlled by each other and/or the IAB donor. The IAB donor and IAB nodes 104 may be examples of aspects of base stations 105. IAB donor and one or more IAB nodes 104 may be configured as (e.g., or in communication according to) some relay chain.

For instance, an access network (AN) or RAN may refer to communications between access nodes (e.g., IAB donor), IAB nodes 104, and one or more UEs 115. The IAB donor may facilitate connection between the core network 130 and the AN (e.g., via a wireline or wireless connection to the core network 130). That is, an IAB donor may refer to a RAN node with a wireline or wireless connection to core network 130. The IAB donor may include a CU 160 and at least one DU 165 (e.g., and RU 170), where the CU 160 may communicate with the core network 130 over an NG interface (e.g., some backhaul link). The CU 160 may host layer 3 (L3) (e.g., RRC, service data adaption protocol (SDAP), PDCP, etc.) functionality and signaling. The at least one DU 165 and/or RU 170 may host lower layer, such as layer 1 (L1) and layer 2 (L2) (e.g., RLC, MAC, physical (PHY), etc.) functionality and signaling, and may each be at least partially controlled by the CU 160. The DU 165 may support one or multiple different cells. IAB donor and IAB nodes 104 may communicate over an F1 interface according to some protocol that defines signaling messages (e.g., F1 AP protocol). Additionally, CU 160 may communicate with the core network over an NG interface (which may be an example of a portion of backhaul link), and may communicate with other CUs 160 (e.g., a CU 160 associated with an alternative IAB donor) over an Xn-C interface (which may be an example of a portion of a backhaul link).

IAB nodes 104 may refer to a RAN node that provides IAB functionality (e.g., access for UEs 115, wireless self-backhauling capabilities, etc.). IAB nodes 104 may include a DU 165 and an MT. A DU 165 may act as a distributed scheduling node towards child nodes associated with the IAB node 104, and the MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, an IAB node 104 may also be referred to as a parent node or a child node to other IAB nodes 104, depending on the relay chain or configuration of the AN. Therefore, the MT entity of IAB nodes 104 (e.g., MTs) may provide a Uu interface for a child node to receive signaling from a parent IAB node 104, and the DU interface (e.g., DUs 165) may provide a Uu interface for a parent node to signal to a child IAB node 104 or UE 115.

For example, IAB node 104 may be referred to a parent node associated with IAB node, and a child node associated with IAB donor. The IAB donor may include a CU 160 with a wireline (e.g., optical fiber) or wireless connection to the core network and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture (e.g., one or more IAB nodes 104 or components of IAB nodes 104) may be configured to support techniques for large round trip times in random access channel procedures as described herein. For example, some operations described as being performed by a UE 115 or a base station 105 may additionally or alternatively be performed by components of the disaggregated RAN architecture (e.g., IAB nodes, DUs, CUs, etc.).

In some aspects, one or more nodes in the wireless communications system 100, such as a UE 115, a base station 105, an IAB node 104, an RU 170, a DU 165, a CU 160, or any combination thereof, may support OAM communications. A node that supports OAM communication may include a circular array including multiple antenna subarrays, which may be referred to as a transmitter circle for a transmitting node or a receiver circle for a receiving node. Each antenna subarray may include one or more antenna elements. Techniques described herein provide for a transmitting node that includes a first quantity of antenna subarrays to support OAM communications with a receiving node that includes a second quantity of antenna subarrays different from the first quantity. The first and second quantities may not be integer multiples. In some aspects, the first and second quantities may be mutually prime. The nodes may each include the respective quantities of antenna subarrays disposed in a circle, which may be referred to as a transmitter circle and a receiver circle, respectively. Each antenna subarray may include one or more antenna elements.

The transmitting node may transmit one or more reference signals to the receiving node using the transmitter circle. The receiving node may perform a channel estimation of a channel between the transmitting node and the receiving node based on the one or more reference signals. For example, the receiving node may estimate a channel response matrix associated with the channel. The receiving node may transmit a feedback message to the transmitting node based on the channel estimation. The feedback message may indicate multiple sets of beamforming weights for the transmitting node to use for communications. For example, the receiving node may calculate singular vectors of the channel response matrix and feedback the singular vectors to the transmitting node, where the singular vectors may correspond to the beamforming vectors. Additionally or alternatively, the feedback message may indicate information for determining the beamforming weights. For example, the receiving node may transmit the channel response matrix via the feedback message, or the receiving node may transmit weighting factors for the transmitting node to use to determine the beamforming weights. The beamforming weights may be based on the first quantity of antenna subarrays at the transmitting node being different than the second quantity of antenna subarrays at the receiving node. The transmitting node may generate one or more OAM signals for transmission to the receiving node and transmit the OAM signals concurrently to the second node using the transmitter circle based on the one or more sets of beamforming weights. Each set of beamforming weights may be referred to as a beamforming vector and may correspond to a respective OAM mode.

Figure 2:
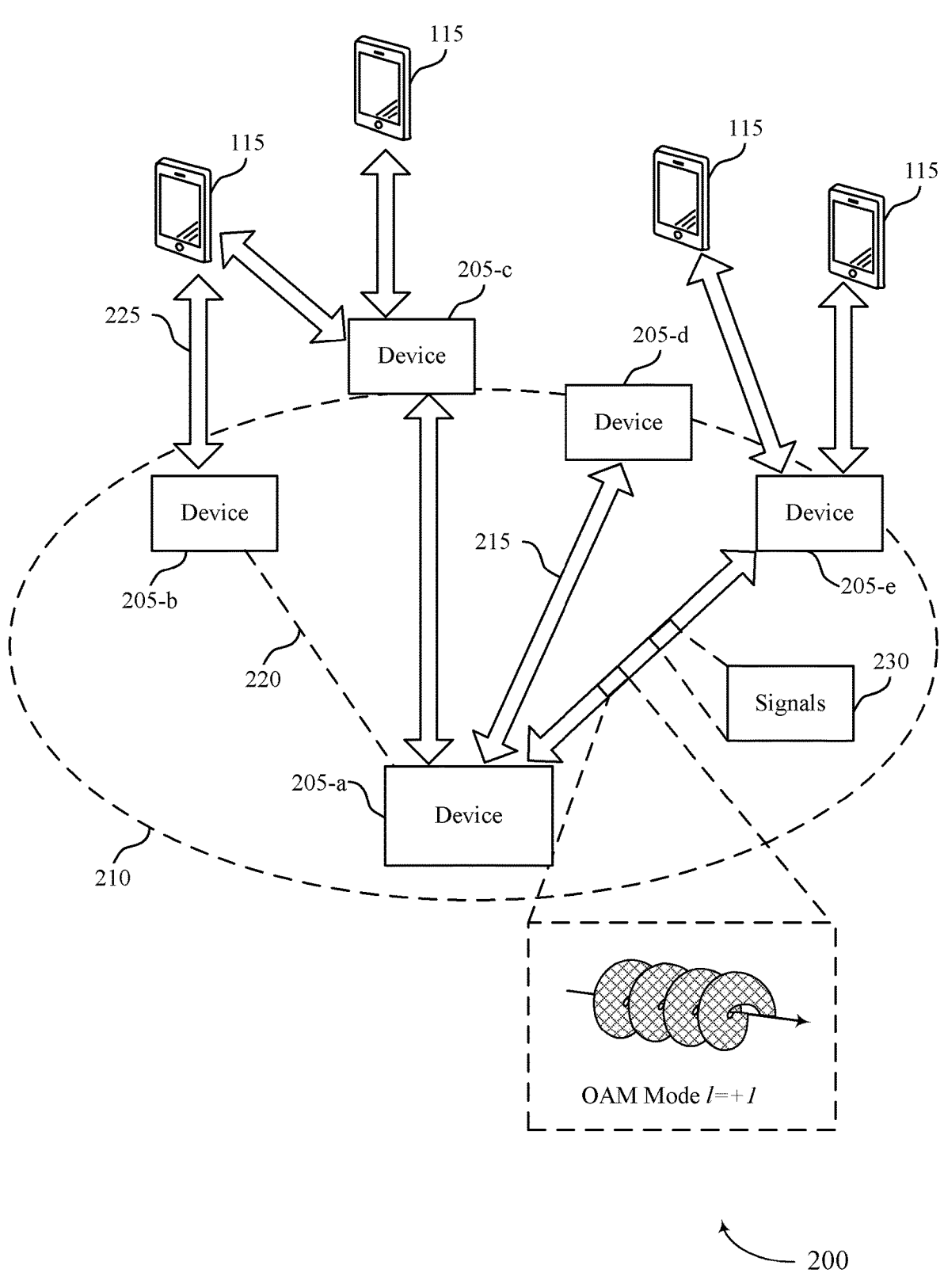
FIG. 2 illustrates an example of a wireless communications system that supports non-integer multiple quantities of transmit and receive antenna subarrays in accordance with aspects of the present disclosure.

FIG. 2 illustrates an example of a wireless communications system 200 that supports non-integer multiple quantities of transmit and receive antenna subarrays in accordance with aspects of the present disclosure. The wireless communications system 200 may implement or be implemented by aspects of the wireless communications system 100. The wireless communications system may include one or more devices 205 and UEs 115. The devices 205 may each be an example of a UE 115, a base station 105, an IAB node, a CU, a DU, an RU, or any other wired or wireless device. In some aspects, the devices 205-*a*, 205-*b*, 205-*c*, 205-d, and 205-*e* may form a network device architecture 210, which may be used to relay signals from a radio access network (RAN) (e.g., using smart coordination) to the UEs 115 or other wireless access devices. The wireless communications system 200 (which may be an example of a sixth generation (6G) system, a fifth generation (5G) system, or another generation system) may support OAM-based communications and, as such, the devices 205 the one or more UEs 115, or both, may transmit or receive OAM beams, or OAM-related signals over respective communication links.

The device 205-*a* may represent an example of a core unit of the network device architecture 210, such as a base station 105, a RAN CU, a RAN DU, or some other network node. In some cases, the device 205-*a* may be connected with the other devices 205 via wired fronthaul/backhaul communication links 220 (e.g., fiber-based fronthaul). Additionally or alternatively, the device 205-*a* may communicate with one or more other devices 205 of the network device architecture 210 via wireless fronthaul/backhaul communication links 215. The wireless fronthaul/backhaul communication links 215 may reduce cost and deployment complexity as compared with the wired fronthaul/backhaul communication links 220. The other devices 205 may represent aspects of distributed network nodes, such as IAB nodes, repeaters, RUs, or any combination thereof that may relay signals from the RAN to one or more UEs 115 or other wireless devices via wireless access communication links 225.

The wireless communications system 200 may support various communications schemes, such as LoS-MIMO. In such environments, a direct link may be present between two or more devices 205 (e.g., without a physical obstruction). For example, the network device architecture 210 may occupy a relatively small area, such that a distance between the devices 205 is relatively short. The devices 205 may communicate according to one or more LoS-MIMO communication schemes using one or more antenna subarrays based on the relatively small distance between devices. Such LoS-MIMO communication schemes may support relatively high throughput and data capacities over relatively short distances. As such, LoS-MIMO may provide for the wireless fronthaul/backhaul communication links 215 to support sufficient data capacity between devices 205 of the network device architecture 210 without deploying physical fibers or cables. For example, the device 205-*a* (e.g., a DU or core network node) may be deployed with an aperture array that connects with one or more other devices 205 (e.g., instead of fibers). In some aspects, the performance of the aperture array on the device 205-*a* may be optimized between the device 205-*a* and the other devices 205-*c*, 205-*d*, and 205-*e* to support relatively high throughput and capacity of the wireless fronthaul/backhaul communication links 215.

OAM-based communications may be an example of a LoS-MIMO communication scheme supported by the wireless communications system 200. Each of the devices 205, the UEs 115, or both may support OAM communication and may include an OAM antenna system having multiple antenna elements or antenna subarrays arranged in one or more concentric circular arrays. The respective antenna subarrays of the devices 205 may be installed or dynamically adjusted such that they are aligned along a first axis (e.g., a horizontal or vertical axis) as well as rotationally, or such that they are offset by a configured rotational offset. OAM communication may support relatively high-order spatial multiplexing, and in some aspects, the offsets between antenna subarrays may be configured to optimize orthogonality between signals and data throughput. OAM communication may support relatively high data rates between two or more devices 205 over relatively short distances. In some aspects, the devices 205 may perform OAM communications in relatively high frequency spectrums (e.g., sub-THz, THz, etc.). Although OAM communication is described in the context of fronthaul and backhaul, it is to be understood that the communication techniques described herein may be applicable to any two wireless devices, include access devices (e.g., UEs, CPEs), network devices (e.g., base stations, DUs, CUs, RUs, IAB nodes), or both.

The devices 205 may support OAM-based communication by using OAM of electromagnetic waves to distinguish between different signals. For example, a transmitting device 205 may radiate multiple coaxially propagating, spatially-overlapping waves each carrying a data stream through an array of apertures. In some cases, the OAM of the electromagnetic wave may be associated with a field spatial distribution of the electromagnetic wave, which may be in the form of a helical or twisted wavefront shape. For example, an electromagnetic wave may correspond to a helical transverse phase of the form $\exp(i\varphi l)$ may carry an OAM mode waveform, where $\varphi$ may be an azimuthal angle of the waveform and $l$ may be an unbounded integer, which may be referred to as an OAM order, a helical mode, or an OAM mode. Each OAM mode (e.g., OAM modes $l = \ldots$, $-2, -1, 0, 1, 2, \ldots$) may be orthogonal.

Such OAM modes may be characterized by a wavefront that is shaped as a helix with an optical vortex in the center (e.g., at the beam axis), where each OAM mode is associated with a different helical wavefront structure. The OAM modes may be defined or referred to by the mode index $l$, where a sign of the mode index $l$ corresponds to a "handedness" (e.g., left or right) of the helix (or helices) and a magnitude of the mode index $l$ (e.g., $|l|$) corresponds to a quantity of distinct but interleaved helices of the electromagnetic wave.

For example, for an electromagnetic wave associated with an OAM mode index of $l = 0$, the electromagnetic wave may not be helical and the wavefronts of the electromagnetic wave are multiple disconnected surfaces (e.g., the electromagnetic wave is a sequence of parallel planes). For an electromagnetic wave associated with an OAM mode index of $l = +1$, the electromagnetic wave may propagate in a right-handed pattern (e.g., has a right circular polarization or may be understood as having a clockwise circular polarization) and the wavefront of the electromagnetic wave may be shaped as a single helical surface with a step length equal to a wavelength A of the electromagnetic wave. An example of such an electromagnetic wave is illustrated in FIG. 2. Similarly, for an OAM mode index of $l = -1$, the electromagnetic wave may propagate in a left-handed pattern (e.g., has a left circular polarization or may be understood as having a counter-clockwise circular polarization) and the wavefront of the electromagnetic wave may be also be shaped as a single helical surface with a step length equal to the wavelength A of the electromagnetic wave.

For further example, for an OAM mode index of l=±2, the electromagnetic wave may propagate in either a right-handed pattern (if +2) or in a left-handed pattern (if −2) and the wavefront of the electromagnetic wave may include two distinct but interleaved helical surfaces. In such aspects, the step length of each helical surface may be equal to $\lambda/2$. Likewise, the phase delay over one revolution of the electromagnetic wave may be equal to ±4π. In general terms, a mode-l electromagnetic wave may propagate in either a right-handed pattern or a left-handed pattern (depending on the sign of l) and may include l distinct but interleaved helical surfaces with a step length of each helical surface equal to $\lambda/|l|$. In some aspects, an electromagnetic wave may be indefinitely extended to provide for an infinite number of degrees of freedom of the OAM of the electromagnetic wave (e.g., l=0, ±1, ±2, . . . , ±∞). As such, the OAM of the electromagnetic wave may be associated with infinite degrees of freedom.

In some aspects, the OAM mode index l of an electromagnetic wave may correspond to or otherwise function as (e.g., be defined as) an additional dimension for signal or channel multiplexing. For example, each OAM mode, which may correspond to an OAM state (of which there may be infinite), may function similarly (e.g., or equivalently) to a communication channel, such as a sub-channel. In other words, an OAM mode or state may correspond to a communication channel, and vice versa. For instance, the devices 205 may communicate separate signals 230 using electromagnetic waves having different OAM modes or states similarly to how the devices may transmit separate signals over different communication channels. In some aspects, such use of the OAM modes or states of an electromagnetic wave to carry different signals 230 may be referred to as the use of OAM beams.

Such OAM waveforms associated with different OAM modes may be orthogonally received at a same time and frequency radio resource, which may improve communication spectrum efficiency with relatively low processing complexity at a receiving device 205. For example, a transmitting device 205, such as the device 205-a, may transmit one or more signals 230 to a receiving device 205, such as the device 205-e, using multiple OAM modes. Each signal 230 may be transmitted according to a respective OAM mode, such that the signals 230 do not overlap or interference with each other. In some aspects, two or more signals may be transmitted concurrently. If polarizations are added to the OAM modes, a quantity of orthogonal OAM streams may increase.

To support such OAM communication, each device 205 may be configured with a set of antenna subarrays configured in a circular shape, such as a uniform circular array (UCA) antenna circle (e.g., an antenna circle, a transmitter circle, or a receiver circle). Each device 205 may be equipped with one or more UCA circles that the device 205 may use to communicate according to one or more OAM modes. The OAM antenna array configurations are described in further detail elsewhere herein, including with reference to FIGS. 3-5.

In some cases, the transmitting device 205-a and the receiving device 205-e may be configured with a same quantity of antenna subarrays at each device 205. A quantity of OAM modes that can be generated by each device 205 may correspond to the quantity of antenna subarrays. For example, if a device 205 has N antenna subarrays, the device 205 may be configured to generate N OAM modes. Each OAM mode may correspond to a set of OAM weights (e.g., an OAM weighting vector) to be applied to the antenna subarrays of the transmitting device 205-a when generating the transmission. The receiving device 205-e may utilize the OAM modes corresponding to the quantity of antenna subarrays to identify weights applied by the transmitting device 205-a to the OAM signals. The receiving device 205-e may receive and decode the OAM signals based on the weights.

In some aspects, however, a quantity of antenna subarrays at the transmitting device 205-a may be different than a quantity of antenna subarrays at the receiving device 205-e. For example, the devices 205 may be deployed with different quantities of antenna subarrays, or the devices 205 may be configured to dynamically activate or deactivate one or more antenna subarrays of the device 205 based on a set of communication parameters. The quantity of antenna subarrays at a device 205 (e.g., a quantity of configured antenna subarrays or a quantity of activated antenna subarrays) may be based on a condition of a channel between the device 205 and another device 205, a type of the device 205, power consumption of the device 205, a type of communication performed by the device 205, a size of the device 205, beamforming capabilities of the device 205, processing capabilities of the device 205, or any combination thereof. If the quantity of antenna subarrays of a transmitter circle is different than a quantity of antenna subarrays of a receiver circle, the receiving device 205-e, in some cases, may be unable to accurately receive and decode OAM transmissions from the transmitting device 205-a due to relatively complex processing associated with decoding such a channel.

As described herein, the devices 205 may be configured with methods for supporting OAM communications using a different quantity of transmitter antenna subarrays than receiver antenna subarrays. The devices 205 may exchange signaling to indicate the respective quantity of antenna subarrays. For example, the receiving device 205-e may transmit signaling to the transmitting device 205-a to indicate the quantity of receiver antenna subarrays and the transmitting device 205-a may transmit signaling to the receiving device 205-e, one or more other devices 205 (e.g., via a broadcast message), or both, to indicate the quantity of transmitter antenna subarrays. The signaling may be RRC signaling, a MAC-CE, a physical layer control channel, or any combination thereof configured to indicate the quantity of antenna subarrays. In some aspects, the signaling may be transmitted semi-statically (e.g., an RRC configuration). Additionally or alternatively, the devices 205 may dynamically transmit the signaling to indicate changes in quantities of antenna subarrays over time.

The receiving device 205-e may use the indicated quantity of antenna subarrays to decode a channel between the transmitting device 205-a and the receiving device 205-e with relatively low complexity. In some aspects, the quantity of antenna subarrays at the transmitting device 205-a and the quantity of antenna subarrays at the receiving device 205-e may not be integer multiples. In some aspects, the quantities may be mutually prime. Such antenna array configurations may reduce aliasing and other interference. Methods for configuring non-integer multiple quantities of antenna arrays and decoding the channel are described in further detail elsewhere herein, including with reference to FIGS. 3-6.

FIG. 3 illustrates an example of an OAM antenna array configuration 300 that supports non-integer multiple quantities of transmit and receive antenna subarrays in accordance with aspects of the present disclosure. In some aspects, the OAM antenna array configuration 300 may implement aspects of wireless communications systems 100 or 200. In this example, a transmitting device (e.g., a UE, a base station, an RU, a DU, a CU, an IAB node or some other device) may include an OAM transmitter UCA antenna array 305 and a receiving device (e.g., a UE, a base station, an RU, a DU, a CU, an IAB node or some other device) may include an OAM receiver UCA antenna array 310.

In some aspects, one or both of the OAM transmitter UCA antenna array 305 or the OAM receiver UCA antenna array 310 may be implemented as a planar array of antenna elements, or individual antenna arrays or subarrays, which may be an example of or otherwise function as a (massive or holographic) MIMO array or an intelligent surface. In some cases, the transmitting device may identify a set of antenna subarrays 315 of the planar array that form a transmitter UCA (e.g., transmitter antenna subarrays 315-a, 315-b, 315-c, 315-d, 315-e, 315-f, 315-g, and 315-h), and a receiving device may identify a set of antenna subarrays 345 of the planar array that form a receiver UCA (e.g., receiver antenna subarrays 345-a, 345-b, 345-c, 345-d, 345-e, 345-f, 345-g, and 345-h).

Upon selecting the set of antenna subarrays from the planar array, the transmitting device may apply a weight 335 to each of the selected antenna subarrays 315 based on the OAM mode index l of the transmitted OAM beam and one or more spatial parameters associated with each antenna subarray 315. In cases in which a UCA methodology is used to generate an OAM beam, the transmitting device may identify the set of antenna subarrays 315 on a circular array of antenna elements and may apply a first set of weights 320 to each of the identified antenna subarrays 315 based on a first OAM mode index (e.g., l=0). Further, for other OAM mode indices, other weights may be used for the set of antenna subarrays 315, such as a second OAM mode index (e.g., l=+1) that may use a second set of weights 325 and a third OAM mode index (e.g., l=−1) that may use a third set of weights 330. Each OAM mode may be characterized by a different helical wave structure, as described with reference to FIG. 2. The helical wave structure for each mode may be generated by applying the respective set of weights to the antenna subarrays 315 of the transmitting device.

For example, to generate an OAM beam with an OAM mode index (e.g., l=0), the transmitting device may apply a weight 335 to each antenna subarray 315 on the UCA based on an angle 340 measured between a reference line on the UCA (e.g., the x-axis of the plane on which the UCA is located, where the origin is at the center of the UCA) and the antenna subarray 315, the OAM mode index l, and i (e.g., for complex-valued weights, which may alternatively be denoted as j in some cases). In some cases, for instance, the weight for an antenna element n may be proportional to $e^{i*l*\varphi_n}$, where $\varphi_n$ is equal to the angle 340 measured between the reference line on the UCA and the antenna element n. By multiplying respective beamforming weights 335 of each set of weights 320-330 (e.g., for first set of weights 320, $w_1=[w_{1,1}, w_{1,2}, \ldots, w_{1,8}]^T$) onto) each antenna subarray 315, a signal port may be generated. If the weight 335 of each antenna subarray 315 is equal to $e^{i\varphi l}$, where $\varphi$ is the angle of an antenna subarray 315 in the circle (e.g., angle 340 for antenna subarray 315-g), and l is the OAM mode index, then each set of weights 320-330 provides a beamformed port that is equivalent to OAM mode l. By using different beamforming weights $e^{i\varphi l'}$, where l'≠l, multiple OAM modes are thus generated.

At the OAM receiver UCA antenna arrays 310, the receiving device may have receive antenna subarrays 345 equipped in a circle. The channel matrix may be denoted from each transmit antenna subarray 315 to each receive antenna subarray 345 as H, and then for the beamformed channel matrix $\tilde{H}=H\cdot[w_1, w_2, \ldots, w_L]$. Any two OAM weighting vectors of $[w_1, w_2, \ldots, w_L]$ may be orthogonal relative to each other. In some aspects, for N transmit antenna subarrays 315 and N receive antenna subarrays 345, the transfer matrix H may be found via discreet angular sampling using Equation 1, shown below.

$$H_{m,n} \propto \frac{\exp\left(jk\sqrt{z^2 + (r_1 - r_2\cos\theta_2)^2 +}\right)}{\sqrt{z^2 + (r_1\cos\theta_1 - r_2\cos\theta_2)^2 + (r_1\sin\theta_1 - r_2\sin\theta_2)^2}} = \frac{\exp\left\{jk\sqrt{z^2 + r_1^2 + r_2^2 - 2r_1r_2\cos(\theta_1-\theta_2)}\right\}}{\sqrt{z^2 + r_1^2 + r_2^2 - 2r_1r_2\cos(\theta_1-\theta_2)}} \quad (1)$$

In the example of Equation 1, beamformed ports may not experience crosstalk because of orthogonality between columns of the transfer matrix H. This may enable OAM-based communication to realize high-level spatial multiplexing more efficiently. Further, the eigen-based transmit precoding weights and receive combining weights of UCA-based OAM procedures may be equal to a DFT matrix. As the transfer matrix H is cyclic or circulant, eigenvectors of the transfer matrix H may be DFT vectors, as described in Equation 2.

$$v_u = \exp\left\{j\frac{2\pi\mu v}{N}\right\} \quad (2)$$

In the example of Equation 2, μ and v may be integers within a range (e.g., μ=0, 1, . . . (N−1), v=0, 1, . . . (N−1)), where μ is a vector index of a DFT vector and v is the element index in each DFT vector. With respect to each OAM mode, the μ-th DFT vector may correspond to the y-th OAM waveform. In some cases, the eigen modes may be identified by performing a singular value decomposition (SVD) on a transfer matrix. In some cases, with N transmit antenna subarrays 315 and receive antenna subarrays 345, all OAM modes (e.g., 0, 1, . . . (N−1) OAM modes) may be orthogonal at the receiver if any of them are transmitted, regardless of distance z and radii of the transmitter and receiver circles. In some cases, it may be beneficial to have both transmitter and receiver planes be co-axial and vertical to the z-axis, although the transmitter and the receiver antenna arrays may have angular offsets, or may be in other configurations, as described in further detail elsewhere herein, including with reference to FIG. 6.

In some aspects, a quantity of transmit antenna subarrays 315 (N) may be different than a quantity of receive antenna subarrays 345 (M). The quantity of antenna arrays on each device may be based on a condition of a channel between devices, a type of the device (e.g., an RU, a DU, a base station 105, a UE 115, or some other type of device), a size of the device, one or more capabilities of the device, power consumption of the device, or any combination thereof. If the transmitting device is a different type of device or has different capabilities or power restraints than the receiving device, the quantity of transmit antenna subarrays 315 may be different than a quantity of receive antenna subarrays 345 (e.g., M≠N). In such cases, the transfer matrix H may not be circulant. If a maximum of the quantity of transmit or receive antenna arrays (e.g., max(M, N)) is not a multiple of a minimum of the quantity of transmit and receive antenna arrays (e.g., min(M, N)), the circulant property may not hold, such that a DFT vector may not be a left singular or right singular vector of the transfer matrix H. In such cases, calculating the eigenvectors of the transfer matrix may be relatively complex and a simplifying structure for an SVD of the transfer matrix may not be defined.

A method for performing an SVD of the transfer matrix when a quantity of transmit antenna subarrays 315 on the transmitting device is different than a quantity of receive antenna subarrays 345 on the receiving device is described. The quantity of transmit antenna subarrays 315 may and the quantity of receive antenna subarrays 345 may not be integer multiples (e.g., M=KN+r or N=KM+r, where K is an integer factor that is greater than zero and r is a non-zero integer remainder value). Techniques for configuring such antenna subarrays and either performing the SVD to solve for beamforming vectors or approximating the beamforming vectors are described in further detail elsewhere herein, including with reference to FIGS. 4 and 5.

It is to be understood that antenna arrays including multiple antenna subarrays described herein may alternatively be referred to as transmitter circles or receiver circles. Further, the same circular antenna array may at times act as a transmitter circle and may at times act as a receiver circle, but may be referred to as one or the other for the sake of clarity in related descriptions. It is to be understood that any signaling described as received by a device having a transmitter circle could be received via the transmitter circle or via another antenna array, antenna subarray, or antenna element at the device (e.g., a separate receiver circle at the device or some other antenna array or element at the device). Similarly, any signaling described as transmitted by a device having a receiver circle could be transmitted via the receiver circle or via another antenna array, antenna subarray, or antenna element at the device (e.g., a separate transmitter circle at the device or some other antenna array or element at the device). Additionally, though referred to herein as transmit antenna subarrays 315 and receive antenna subarrays 345, it is to be understood that these aspects may alternatively be referred to as transmit antenna arrays and receive antenna arrays, each of which may include multiple antenna elements.

Figure 4:
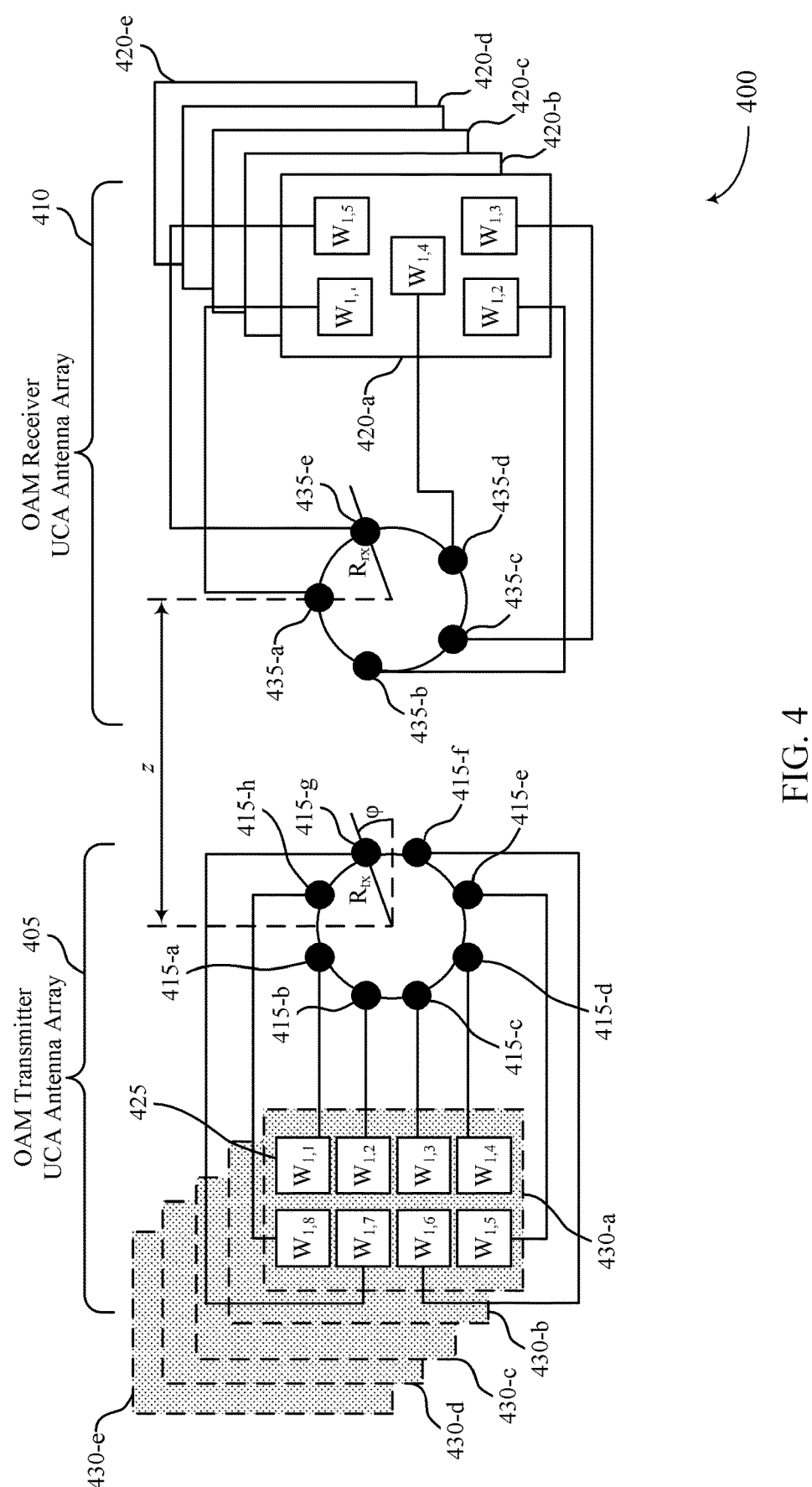
FIG. 4 illustrates an example of an OAM antenna array configuration that supports non-integer multiple quantities of transmit and receive antenna subarrays in accordance with aspects of the present disclosure.

FIG. 4 illustrates an example of an OAM antenna array configuration 400 that supports non-integer multiple quantities of transmit and receive antenna subarrays in accordance with aspects of the present disclosure. In some aspects, the OAM antenna array configuration 400 may implement or be implemented by aspects of the wireless communications systems 100 or 200 or the OAM antenna array configuration 300, as described with reference to FIGS. 1-3. In this example, a transmitting device (e.g., a UE, a base station, an RU, a DU, a CU, an IAB node or some other device) may include an OAM transmitter UCA antenna array 405 and a receiving device (e.g., a UE, a base station, an RU, a DU, a CU, an IAB node or some other device) may include an OAM receiver UCA antenna array 410.

In some aspects, the transmitting device may identify a set of antenna subarrays 415 of the planar array that form a transmitter UCA (e.g., transmitter antenna subarrays 415-a, 415-b, 415-c, 415-d, 415-e, 415-f, 415-g, and 415-h), and a receiving device may identify a set of antenna subarrays 435 of the planar array that form a receiver UCA (e.g., receiver antenna subarrays 435-a, 435-b, 435-c, 435-d, and 435-e). A quantity of antenna subarrays 415 and 435 in each UCA may be based on a condition of a channel between the devices, a type of the device, a size of the device, one or more capabilities of the device, a beamforming and processing capacity of the device, power consumption of the device, or any combination thereof, as described with reference to FIG. 3.

In some cases, upon selecting the set of antenna elements from the planar array, the transmitting device may apply a weight 425 to each of the selected antenna subarrays 415 based on an OAM mode index 1 of the transmitted OAM beam and one or more spatial parameters associated with each antenna subarray. As described with reference to FIG. 3, the receiving device may have receive antenna subarrays 435 equipped in a circle, and the receiving device may perform discrete angular sampling to identify a transfer matrix, H, for a beamformed channel between the devices using Equation 1. If the quantity of transmitter antenna subarrays 415 and the quantity of receiver antenna subarrays 435 is the same, the receiving device may identify the transfer matrix and use Equation 2 to determine the eigenvalues of the transfer matrix, which may be DFT vectors. The receiving device may use the DFT vectors to determine the weights 425 applied to the signal and decode the signals received from the transmitting device. Each weight 425 may, in some aspects, correspond to a DFT value within a DFT vector. That is, a DFT vector that includes a first quantity of elements (DFT values) may correspond to a set of the first quantity of weights 425.

In the example of FIG. 4, however, the OAM transmitter UCA antenna array 405 of the transmitting device may include a first quantity (N) of transmit antenna subarrays 415, that may be different than a second quantity (M) of receive antenna subarrays 435 of the OAM receiver UCA antenna array 410 of the receiving device. The first quantity and the second quantity may not be integer multiples (e.g., N=KM+r, where K and r≠0 are both integers). In the example of FIG. 4, N may be eight and M may be five, such that K=1 and r=3 (e.g., 8=5(1)+3). In some aspects, the first quantity and the second quantity may be mutually prime, such as in the example of FIG. 4 (e.g., the greatest common factor of eight and five may be one, such that the quantities may be mutually prime).

Non-integer multiple quantities of antenna subarrays may be desirable for OAM multiplexing in some systems. For example, communications between devices that include non-integer multiple quantities of antenna subarrays may be associated with reduced aliasing. Aliasing during OAM communications may reduce data throughput and a reliability of the communications. Aliasing may correspond to an underrepresentation of a system when the system is represented by finite samples. For example, sampling a continuous signal may create interference or may permit at least some misrepresentation of the continuous signal, which may be referred to as aliasing.

In the example of OAM communications, the receiver and transmitter circles may be quantized or digitized to include a finite quantity of antenna subarrays, which may represent the finite samples. For example, the receiving device may sample one or more signals received from the transmitting device at each receive antenna subarray 435, where the receive antenna subarrays 435 disposed in a circle may represent finite samples of the continuous circle. In the example of FIG. 4, the signal transmitted by the transmitting device may be sampled eight times (e.g., at each transmitter antenna subarray 415), and the signal may be sampled at the receiving device five times (e.g., at each receiver antenna subarray 435). The receiving device may experience fluctuations or oscillations in the OAM modes used for communications due to interference captured by the finite antenna subarrays (e.g., the antenna subarrays may capture additional signaling or interference different than the intended OAM mode or may not capture signaling that is part of the intended OAM mode).

The transmitting device may excite or generate an OAM waveform by adjusting a phase of the waveform for each transmit antenna subarray 415. In the example of FIG. 4, the phase may change by 45 degrees between each adjacent transmit antenna subarray 415. For example, the transmit antenna subarray 415-*h* may have a 45 degree phase shift relative to the transmit antenna subarray 415-*a*. The receiving device may attempt to receive and decode the signals from the transmitting device by applying a same angular shift between receive antenna subarrays 435. However, when the transmitting device excites the signals using the transmit antenna subarrays 415, one or more signals may be excited at each transmit antenna subarray 415, and each signal may be associated with a respective order of an OAM mode. For example, the transmit antenna subarray 415-*a* may excite signals having a 45 degree phase and signals having a phase of $2\pi+45$, $4\pi+45$, etc.

In some aspects, a higher-order OAM mode (e.g., an OAM mode with an index greater than eight) may interfere with a lower-order OAM mode supported by the devices. The receiving device may not be able to distinguish the correct OAM mode from the interfering signals corresponding to other OAM modes. That is, because of the finite samples, the receiver may be unable to differentiate signals generated in accordance with OAM modes corresponding to a faster oscillation from signals generated in according with OAM modes corresponding to a slower oscillation.

Techniques described herein support reliable OAM communications between a transmitting device and a receiving device that have non-integer multiple quantities of antenna subarrays. Systems in which the quantity of transmitter antenna subarrays 415 and the quantity of receiver antenna subarrays 435 are non-integer multiples may improve anti-aliasing performance and reduce the effects of aliasing. In some aspects, the quantities of antenna subarrays may be mutually prime, at least one of the quantities may be a prime number, or both, which may further reduce the effects of aliasing. For example, an observed channel gain at the receiver device may not vary relatively quickly with relatively small changes in receiver position. That is, the receiving device may be able to distinguish higher-order OAM modes more reliably if the quantities of antenna subarrays are not the same.

A transmitting device may utilize a configuration of antenna subarrays 415 such that the quantity of the transmitter antenna subarrays 415 is not an integer multiple of a quantity of receiver antenna subarrays 435 to achieve robust performance against user mobility. The transmitting device may transmit control channels, data channels, or both using the described techniques. Such techniques may thereby improve coverage an enhance mobility and communication reliability.

However, a quantity of OAM modes that a device may use to generate orthogonally isolated signals may be based on or the same as a quantity of antenna subarrays of the device, and each OAM mode may correspond to a DFT vector of a same quantity of OAM weights to apply to the antenna subarrays, as discussed with reference to Equation 2. As such, in the example of FIG. 4, a first quantity of DFT vectors and corresponding OAM modes for the transmitting device may be the same as the quantity of transmitter antenna subarrays 415 (e.g., modes 0, 1, . . . N–1, where each mode corresponds to a respective OAM vector, or set of OAM weights), and a second quantity of DFT vectors and corresponding OAM modes for the receiving device may be the same as the quantity of receiver antenna subarrays 435 (e.g., a quantity of M M-ary DFT vectors each including a set of OAM weights). A maximum quantity of orthogonal OAM modes that may be used for communication between the two devices may correspond to the number of antenna subarrays in the circle with the smallest quantity of antenna subarrays (e.g. M).

As described herein, the transmitting device and the receiving device may utilize feedback information to perform OAM beamforming and determine beamforming vectors to use for communicating when quantities of antenna subarrays at each device are non-integer multiples. The transmitting device may transmit one or more reference signals to the receiving device. The receiving device may perform a channel estimation procedure based on the one or more reference signals, which may be CSI reference signals, SRSs, or other types of reference signals. In some aspects, the channel estimation procedure may be performed by the transmitting device, the receiving device, or both. The channel estimation may be performed regardless of whether the antenna subarray quantities are the same or different. As such, the channel estimation procedure may not provide for increased overhead or latency.

The channel estimation procedure may include estimating a strength of the channel based on the one or more reference signals (e.g., pilot signals). In the example of FIG. 4, the transmitting device may transmit the reference signals to the receiving device. In some aspects, however, the device with fewer antenna subarrays may transmit the reference signals. The transmitting device may choose one or more transmitter antenna subarrays 415 for the channel estimation. The transmitting device may transmit the reference signals from the selected one or more antenna subarrays 415. If the transmitting device transmits the reference signal from more than one antenna subarray 415, each antenna subarray 415 and corresponding reference signal may be distinguishable based on code division multiplexing (CDM) or cyclic shifts applied to the reference signals. The receiving device may estimate multiple sets of channel gains for each selected transmitter antenna subarray 415 and each OAM mode. That is, for each transmit antenna subarray 415, the receiving device may estimate a set of channel gains including a respective channel gain between the transmit antenna subarray 415 and each receive antenna subarray 435. The full channel estimation may be characterized based on the estimation. For example, the estimation may be averaged for multiple transmitter antennas 415. Additionally or alternatively, the transmitting device may transmit the reference signal from each transmitter antenna subarray 415, and the receiving device may estimate the channel based on channel gains between each receive antenna subarray 435 and each transmit antenna subarray 415. It is to be understood that, in some aspects, the receiving device may transmit the reference signals and the transmitting device may perform the channel estimation according to the described techniques.

The M by N channel response matrix, H, obtained based on the channel estimation procedure may be defined according to Equation 3.

$$H = \begin{bmatrix} h_0 & h_1 & \cdots & h_{N-1} \\ h_M & h_{M+1} & \cdots & h_{M-1} \\ \cdots & \cdots & \cdots & \cdots \\ h_{(K-1)M} & h_{(K-1)M+1} & \cdots & h_{N-M-1} \end{bmatrix} \quad (3)$$

In some cases (not illustrated in FIG. 4), the quantities of transmit antenna subarrays 415 and receive antenna subarrays 435 may be the same (e.g., M=N). In such cases, the channel response matrix may be circulant and include M unique entries. An SVD of the channel response matrix, which may be referred to as a channel response, may produce M-ary DFT vectors, as described with reference to FIG. 3. In other cases (also not shown in FIG. 4), the quantity of transmit antenna subarrays 415 may be an integer multiple of the quantity of receive antenna subarrays 435, or vice versa. In such cases, the channel response matrix may include a quantity of unique entries that is the same as the lowest quantity of antenna subarrays. The device with more antenna subarrays may divide a quantity of OAM modes associated with the respective quantity of antenna subarrays into a set of groups of OAM weighting vectors and combine the OAM weighting vectors in each group to obtain a same quantity of OAM weighting vectors to use for beamforming as the other device.

In the example of Equation 3 as applied to the non-integer multiple quantities of antenna subarrays illustrated in FIG. 4, the full M by N channel response matrix, H, may include a quantity of independent elements that may be the same as a least common multiple (1 cm) of M and N. The remaining elements in the channel response matrix may be cyclic repetitions of the independent elements. In the example of FIG. 4, M and N may be mutually prime (e.g., 1 cm(M, N)=1). In this case, there may not be repetition in the elements of the channel response matrix. As such, there may not be a circulant structure of the channel response matrix shown in Equation 3 based on the quantity of transmit antenna subarrays 415 (N) and the quantity of receive antenna subarrays 435 (M) not being the same, and based on an absence of an integer multiple relationship between the quantities.

In some aspects, the structure of the channel response matrix when M and N are not equal or integer multiples may be exploited to simplify the SVD. For example, a full channel response matrix may be defined as $h_{full}=[\tilde{h}_0, \tilde{h}_1, \ldots \tilde{h}_{lcm(M,N)-1}]$, where L=lcm(M, N), lcm(M, N)=$K_M$M, and lcm(M, N)=$K_N$N. That is, h may be defined as a row vector, which may be different from other vector definitions. If $h_{full}$ is defined as a matrix including lcm(M, N) by lcm(M, N) elements, a channel response matrix, H may be obtained by down sampling $h_{full}$ by both rows and columns, as shown by Equation 4.

$$H = \begin{bmatrix} \tilde{h}_{0,0} & \tilde{h}_{0,K_N} & \cdots & \tilde{h}_{0,K_N(N-1)} \\ \tilde{h}_{K_M,0} & \tilde{h}_{K_M,K_N} & \cdots & \tilde{h}_{K_M,K_N(N-1)} \\ \cdots & \cdots & \cdots & \cdots \\ \tilde{h}_{K_M(M-1),0} & \tilde{h}_{K_M(M-1),K_N} & \cdots & \tilde{h}_{K_M(M-1),K_N(N-1)} \end{bmatrix} = \begin{bmatrix} h_{0,\downarrow K_N} \\ h_{K_M,\downarrow K_N} \\ \cdots \\ h_{(M-1)K_M,\downarrow K_N} \end{bmatrix} \quad (4)$$

As shown in Equation 4, the m$^{th}$ row of H may correspond to a right shift of $h_{full}$ by (m−1)$K_M$ and down-sampling the result by $K_N$. Additionally, the n$^{th}$ column of H may correspond to a right shift of $h_{full}$ by (n−1)$K_N$ and down-sampling the result by $K_M$.

As described herein, the receiving device may transmit a feedback message to the transmitting device based on performing the channel estimation. The feedback message may indicate one or more beamforming vectors for the transmitting device or information for the transmitting device to determine the beamforming vectors, which may be referred to as sets of beamforming weights herein.

In some aspects, the receiving device may perform an SVD of the channel response matrix. The receiving device may calculate left and right singular values of the channel response matrix based on the SVD and transmit an indication of the singular values to the transmitting device via a feedback message. The singular values of the channel response matrix may correspond to beamforming vectors of OAM weights 425 that the transmitting device may apply to the transmitter antenna subarrays 415 to generate and transmit orthogonal OAM signals to the receiving device. For example, each beamforming vector may correspond to a respective set 430 of OAM weights 425 of the sets 430-*a*, 430-*b*, 430-*c*, 430-*d*, and 430-*e* illustrated in FIG. 4. A quantity of OAM weights 425 within each set 430 may be the same as the quantity of transmit antenna subarrays 415 within the transmitter circle, and the transmitting device may apply a respective OAM weight 425 of the set 430 to each transmit antenna subarray 415. A quantity of the beamforming vectors (e.g., the sets 430) may be the same as a quantity of the receiver antenna subarrays 435.

In some other aspects, the receiving device may transmit an indication of the channel response matrix to the transmitting device via the feedback message, and the transmitting device may calculate the SVD of the channel response matrix. The transmitting device may identify the singular values of the channel response matrix based on the SVD. The singular values may correspond to the beamforming vectors of the OAM weights 425 for the transmitting device to use (e.g., the sets 430-*a* through 430-*e* of OAM weights 425). In some aspects, performing the SVD may be relatively complex due to the quantities of transmit and receive antenna subarrays being non-integer multiples or mutually prime.

To reduce complexity, in some aspects, techniques are described herein to approximate the singular values of the channel response matrix when there are different quantities of transmit antenna subarrays 415 and receive antenna subarrays 435, and when those two quantities are not integer multiples of one each other. If M and N are non-integer multiples, singular vectors on either side of the channel response matrix may be superpositions of a quantity of DFT vectors, for example, a super position of $$\frac{lcm(M, N)}{N}$$

DFT vectors. For example, each left singular vector (e.g., a vector including M elements) may be a superposition of $K_N$ DFT vectors each including M elements. Each right singular vector (e.g., a vector including N elements) may be a superposition of $K_M$ DFT vectors each including N elements, where $K_M$M=lcm(M, N) and $K_N$N=lcm(M, N).

As such, the transmitting device, the receiving device, or both may utilize the described techniques to approximate the singular values based on a superposition of one or more OAM weighting vectors. The approximated singular values may correspond to weighted averages of multiple OAM weighting vectors. The weighted averages of the OAM weighting vectors may represent estimates or approximations of corresponding beamforming vectors for transmission of orthogonal OAM signals. Stated alternatively, each of the approximated singular values may correspond to a respective set 430 of OAM weights 425 for the transmitting device to use for communications. Each of the sets 430-*a* through 430-*e* may correspond to a respective approximated beamforming vector.

For example, the transmitting device (e.g., the device with more antenna elements) may support a first quantity of OAM modes and corresponding OAM weighting vectors that is the same as the quantity of transmitter antenna subarrays 415 (e.g., N). The receiving device may support a second quantity of OAM modes and corresponding OAM weighting vectors that is the same as the quantity of receiver antenna subarrays 435 (e.g., M). To reduce the first quantity of OAM weighting vectors to the second quantity, the transmitting device may group the first quantity of OAM weighting vectors into M groups and perform a weighted average of the OAM weighting vectors in each group to obtain M approximations of beamforming vectors to use for communications with the receiving device. The receiving device (e.g., the device having fewer antenna elements) may utilize the M OAM weighting vectors initially supported by the receiving device, which may correspond to the M sets 420 of OAM weights 425 (e.g., the sets 420-*a*, 420-*b*, 420-*c*, 420-*d*, and 420-*e*). Techniques for superimposing, or combining, the DFT vectors are described in further detail with reference to FIG. 5.

Although FIG. 4 illustrates more transmitter antenna subarrays 415 than receiver antenna subarrays 435, it is to be understood that either device may have more antenna subarrays than the other. For example, in some cases there may be more receiver antenna subarrays 435 than transmitter antenna subarrays 415, and the described methods and properties may still apply. For example, the receiving device may perform a weighted average to group and reduce a quantity of OAM weighting vectors to be the same as a quantity of OAM weighting vectors supported by the transmitting device. In some aspects, the receiving device may transmit the reference signals and the transmitting device may perform the channel estimation procedure and transmit a feedback message to the receiving device.

Additionally or alternatively, in some cases, the devices may not exchange a feedback message indicating the channel matrix or the SVDs of the channel matrix. Instead, the transmitting device and the receiving device may exchange reference signals, and each device may perform its own channel estimation based on the reference signals assuming that the channel is reciprocal (e.g., channel conditions in one direction are the same as channel conditions in the other direction). For example, one side may transmit the reference signals, which may correspond to the channel matrix at the respective side of the communication, and the other side may receive the reference signals and estimate the channel matrix. Such reciprocity of the channel may ensure that channels for both directions of communication are the same. In either case (e.g., with and without channel feedback), the methods of determining the weighting factors and beamforming weights may remain substantively similar.

In some aspects, the transmitter antenna subarrays 415 may be aligned with the receiver antenna subarrays 435. That is, the antenna subarrays on each device may be installed or dynamically adjusted or activated such that they are aligned along a first axis (e.g., a horizontal or vertical axis) as well as rotationally (e.g., the transmitter antenna subarrays 415 may be aligned with the receiver antenna subarrays 435 in various rotational axes). Additionally or alternatively, any angular offset may be applied between antenna subarrays. For example, OAM communications may support relatively high-order spatial multiplexing, and in some aspects, angular offsets between antenna subarrays may be configured to optimize orthogonality between signals and improve data throughput. Configurations of angular offsets between antenna subarrays may be described in further detail elsewhere herein, including with reference to FIG. 6.

FIG. 5 illustrates an example of an OAM weighting vector superposition table 500 that supports non-integer multiple quantities of transmit and receive antenna subarrays in accordance with aspects of the present disclosure. The OAM weighting vector superposition table 500 may implement or be implemented by aspects of the wireless communications systems 100 and 200 and the OAM antenna array configurations 300 and 400, as described with reference to FIGS. 1-4. For example, the OAM weighting vector superposition table 500 illustrates example sets of OAM weighting vectors that may be combined (e.g., using a weighted average) to approximate or estimate a set of beamforming vectors to be applied to antenna subarrays of a transmitting device to generate and transmit multiple orthogonal OAM waveforms.

As described with reference to FIGS. 2-4, a transmitting device and a receiving device may, in some aspects, be equipped with respective quantities of antenna subarrays that are different, where neither quantity is an integer multiple of the other. For example, a receiver circle may include M antenna subarrays and a transmitter circle may include N antenna subarrays, where $M=K_N+r$ or $N=K_M+r$. K may be an integer (e.g., an integer multiplier), and $r\neq0$ may be a remainder (e.g., an integer remainder). In some aspects, M and N may be mutually prime, or at least one of M or N may be a prime number. The quantities of antenna subarrays may be configured at the devices or adjusted (e.g., activated or deactivated) dynamically based on operating conditions of the devices, as described with reference to FIGS. 2-4.

The transmitting device, the receiving device, or both may perform a reference signal-based channel estimation procedure, as described with reference to FIGS. 2-4. In some aspects, the transmitting device, the receiving device, or both may calculate singular values of a channel response matrix, and the singular values may indicate beamforming vectors for the respective devices. The beamforming vectors may correspond to vectors of OAM weights to be applied to antenna subarrays of the respective device to generate, transmit, receive, and/or decode orthogonal OAM signals.

Techniques described herein provide for the devices to estimate or approximate the beamforming vectors without solving for singular vectors of the channel response matrix, which may reduce processing and complexity. In the example of FIG. 5, the transmitting device may include a quantity of transmitter antenna subarrays that is greater than a quantity of receiver antenna subarrays at the receiving device (e.g., $N=K_M+r$). As described with reference to FIG. 4, a quantity of OAM modes and OAM weighting vectors supported by or configured for each device may be based on the quantity of antenna subarrays at the respective device. In this case, the receiving device may support M OAM modes and corresponding OAM weighting vectors for communications. The transmitting device may support N OAM modes and corresponding OAM weighting vectors for communications (e.g., MIMO beamforming vectors).

To support communication with the receiving device, the transmitting device as described herein may group the N OAM modes by combining the N OAM modes into M OAM mode groups based on the integer factor, K, and the remainder value, r. As illustrated in FIG. 5, the N OAM modes initially supported by the transmitting device may correspond to N OAM weighting vectors having indices 0, 1, . . . , r−1, r, . . . , M−1, M, M, . . . (K−1)M, (K−1)M+1, . . . , KM+r−1 (e.g., N indices).

As illustrated by the OAM vector superposition table 500, after combining (e.g., superimposing) the OAM weighting vectors, the transmitting device may support M weighting vectors having indices 0 through M−1. The M weighting vectors may be referred to as approximated beamforming vectors because they may represent approximations of the beamforming vectors that would be calculated by performing SVD on the channel response matrix. Each of the M approximated beamforming vectors at the transmitting device may include K+1 or K superimposed OAM weighting vectors. For example, the approximated beamforming vector having an index of zero may include K+1 superimposed OAM weighting vectors corresponding to the initial OAM weighting vectors of the transmitting device that have indices of 0, M, . . . , (K−1)M, K_M. The approximated beamforming vector having an index of M−1 may include K superimposed OAM weighting vectors, which may correspond to the initial OAM weighting vectors of the transmitting device that have indices of M−1, 2M−1, . . . , (K−1)M+M−1.

To account for the non-integer relationship between M and N, the approximated beamforming vectors having indices zero to r−1 may include K+1 superimposed OAM weighting vectors and the approximated beamforming vectors having indices r to M−1 may include K superimposed OAM weighting vectors. Each OAM weighting vector may include N elements, or OAM weights, which may correspond to the OAM weights 425 as described with reference to FIG. 4.

In an example, the transmitting device may include 17 transmitter antenna subarrays (e.g., N=17) and the receiving device may include five receiver antenna subarrays (e.g., M=5), such that K=3 and r=2. In this case, the transmitting device may support an initial set of 17 OAM weighting vectors corresponding to indices zero through 16 (e.g., K_M+r−1). The transmitting device may combine the 17 OAM weighting vectors to obtain five approximated beamforming vectors. The approximated beamforming vector with the index of zero may include four (e.g., K+1) superimposed OAM weighting vectors corresponding to the initial OAM weighting vectors of the transmitting device associated with indices of 0, 5, 10, 15. The approximated beamforming vector with the index of one (e.g., r−1) may include four superimposed OAM weighting vectors corresponding to the initial OAM weighting vectors of the transmitting device associated with indices of 1, 6, 11, 16. The remaining approximated beamforming vectors with indices of two through four (e.g., M−1) may each include three (e.g., K) superimposed OAM weighting vectors. For example, the approximated beamforming vector with index of four may include three superimposed OAM weighting vectors corresponding to the initial OAM weighting vectors of the transmitting device associated with indices of 4, 9, 14.

The transmitting device may combine the superimposed OAM weighting vectors in each of the M groups using a weighted average based on one or more weighting factors, which may be represented by or indexed by the (a) values in parenthesis in the OAM vector superposition table 500. The weighting factors may correspond to or be proportional to a channel response between two corresponding OAM vectors, which may be obtained or estimated based on the channel estimation procedure.

For example, a first superimposed OAM mode (e.g., OAM mode 0) may excite multiple OAM waveforms, including: 1, exp(jMφ), exp(j2Mφ), . . . , exp(jKMφ), exp(j(K+1)Mφ), . . . . The lower-order waveforms, such as 1, exp(jMφ), exp(j2Mφ), . . . , exp(jKMφ) may be associated with resonance because K_M<N, exp(j(K+1)Mφ). Higher order modes and corresponding waveforms may be distinguished, and may correspond to aliasing because the higher-order mode indices may be greater than N. The OAM modes may be similarly analyzed at the transmitter and the receiver.

The receiving device may estimate a respective channel response between each of the transmitter modes (e.g., transmitter superimposed modes 0, 1, . . . , (M−1), which may correspond to superpositions of OAM modes of order up to N) and receiver modes (e.g., receiver modes 0, 1, . . . , (M−1), which may correspond to OAM modes). The channel response between a transmitter mode, n, and a receiver mode, m, may be represented by on. The channel responses may be estimated based on the channel estimation procedure described herein. For example, the transmitter and the receiver may exchange one or more reference signals transmitted according to each of the transmitter modes, and one or both of the devices may estimate the channel responses based on the reference signals.

The weighting factors for the device to use to combine OAM weighting vectors may be proportional to the channel response. For example, if the quantity of transmit antenna subarrays is greater than the quantity of receive antenna subarrays, example weighting factors in response to OAM modes zero, one, r−1, r, and M−1 are described with respect to Equations 5 through 9, respectively.

$$\frac{\sum_{k=0}^{K}\sigma_{0,kM}u_{kM}}{\sqrt{\sum_{k=0}^{K}|\sigma_{0,kM}|^2}} \text{ as the response to } OAM \text{ mode } 0 \quad (5)$$

$$\frac{\sum_{k=0}^{K}\sigma_{1,kM+1}u_{kM+1}}{\sqrt{\sum_{k=0}^{K}|\sigma_{1,kM+1}|^2}} \text{ as the response to } OAM \text{ mode } 1 \quad (6)$$

$$\frac{\sum_{k=0}^{K}\sigma_{r-1,kM+r-1}u_{kM+r-1}}{\sqrt{\sum_{k=0}^{K}|\sigma_{r-1,kM+r-1}|^2}} \text{ as the response to } OAM \text{ mode } r-1 \quad (7)$$

$$\frac{\sum_{k=0}^{K-1}\sigma_{r,kM+r}u_{kM+r}}{\sqrt{\sum_{k=0}^{K-1}|\sigma_{r,kM+r}|^2}} \text{ as the response to } OAM \text{ mode } r \quad (8)$$

$$\frac{\sum_{k=0}^{K-1}\sigma_{M-1,kM+M-1}u_{kM+M-1}}{\sqrt{\sum_{k=0}^{K-1}|\sigma_{M-1,kM+M-1}|^2}} \text{ as the response to } OAM \text{ mode } M-1 \quad (9)$$

In the example of Equation 5, $\sigma_{0,KM}$ may represent the channel response between a receiver OAM mode zero and a transmitter mode kM. $u_{kM}$ may represent the $kM^{th}$ OAM mode (transmitter OAM mode) of length N. The other instances of a and u in Equations 6-9 may similarly represent respective channel responses and OAM modes.

In some aspects, the receiving device may determine the weighting factors and transmit an indication of the weighting factors for combining the OAM weighting vectors to the transmitting device via a feedback message. Each of the weighting factors may correspond to a respective DFT value, or element, of a DFT vector for the channel response (e.g., channel response matrix) associated with the channel between the transmitting and receiving devices. The receiving device may estimate the channel response based on the reference signals and calculate the DFT vectors each corresponding to a respective set of weighting factors. Additionally or alternatively, the transmitting device may solve the channel response (e.g., channel response matrix) to calculate the DFT vectors and determine the corresponding sets of weighting factors. The transmitting device may apply the calculated weighting factors or the weighting factors indicated via the feedback message to the OAM weighting vectors in superposition to perform a weighted average and calculate an approximate beamforming vector.

An SVD of the channel response matrix, H, may be represented by $H=U\Lambda V^{H}$. With respect to the example in which the transmitting device includes eight transmitter antenna subarrays and the receiving device includes five receiver antenna subarrays, as described with reference to FIG. 4, U may be a 5-by-5 matrix and V may be an eight-by-eight matrix. That is, U may be a 5-DFT matrix, and un may be the $n^{th}$ 5-DFT vector for the receiving device. In this case, V may be represented by Equation 10.

$$V = \left( \frac{\sigma_{00}^* v_0 + \sigma_{05}^* v_5}{\sqrt{|\sigma_{00}|^2 + |\sigma_{05}|^2}}, \frac{\sigma_{11}^* v_1 + \sigma_{16}^* v_6}{\sqrt{|\sigma_{11}|^2 + |\sigma_{16}|^2}}, \frac{\sigma_{22}^* v_2 + \sigma_{27}^* v_7}{\sqrt{|\sigma_{22}|^2 + |\sigma_{27}|^2}}, v_3, v_4 \right) \quad (10)$$

In the example of Equation 10, $v_i$ may correspond to an $i^{th}$ 8-DFT vector. $\sigma_{ji}$ may be a channel response of a $j^{th}$ 5-DFT vector to an $i^{th}$ 8-DFT vector. In this case, there may be five vectors $v_i$ with non-zero singular values. Each non-zero value of V may thereby correspond to a set of one or more weighting factors for the transmitting device. The weighting factors may be indexed according to the corresponding $\sigma_{nm}$ value, as illustrated in FIG. 5.

The transmitting device may thereby apply the weighting factors to the OAM weighting vectors in superposition in each group to obtain M approximated beamforming vectors that each include N elements (e.g., OAM weights). If there are more receiver antenna subarrays than transmitter antenna subarrays (e.g., M=NK'+r', where 0<r'<N), similar techniques for combining OAM weighting vectors may be applied with reversed roles of transmitter and receiver modes for approximate beamforming vectors and weights. For example, in some aspects where M is greater than N, the instances of Min FIG. 5 may be replaced with N, and the instances of N in FIG. 5 may be replaced with M.

The described beamforming vector approximation techniques may provide for the devices to estimate beamforming vectors without solving a channel response matrix, which may reduce complexity and latency. The approximated beamforming vectors may support reliable communications using multiple orthogonal OAM waveforms.

FIG. 6 illustrates an example of an OAM antenna array configuration 600 that supports non-integer multiple quantities of transmit and receive antenna subarrays in accordance with aspects of the present disclosure. The OAM antenna array configuration 600 may implement or be implemented by aspects of the wireless communications system 200 or the OAM antenna array configurations 300 and 400. For example, the OAM antenna array configuration 600 illustrates a configuration of antenna subarrays at a transmitting device and a receiving device. The transmitting and receiving devices may represent aspects of corresponding devices as described with reference to FIGS. 2-5 (e.g., a UE, a base station, a CU, a DU, an RU, an IAB node, or any other device).

In this example, the transmitting device may include a first quantity of transmitter antenna subarrays 605 (e.g., eight) that are each located at a respective first angular offset relative to a first axis that bisects the transmitter circle (e.g., the y-axis in FIG. 6), and the receiving device may include a second quantity of receiver antenna subarrays 610 (e.g., five) that are each located at a respective second angular offset relative to a second axis that bisects the receiver circle (e.g., the y-axis in FIG. 6). Each respective first angular offset may be different from each respective second angular offset. Although the transmitter circle and the receiver circle are overlapping in FIG. 6 for clarity purposes, it is to be understood that the transmitter and receiver circles (e.g., and the corresponding devices) may be located any distance from one another, as described with reference to FIGS. 2-5.

The quantity of transmitter antenna subarrays 605 may be different than the quantity of receiver antenna subarrays 610. In some aspects, the quantity, N, of transmitter antenna subarrays 605 and the quantity, M, of receiver antenna subarrays 610 may be non-integer multiples of one another, or mutually prime, or both to reduce the effects of aliasing, as described with reference to FIG. 4. In the example of FIG. 6, the transmitting device may include eight transmitter antenna subarrays 605 and the receiving device may include five receiver antenna subarrays 610. Although more transmitter antenna subarrays 605 than receiver antenna subarrays 610 are illustrated in FIG. 6, it is to be understood that the transmitting and receiving devices may include any quantity of antenna subarrays. In some aspects, there may be more receiver antenna subarrays 610 than the transmitter antenna subarrays 605.

In some cases (not illustrated in FIG. 6), the transmitter circle at the transmitting device and the receiver circle at the receiver device may be angularly aligned. For example, there may not be an offset between a first antenna subarray of the transmitter circle and a first antenna subarray of the receiver circle. In such cases, aliasing may occur, which may reduce data throughput and a reliability of communications. As described with reference to FIG. 4, aliasing may correspond to an underrepresentation of a system when the system is represented by finite samples. For example, sampling a continuous signal may create interference or may permit at least some misrepresentation of the continuous signal, which may be referred to as aliasing.

In the example of OAM communications, the receiver and transmitter circles may be quantized or digitized to include a finite quantity of antenna subarrays, which may represent the finite samples. For example, the receiving device may sample one or more signals received from the transmitting device at each antenna subarray, where the antenna subarrays disposed in a circle may represent finite samples of the continuous circle. In the example of FIG. 6, the signal transmitted by the transmitting device may be sampled eight times (e.g., at each transmitter antenna subarray 605), and the signal may be sampled at the receiving device five times (e.g., at each receiver antenna subarray 610).

The receiving device may experience fluctuations or oscillations in the OAM modes used for communications due to interference captured by the finite antenna subarrays (e.g., the antenna subarrays may capture additional signaling or interference different than the intended OAM mode or may not capture signaling that is part of the intended OAM mode). In some aspects, a higher-order OAM mode (e.g., an OAM mode with an index greater than eight) may interfere with a lower-order OAM mode supported by the devices. For example, the antenna subarray 610-*a* may be located at an angle of 72 degrees from the y-axis and may correspond to a first OAM mode. A second OAM mode may correspond to higher orders (e.g., 72+π degrees). The receiving device may not be able to distinguish the correct OAM mode from the interfering signals corresponding to higher order OAM modes with a finite quantity of antenna subarrays 610. That is, because of the finite samples, spatial sampling by the receiver may not be sufficient, and the receiver may be unable to differentiate signals generated in accordance with OAM modes corresponding to a faster oscillation from signals generated in according with OAM modes corresponding to a slower oscillation.

The effects of aliasing for a transmitter and receiver circle pair each having a same quantity of antenna subarrays, N, that are not offset by an angular offset may be described with respect to Equations 11 through 13. For example, the mode response of each transmitter and receiver circle pair, as described according to Equation 2, may be further analyzed according to Equation 11, which utilizes Taylor expansion approximations.

$$\sqrt{z^2 + r_1^2 + r_2^2 - 2r_1 r_2 \cos(\theta_1 - \theta_2)} \approx z + \frac{r_1^2 + r_2^2}{2z} - \frac{r_1 r_2 \cos(\theta_1 - \theta_2)}{z} \quad (11)$$

Equation 11 may then be incorporated into Equation 1, yielding Equation 12 as shown below.

$$H_{m,n} \propto \frac{\exp\left\{jk\sqrt{z^2 + r_1^2 + r_2^2 - 2r_1 r_2 \cos(\theta_1 - \theta_2)}\right\}}{\sqrt{z^2 + r_1^2 + r_2^2 - 2r_1 r_2 \cos(\theta_1 - \theta_2)}} \approx \quad (12)$$
$$\frac{\exp\left\{jk\left(z + \frac{r_1^2 + r_2^2}{2z}\right)\right\}}{z} \exp\left\{\frac{-jk r_1 r_2 \cos(\theta_1 - \theta_2)}{z}\right\}$$

Assuming a continuous transmitter circle at the transmitting device, if a phase of $e^{jl\theta_1}$ is applied by the transmitting device, a total received signal at a receive location of $\theta_2$ on the receiver circle may be represented by Equation 13.

$$\int_0^{2\pi} \exp\{-jB \cos(\theta_1 - \theta_2)\} \exp(jl\theta_1)\,d\theta_1 = (-j)^l 2\pi J_l(B) \exp(jl\theta_2) \quad (13)$$

In the example of Equation 13, B may be represented by $$B = 2\pi \frac{r_1 r_2}{\lambda z}.$$

However, with discrete sampling by the transmitter antenna subarrays 605 (e.g., discrete transmitter antenna subarrays 605 located at $$\theta_1 = \frac{2\pi p}{N},$$

with p=0, 1, . . . (N−1)), aliasing may exist. Aliasing may be present when the mode index, l, has a periodicity of N. For example, the received signal at a receive location of $\theta_2$ on the receiver circle when discrete sampling is applied may be represented by Equation 14.

$$\frac{1}{\sqrt{N}}\sum_{p=0}^{N-1}\exp\left\{j\frac{2\pi pl}{N}\right\}\exp\left\{-j2\pi\frac{r_1 r_2}{\lambda z}\cos\left(\frac{2\pi p}{N}-\theta_2\right)\right\} \sim \quad (14)$$
$$\sum_{v=-\infty}^{\infty} J_{l+vN}(B)(-j)^{(l+vN)} e^{j(l+vN)\theta_2} = \sum_{v=-\infty}^{\infty} J_{l+vN}(B)e^{j(l+vN)\left(-\frac{\pi}{2}+\theta_2\right)}$$

Aliasing may thereby be present when discrete sampling is performed by the transmitting device, as evidenced by the differences between Equations 13 and 14. Similar aliasing effects may be experienced when a quantity of receiver antenna subarrays is different than a quantity of transmitter antenna subarrays, and there is not an angular offset between antenna subarrays 610 of the receiver circle and antenna subarrays 605 of the transmitter circle. A radius of the transmitter and receiver circles may not impact the effects of aliasing.

As described herein, the quantity of transmitter antenna subarrays 605 and the quantity of receiver antenna subarrays 610 may not be integer multiples. In some aspects, the quantities may be mutually prime. Such antenna subarray configurations between transmitting and receiving devices may reduce the effects of aliasing.

Additionally or alternatively, techniques described herein provide for the antenna subarrays 605 of the transmitter circle may be offset from the antenna subarrays 610 in the receiver circle by a nonzero angular offset 615 to further reduce effects of aliasing. The angular offset 615 may be a negative or positive rotational angle between a first transmitter antenna subarray 605-*a* of the transmitter circle and a first receiver antenna subarray 610-*a* of the receiver circle. The respective first antenna subarrays 605-*a* and 610-*a* may be defined arbitrarily or based on a location of an axis or other reference in the panel, such as an x-axis or y-axis through the circular plane, with an origin at the center of the transmitter and receiver circles.

A reference line at the transmitting device may be defined as the line 620-*a* from the center of the panel to the first transmitter antenna subarray 605-*a*. A reference line at the receiving device may be defined as the line 620-*b* from the center of the panel to the first receiver antenna subarray 610-*a*. The transmitter and receiver angular offset 615 may be define as the rotational angle, θ, between the reference lines 620-*a* and 620-*b* for the transmitting and receiving devices, respectively.

The angular offset 615 may be configured as a positive or negative nonzero value to reduce effects of aliasing as described herein. The value of the angular offset may be based on an analysis of the received signal when the quantity of transmitter antenna subarrays 605 is different than the quantity of receiver antenna subarrays 610, and the quantities are not integer multiples. (e.g., N=K_M+r or M=K_N+r). In such cases, the received signal at the $m^{th}$ receiver antenna subarray 610 of an subarray of M receiver antenna subarrays 610, where the $m^{th}$ receiver antenna subarray 610 is at an angle of $$\theta_2 = \frac{2\pi m}{M} + \theta_0,$$

is defined according to Equation 15.

$$Er(\varphi_m) =$$ (15)

$$J_l(B)(-j)^l e^{jl\left(\frac{2\pi m}{M}+\theta_0\right)} + \sum_{\substack{v=-\infty, \\ v\neq 0}}^{\infty} J_{l+vN}(B)(-j)^{(l+vN)} e^{j(l+vN)\left(\frac{2\pi m}{M}+\theta_0\right)}$$

If neither of the quantity of receiver antenna subarrays 610 and the quantity of transmitter antenna subarrays 605 is an integer multiple of the other, and singular vectors are used for beamforming vectors, each transmitter singular vector may be a superposition of $$\frac{lcm\,(M,\,N)}{N} = \frac{M}{gcd\,(M,\,N)}$$

DFT vectors, where gcd stands for greatest common divisor. As such, the aliasing term may be present at an order of at least $$\frac{lcm\,(M,\,N)}{N} = \frac{M}{gcd\,(M,\,N)}.$$

If at least one of M or N is a prime number, the aliasing term may be present at an order of M. The described antenna subarray configurations in which M and N are configured to be non-integer multiples or mutually prime may thereby reduce aliasing.

When there are a different quantity of transmitter antenna subarrays 605 than receiver antenna subarrays 610 (e.g., M≠N), the first non-zero aliasing term may be indexed by $$v_{min} = \frac{M}{gcd\,(M,\,N)} = \frac{lcm\,(M,\,N)}{N},$$

and the angular offset may be determined such that Equation 16 is satisfied.

$$e^{jv_{min}N\theta_0} = -e^{-jv_{min}N\theta_0} \Rightarrow e^{j(2v_{min}N\theta_0)} = -1$$ (16)

To satisfy Equation 16, $\theta_0$ may be determined according to Equation 17.

$$\theta_0 = \frac{\pm(2n+1)\pi}{2v_{min}N}$$ (17)

However, Equation 17 may not be true for all values of v (e.g., v=1, 2, 3, . . . ). As such, one choice for $\theta_0$ is $$\theta_0 = \pm\frac{\pi}{2Nv_{min}}.$$

This may provide for a same angular offset 615 value for downlink and uplink scenarios (e.g., N transmitter antenna subarrays and M receiver antenna subarrays, or vice versa). If $v_{min}$ is relatively large, the angular offset 615 may be zero or a very small value. Aliasing may occur for high modes if $v_{min}$ is relatively large, such that the aliasing may be suppressed naturally (e.g., without an angular offset 615). In some aspects, the angular offset 615 may be independent of polarization modes, such that two polarization modes may be used for each OAM mode, and the transmitter and receiver polarizations may be aligned irrespective of the angular offset 615.

If approximate beamforming vectors are used by the transmitting device, the receiving device, or both, as described with reference to FIG. 5, the aliasing terms and angular offset 615 may be adjusted. For example, if there are more receiver antenna subarrays 610 than transmitter antenna subarrays 605 (e.g., M=NK+r, where 0<r<N), the aliasing term may start at K, and the angular offset 615 may be $$\theta_0 = \pm\frac{\pi}{2NK}.$$

If there are more transmitter antenna subarrays 605 than receiver antenna subarrays 610 (e.g., N=MK'+r', where 0<r'≤M), the aliasing term may start at one, and the angular offset 615 may be $$\theta_0 = \pm\frac{\pi}{2N}.$$

The effects of aliasing may start earlier when approximate beamforming vectors are used than when SVD is performed to determine the beamforming vectors.

Accordingly, an angular offset 615 may be determined to reduce aliasing effects during OAM communications. The angular offset 615 may be based on a quantity of transmitter antenna subarrays 605. The angular offset 615 may be the same for different OAM modes. The transmitting and receiving devices may dynamically adjust the angular offset 615 if a quantity of antenna subarrays on one or both of the transmitter circle or the receiver circle changes. As described with reference to FIG. 2, the quantity of antenna subarrays on a device may change based on one or more parameters, and the devices may transmit signaling (e.g., RRC signaling, a MAC-CE or a physical layer control channel) to one another to indicate the quantity of antenna subarrays at the respective device. In some aspects, the devices may adjust the angular offset 615 by moving antenna subarrays or by activating or deactivating one or more antenna subarrays.

Figure 7:
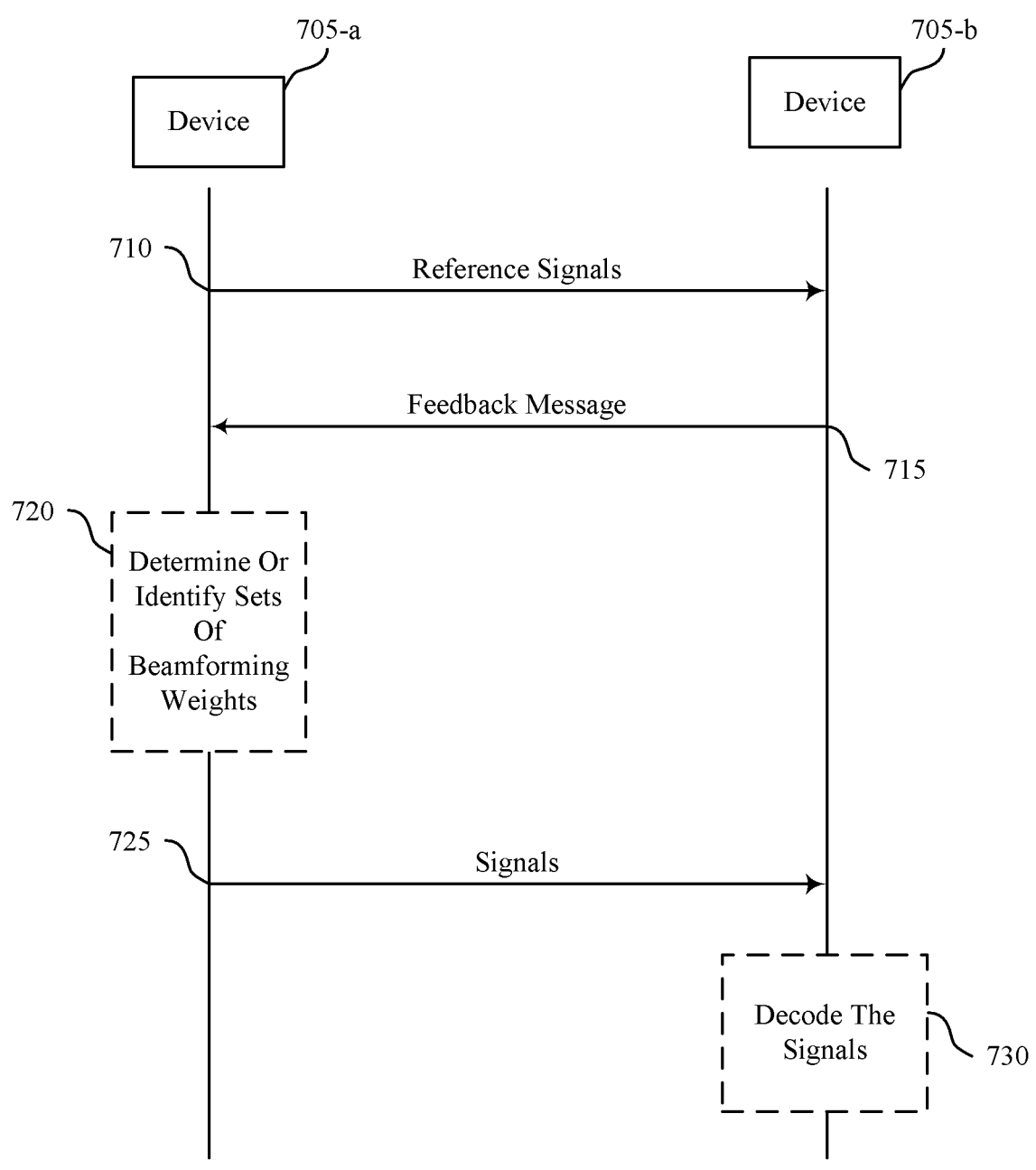
FIG. 7 illustrates an example of a process flow that supports non-integer multiple quantities of transmit and receive antenna subarrays in accordance with aspects of the present disclosure.

FIG. 7 illustrates an example of a process flow 700 that supports non-integer multiple quantities of transmit and receive antenna subarrays in accordance with aspects of the present disclosure. The process flow 700 may implement or be implemented by aspects of the wireless communications systems 100 and 200 or the antenna array configurations 300, 400, or 600. For example, the process flow 700 illustrates OAM communications between a device 705-*a* and a device 705-*b*, which may represent aspects of corresponding devices or network nodes as described with reference to FIGS. 2-6. The devices 705 may be UEs, base stations, IAB nodes, RUs, CUs, DUs, any other network node, or any combination thereof, that support OAM communications.

The device 705-*a* may include a first circular antenna array including a first quantity of antenna subarrays and the device 705-*b* may include a second circular antenna array including a second quantity of antenna subarrays, where the first and second quantities are different. Each antenna subarray may include one or more antenna elements. In some aspects, the first and second quantities of antenna subarrays may not be integer multiples of on another. In some aspects, the first and second quantities of antenna subarrays may be mutually prime.

In the following description of the process flow 700, the operations between the device 705-*a* and the device 705-*b* may be performed in different orders or at different times. Some operations may also be left out of the process flow 700, or other operations may be added. Although the device 705-*a* and the device 705-*b* are shown performing the operations of the process flow 700, some aspects of some operations may also be performed by one or more other wireless devices.

At 710, the device 705-*a* may transmit one or more reference signals to the device 705-*b*. The device 705-*a* may transmit the one or more reference signals using one or more antenna subarrays or antenna elements of the first circular antenna array. The device 705-*b* may receive the one or more reference signals using one or more antenna subarrays or antenna elements of the second circular antenna array. The reference signals may include CSI reference signals, SRSs, or any other type of reference signals.

At 715, the device 705-*b* may transmit a feedback message to the device 705-*a* based on the one or more reference signals. The feedback message may indicate multiple sets of beamforming weights (e.g., beamforming vectors) or information for determining the multiple sets of beamforming weights. The multiple sets of beamforming weights may be based on the second quantity of antenna subarrays in the receiver circle at the device 705-*b* being different than the first quantity of antenna subarrays in the transmitter circle at the device 705-*a*. In some aspects, the first and second quantities may not be integer multiples. In some aspects, the first and second quantities may be mutually prime.

At 720, in some aspects, the device 705-*a* may determine or identify the multiple sets of beamforming weights. For example, the device 705-*a* may identify the multiple sets of beamforming weights based on the indication of the beamforming weights via the feedback message. Additionally or alternatively, the device 705-*a* may determine the multiple sets of beamforming weights based on the information indicated via the feedback message. Each set of beamforming weights may, in some aspects, correspond to singular vectors of a channel response matrix that is based on the one or more reference signals. The device 705-*b* may calculate the singular vectors based on the channel response matrix and indicate the singular vectors via the feedback message. Alternatively, the device 705-*b* may indicate the channel response matrix via the feedback message, and the device 705-*a* may calculate the singular vectors based on the channel response matrix. In some other aspects, the information in the feedback message may include an indication of multiple weighting factors for combining sets of OAM weights to form multiple sets of OAM weights (e.g., OAM weighting vectors), as described with reference to FIG. 5. Each set of OAM weights may correspond to a respective set of beamforming weights (e.g., an approximate beamforming vector). The device 705-*a* may combine OAM weights to form the sets of beamforming weights.

At 725, the device 705-*a* may transmit one or more signals concurrently to the device 705-*b* based on the multiple sets of beamforming weights. The device 705-*a* may transmit the one or more signals using the transmitter circle, and the device 705-*b* may receive the one or more signals using the receiver circle. Each signal of the one or more signals may be associated with a respective set of beamforming weights of the multiple sets of beamforming weights. For example, the device 705-*a* may apply, for each signal, the respective set of beamforming weights for the signal to the first quantity of antenna subarrays within the transmitter circle. A quantity of beamforming weights within the respective set of beamforming weights may be equal to the first quantity of antenna subarrays in the transmitter circle. At 730, in some aspects, the device 705-*b* may decode the one or more signals using the receiver circle and the sets of beamforming weights.

The first device 705-*a* and the second device 705-*b* may thereby support OAM beamforming and multiplexing using transmitter and receiver circles that include different quantities of antenna subarrays that are non-integer multiples to reduce the effects of aliasing.

Figure 8:
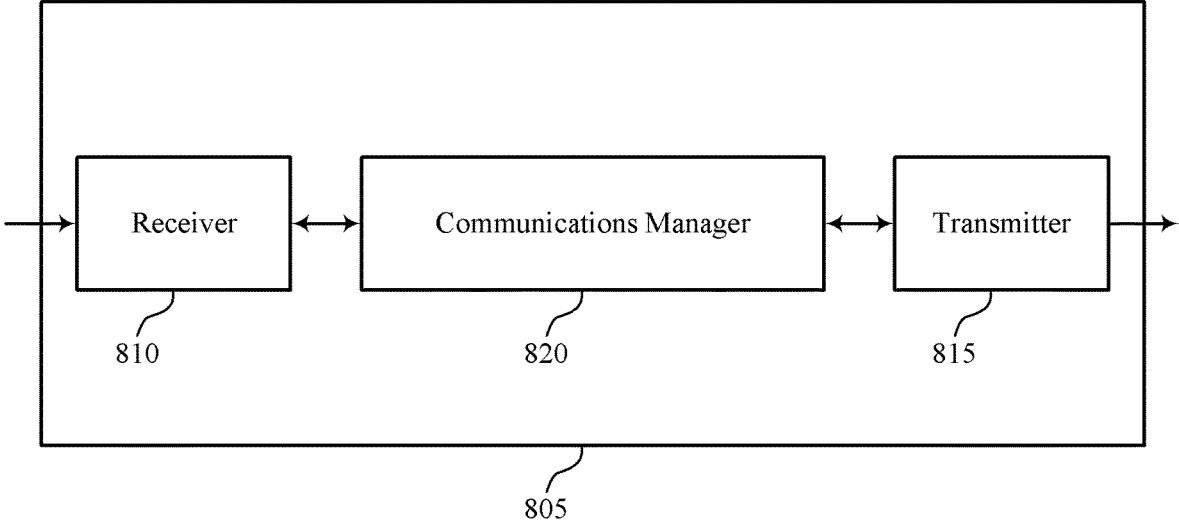
FIGS. 8 and 9 show block diagrams of devices that support non-integer multiple quantities of transmit and receive antenna subarrays in accordance with aspects of the present disclosure.

FIG. 8 shows a block diagram 800 of a device 805 that supports non-integer multiple quantities of transmit and receive antenna subarrays in accordance with aspects of the present disclosure. The device 805 may be an example of aspects of a UE 115 or a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to non-integer multiple quantities of transmit and receive antenna subarrays). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to non-integer multiple quantities of transmit and receive antenna subarrays). In some aspects, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be aspects of means for performing various aspects of non-integer multiple quantities of transmit and receive antenna subarrays as described herein. For example, the communications manager 820, the receiver 810, the transmitter 815, or various combinations or components thereof may support a method for performing one or more of the functions described herein.

In some aspects, the communications manager 820, the receiver 810, the transmitter 815, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some aspects, a processor and memory coupled with the processor may be configured to perform one or more of the functions described herein (e.g., by executing, by the processor, instructions stored in the memory).

Additionally or alternatively, in some aspects, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some aspects, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a first network node in accordance with aspects as disclosed herein. For example, the communications manager 820 may be configured as or otherwise support a means for transmitting one or more reference signals to a second network node using a first circular antenna array that includes a first quantity of antenna subarrays, where each antenna subarray of the first circular antenna array includes one or more antenna elements. The communications manager 820 may be configured as or otherwise support a means for receiving, from the second network node based on the one or more reference signals, a feedback message that indicates multiple sets of beamforming weights or information for determining the multiple sets of beamforming weights, where the multiple sets of beamforming weights are based on a second circular antenna array at the second network node including a second quantity of antenna subarrays that is different than the first quantity of antenna subarrays included in the first circular antenna array. The communications manager 820 may be configured as or otherwise support a means for transmitting one or more signals concurrently to the second network node using the first circular antenna array and based on the multiple sets of beamforming weights, where each signal of the one or more signals is associated with a respective set of beamforming weights of the multiple sets of beamforming weights.

Additionally or alternatively, the communications manager 820 may support wireless communication at a second network node in accordance with aspects as disclosed herein. For example, the communications manager 820 may be configured as or otherwise support a means for receiving one or more reference signals from a first network node using a second circular antenna array that includes a second quantity of antenna subarrays, where each antenna subarray of the second circular antenna array includes one or more antenna elements. The communications manager 820 may be configured as or otherwise support a means for transmitting, to the first network node based on the one or more reference signals, a feedback message that indicates multiple sets of beamforming weights or information for determining the multiple sets of beamforming weights, where the multiple sets of beamforming weights are based on a first circular antenna array at the first network node including a first quantity of antenna subarrays that is different than the second quantity of antenna subarrays included in the second circular antenna array. The communications manager 820 may be configured as or otherwise support a means for receiving one or more signals concurrently from the first network node using the second circular antenna array and based on the multiple sets of beamforming weights, where each signal of the one or more signals is associated with a respective set of beamforming weights of the multiple sets of beamforming weights.

By including or configuring the communications manager 820 in accordance with aspects as described herein, the device 805 (e.g., a processor controlling or otherwise coupled to the receiver 810, the transmitter 815, the communications manager 820, or a combination thereof) may support techniques for reduced processing, reduced complexity, reduced power consumption, and more efficient utilization of communication resources, and higher throughput. For example, the device 805 may include a first quantity of antenna subarrays and may support communications with a second device that includes a second quantity of antenna subarrays. The first and second quantities may not be integer multiples. By supporting communications between such devices, effects of aliasing may be reduced, which may improve throughput of communications and reduce processing and complexity associated with decoding the communications by the processor of the device 805. The processor may thereby perform more accurate and efficient channel decoding to reduce power consumption and improve communication reliability. Additionally or alternatively, the processor of the device 805 may support approximation of beamforming vectors based on a weighted average of one or more OAM vectors. Such approximation techniques may reduce complexity and processing as compared with techniques in which the processor solves a channel response matrix. In some aspects, an angular offset may be configured between an antenna subarray of the device 805 and an antenna subarray of the other device, which may reduce aliasing, improve throughput, and improve data rates.

Figure 9:
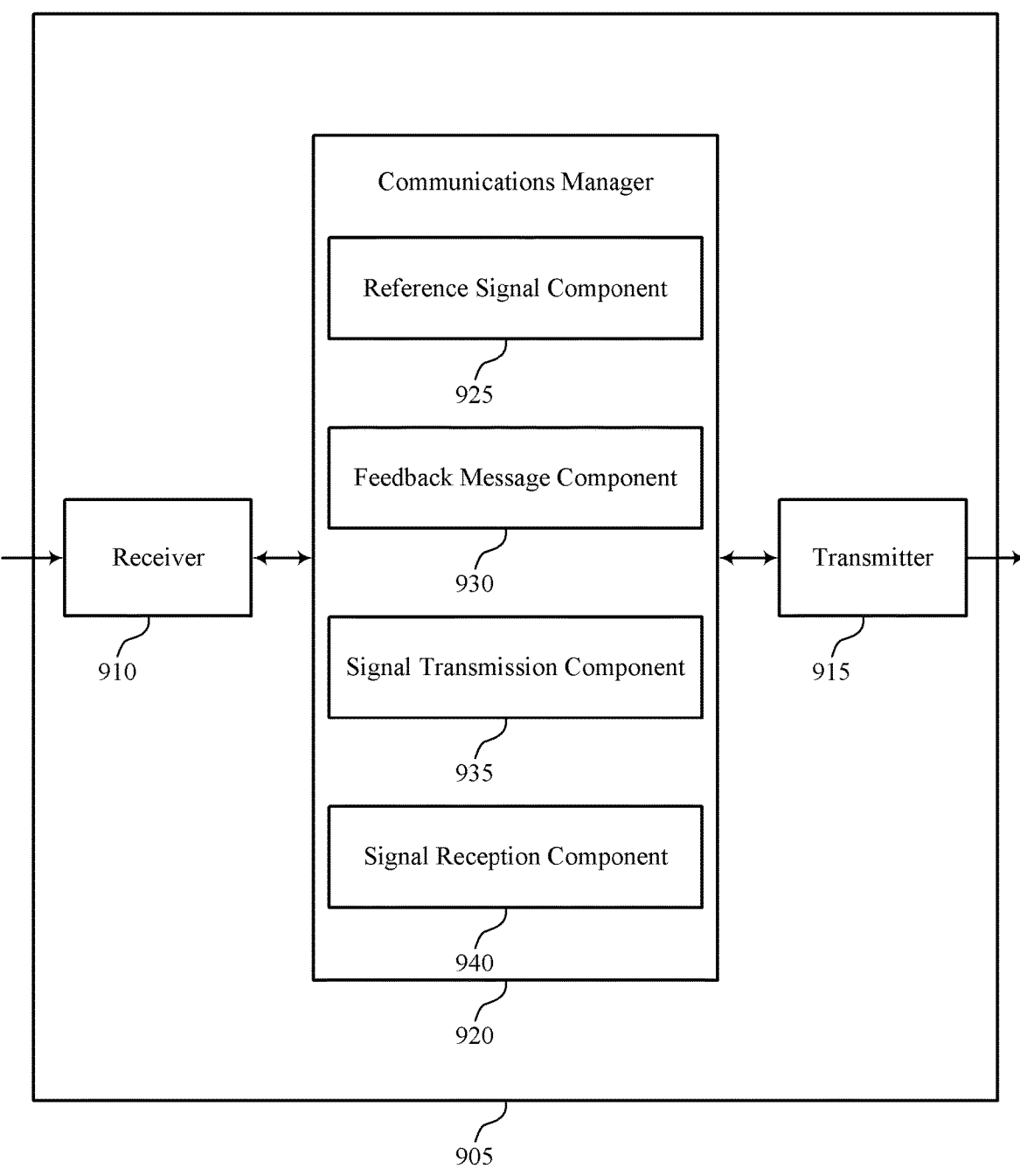

FIG. 9 shows a block diagram 900 of a device 905 that supports non-integer multiple quantities of transmit and receive antenna subarrays in accordance with aspects of the present disclosure. The device 905 may be an example of aspects of a device 805, a UE 115, or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to non-integer multiple quantities of transmit and receive antenna subarrays). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to non-integer multiple quantities of transmit and receive antenna subarrays). In some aspects, the transmitter 915 may be co-located with a receiver 910 in a transceiver module. The transmitter 915 may utilize a single antenna or a set of multiple antennas.

The device 905, or various components thereof, may be an example of means for performing various aspects of non-integer multiple quantities of transmit and receive antenna subarrays as described herein. For example, the communications manager 920 may include a reference signal component 925, a feedback message component 930, a signal transmission component 935, a signal reception component 940, or any combination thereof. The communications manager 920 may be an example of aspects of a communications manager 820 as described herein. In some aspects, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a first network node in accordance with aspects as disclosed herein. The reference signal component 925 may be configured as or otherwise support a means for transmitting one or more reference signals to a second network node using a first circular antenna array that includes a first quantity of antenna subarrays, where each antenna subarray of the first circular antenna array includes one or more antenna elements. The feedback message component 930 may be configured as or otherwise support a means for receiving, from the second network node based on the one or more reference signals, a feedback message that indicates multiple sets of beamforming weights or information for determining the multiple sets of beamforming weights, where the multiple sets of beamforming weights are based on a second circular antenna array at the second network node including a second quantity of antenna subarrays that is different than the first quantity of antenna subarrays included in the first circular antenna array. The signal transmission component 935 may be configured as or otherwise support a means for transmitting one or more signals concurrently to the second network node using the first circular antenna array and based on the multiple sets of beamforming weights, where each signal of the one or more signals is associated with a respective set of beamforming weights of the multiple sets of beamforming weights.

Additionally or alternatively, the communications manager 920 may support wireless communication at a second network node in accordance with aspects as disclosed herein. The reference signal component 925 may be configured as or otherwise support a means for receiving one or more reference signals from a first network node using a second circular antenna array that includes a second quantity of antenna subarrays, where each antenna subarray of the second circular antenna array includes one or more antenna elements. The feedback message component 930 may be configured as or otherwise support a means for transmitting, to the first network node based on the one or more reference signals, a feedback message that indicates multiple sets of beamforming weights or information for determining the multiple sets of beamforming weights, where the multiple sets of beamforming weights are based on a first circular antenna array at the first network node including a first quantity of antenna subarrays that is different than the second quantity of antenna subarrays included in the second circular antenna array. The signal reception component 940 may be configured as or otherwise support a means for receiving one or more signals concurrently from the first network node using the second circular antenna array and based on the multiple sets of beamforming weights, where each signal of the one or more signals is associated with a respective set of beamforming weights of the multiple sets of beamforming weights.

Figure 10:
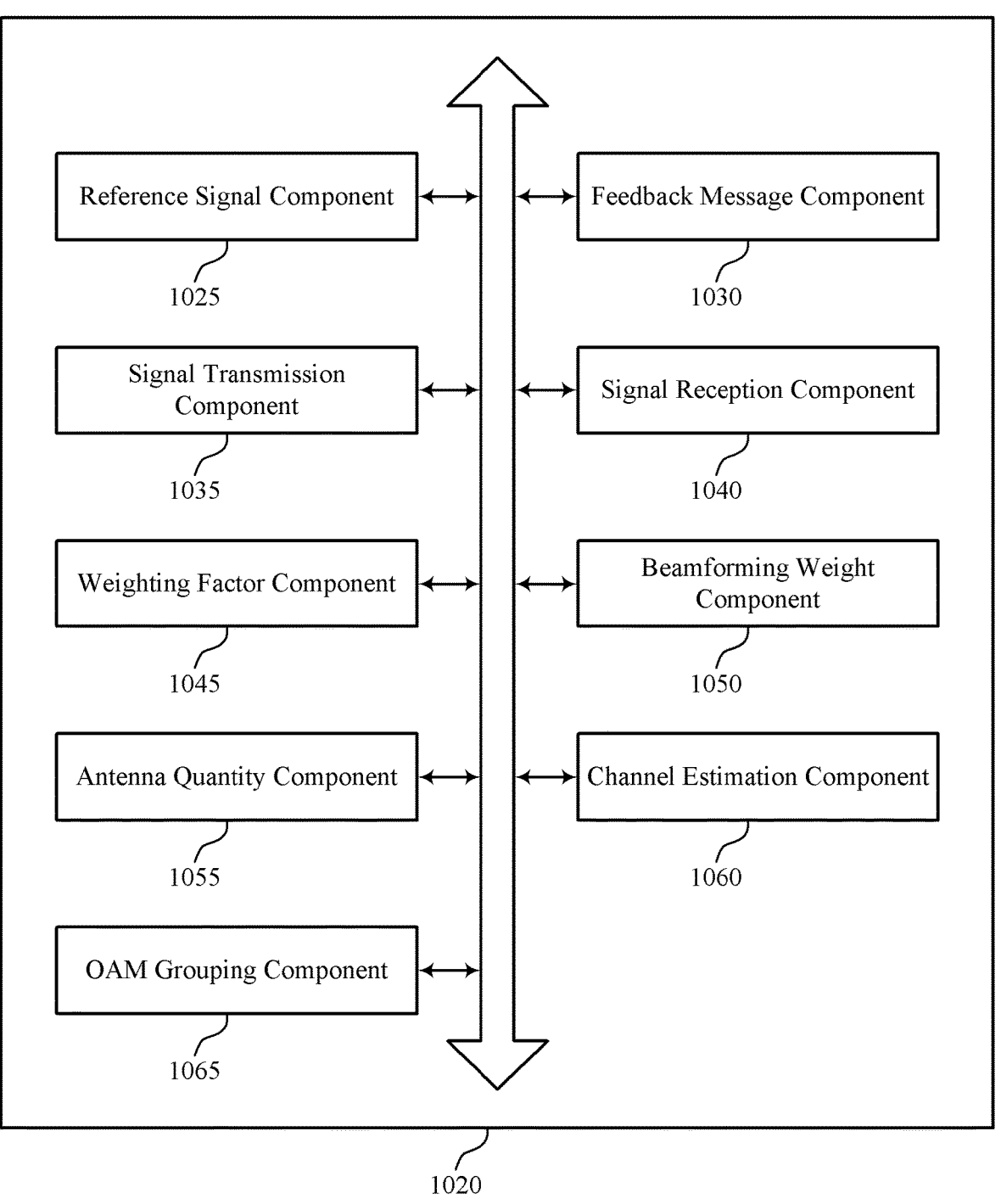
FIG. 10 shows a block diagram of a communications manager that supports non-integer multiple quantities of transmit and receive antenna subarrays in accordance with aspects of the present disclosure.

FIG. 10 shows a block diagram 1000 of a communications manager 1020 that supports non-integer multiple quantities of transmit and receive antenna subarrays in accordance with aspects of the present disclosure. The communications manager 1020 may be an example of aspects of a communications manager 820, a communications manager 920, or both, as described herein. The communications manager 1020, or various components thereof, may be an example of means for performing various aspects of non-integer multiple quantities of transmit and receive antenna subarrays as described herein. For example, the communications manager 1020 may include a reference signal component 1025, a feedback message component 1030, a signal transmission component 1035, a signal reception component 1040, a weighting factor component 1045, a beamforming weight component 1050, an antenna quantity component 1055, a channel estimation component 1060, an OAM grouping component 1065, or any combination thereof. Each of these components may communicate, directly or indirectly, with one another (e.g., via one or more buses).

The communications manager 1020 may support wireless communication at a first network node in accordance with aspects as disclosed herein. The reference signal component 1025 may be configured as or otherwise support a means for transmitting one or more reference signals to a second network node using a first circular antenna array that includes a first quantity of antenna subarrays, where each antenna subarray of the first circular antenna array includes one or more antenna elements. In some aspects, the feedback message component 1030 may be configured as or otherwise support a means for receiving, from the second network node based on the one or more reference signals, a feedback message that indicates multiple sets of beamforming weights or information for determining the multiple sets of beamforming weights, where the multiple sets of beamforming weights are based on a second circular antenna array at the second network node including a second quantity of antenna subarrays that is different than the first quantity of antenna subarrays included in the first circular antenna array. In some aspects, the signal transmission component 1035 may be configured as or otherwise support a means for transmitting one or more signals concurrently to the second network node using the first circular antenna array and based on the multiple sets of beamforming weights, where each signal of the one or more signals is associated with a respective set of beamforming weights of the multiple sets of beamforming weights.

In some aspects, the weighting factor component 1045 may be configured as or otherwise support a means for determining the multiple sets of beamforming weights based on the information indicated via the feedback message and the first quantity of antenna subarrays within the first circular antenna array being different than the second quantity of antenna subarrays within the second circular antenna array, where the information indicates a set of multiple weighting factors for combining sets of OAM weights to form the multiple sets of beamforming weights, and where each set of beamforming weights of the multiple sets of beamforming weights corresponds to a respective set of OAM weights of the sets of OAM weights.

In some aspects, to support determining the multiple sets of beamforming weights, the OAM grouping component 1065 may be configured as or otherwise support a means for grouping a second set of multiple sets of OAM weights into a set of multiple groups based on a least common multiple of the first quantity and the second quantity, where the second set of multiple sets of OAM weights includes a first quantity of sets that is equal to the first quantity of antenna subarrays within the first circular antenna array. In some aspects, to support determining the multiple sets of OAM weights, the weighting factor component 1045 may be configured as or otherwise support a means for combining one or more sets of OAM weights in each group of the set of multiple groups based on the set of multiple weighting factors to obtain the multiple sets of beamforming weights, where the multiple sets of beamforming weights includes a second quantity of sets that is equal to the second quantity of antenna subarrays within the second circular antenna array.

In some aspects, each weighting factor of the set of multiple weighting factors corresponds to a DFT value for a channel response associated with a channel between the first network node and the second network node, the channel response based on the one or more reference signals. In some aspects, the set of multiple weighting factors includes weighting factors associated with each combination of a respective first set of OAM weights of a first set of multiple sets of OAM weights associated with the first network node and a respective second set of OAM weights of a second set of multiple OAM weights associated with the second network node.

In some aspects, the beamforming weight component 1050 may be configured as or otherwise support a means for determining the multiple sets of beamforming weights based on the information indicated via the feedback message, where the information indicates a channel response matrix associated with a channel between the first network node and the second network node, the channel response matrix based on the one or more reference signals. In some aspects, to support determining the multiple sets of beamforming weights, the beamforming weight component 1050 may be configured as or otherwise support a means for calculating a set of multiple singular vectors of the channel response matrix, where each singular vector of the set of multiple singular vectors corresponds to a respective set of beamforming weights of the multiple sets of beamforming weights.

In some aspects, the feedback message indicates the multiple sets of beamforming weights. In some aspects, each set of beamforming weights of the multiple sets of beamforming weights corresponds to a singular vector of a channel response matrix associated with a channel between the first network node and the second network node, the channel response matrix based on the one or more reference signals.

In some aspects, the antenna quantity component 1055 may be configured as or otherwise support a means for transmitting, to the second network node, signaling that indicates the first quantity of antenna subarrays within the first circular antenna array of the first network node. In some aspects, the antenna quantity component 1055 may be configured as or otherwise support a means for receiving, from the second network node, signaling that indicates the second quantity of antenna subarrays within the second circular antenna array of the second network node.

In some aspects, the antenna quantity component 1055 may be configured as or otherwise support a means for adjusting the first quantity of antenna subarrays within the first circular antenna array based on a condition of a channel between the first network node and the second network node, a type of the first network node, a capability of the first network node, power consumption of the first network node, or any combination thereof.

In some aspects, each antenna subarray of the first quantity of antenna subarrays within the first circular antenna array of the first network node is located at a respective first angular offset relative to a first axis that bisects the first circular antenna array. In some aspects, each antenna subarray of the second quantity of antenna subarrays within the second circular antenna array of the second network node is located at a respective second angular offset relative to a second axis that bisects the second circular antenna array and is parallel to the first axis, each respective second angular offset different than each respective first angular offset. In some aspects, a difference between the respective first angular offset for a first antenna subarray of the first quantity of antenna subarrays and the respective second angular offset for a second antenna subarray of the second quantity of antenna subarrays is based on the first quantity of antenna subarrays.

In some aspects, the first quantity of antenna subarrays included in the first circular antenna array is not an integer multiple of the second quantity of antenna subarrays included in the second circular antenna array. In some aspects, the second quantity of antenna subarrays included in the second circular antenna array is not an integer multiple of the first quantity of antenna subarrays included in the first circular antenna array. In some aspects, the first quantity of antenna subarrays included in the first circular antenna array and the second quantity of antenna subarrays included in the second circular antenna array are mutually prime.

In some aspects, to support transmitting the one or more signals, the beamforming weight component 1050 may be configured as or otherwise support a means for applying, for each signal of the one or more signals, the respective set of beamforming weights for the signal to the first quantity of antenna subarrays within the first circular antenna array, where a quantity of beamforming weights in each set of the multiple sets of beamforming weights is equal to the first quantity of antenna subarrays in the first circular antenna array. In some aspects, to support transmitting the one or more signals, the signal transmission component 1035 may be configured as or otherwise support a means for transmitting the one or more signals using the first circular antenna array based on applying the respective set of beamforming weights for each signal, where the respective set of beamforming weights corresponds to a respective set of OAM weights of multiple sets of OAM weights.

Additionally or alternatively, the communications manager 1020 may support wireless communication at a second device in accordance with aspects as disclosed herein. In some aspects, the reference signal component 1025 may be configured as or otherwise support a means for receiving one or more reference signals from a first network node using a second circular antenna array that includes a second quantity of antenna subarrays, where each antenna subarray of the second circular antenna array includes one or more antenna elements. In some aspects, the feedback message component 1030 may be configured as or otherwise support a means for transmitting, to the first network node based on the one or more reference signals, a feedback message that indicates multiple sets of beamforming weights or information for determining the multiple sets of beamforming weights, where the multiple sets of beamforming weights are based on a first circular antenna array at the first network node including a first quantity of antenna subarrays that is different than the second quantity of antenna subarrays included in the second circular antenna array. The signal reception component 1040 may be configured as or otherwise support a means for receiving one or more signals concurrently from the first network node using the second circular antenna array and based on the multiple sets of beamforming weights, where each signal of the one or more signals is associated with a respective set of beamforming weights of the multiple sets of beamforming weights.

In some aspects, the weighting factor component 1045 may be configured as or otherwise support a means for transmitting the feedback message including the information for determining the multiple sets of beamforming weights, where the information indicates a set of multiple weighting factors for combining sets of OAM weights to form the multiple sets of beamforming weights based on the first quantity of antenna subarrays within the first circular antenna array being different than the second quantity of antenna subarrays within the second circular antenna array, and where each set of beamforming weights of the multiple sets of beamforming weights corresponds to a respective set of OAM weights of the sets of OAM weights.

In some aspects, the channel estimation component 1060 may be configured as or otherwise support a means for estimating a channel response associated with a channel between the first network node and the second network node based on the one or more reference signals. In some aspects, the weighting factor component 1045 may be configured as or otherwise support a means for calculating a set of multiple DFT values for the channel response, where each weighting factor of the set of multiple weighting factors corresponds to a respective DFT value of the set of multiple DFT values.

In some aspects, the set of multiple weighting factors includes weighting factors associated with each combination of a respective first set of OAM weights of a first set of multiple sets of OAM weights associated with the first network node and a respective second set of OAM weights of a second set of multiple OAM weights associated with the second network node.

In some aspects, the channel estimation component 1060 may be configured as or otherwise support a means for estimating a channel response matrix associated with a channel between the first network node and the second network node based on the one or more reference signals. In some aspects, the feedback message component 1030 may be configured as or otherwise support a means for transmitting the feedback message including the information for determining the multiple sets of beamforming weights, where the information includes an indication of the channel response matrix. In some aspects, each set of beamforming weights of the multiple sets of beamforming weights corresponds to a respective singular vector of a set of multiple singular vectors of the channel response matrix.

In some aspects, the channel estimation component 1060 may be configured as or otherwise support a means for estimating a channel response matrix associated with a channel between the first network node and the second network node based on the one or more reference signals. In some aspects, the beamforming weight component 1050 may be configured as or otherwise support a means for calculating a set of multiple singular vectors of the channel response matrix, where each singular vector of the set of multiple singular vectors corresponds to a respective set of beamforming weights of the multiple sets of beamforming weights. In some aspects, the feedback message component 1030 may be configured as or otherwise support a means for transmitting the feedback message that indicates the multiple sets of beamforming weights based on calculating the set of multiple singular vectors.

In some aspects, the antenna quantity component 1055 may be configured as or otherwise support a means for receiving, from the first network node, signaling that indicates the first quantity of antenna subarrays within the first circular antenna array of the first device. In some aspects, the antenna quantity component 1055 may be configured as or otherwise support a means for transmitting, to the first network node, signaling that indicates the second quantity of antenna subarrays within the second circular antenna array of the second network node.

In some aspects, the antenna quantity component 1055 may be configured as or otherwise support a means for adjusting the second quantity of antenna subarrays within the second circular antenna array based on a condition of a channel between the first network node and the second network node, a type of the second network node, a capability of the second network node, power consumption of the second network node, or any combination thereof.

In some aspects, each antenna subarray of the first quantity of antenna subarrays within the first circular antenna array of the first network node is located at a respective first angular offset relative to a first axis that bisects the first circular antenna array. In some aspects, each antenna subarray of the second quantity of antenna subarrays within the second circular antenna array of the second network node is located at a respective second angular offset relative to a second axis that bisects the second circular antenna array and is parallel to the first axis, each respective second angular offset different than each respective first angular offset. In some aspects, a difference between the respective first angular offset for a first antenna subarray of the first quantity of antenna subarrays and the respective second angular offset for a second antenna subarray of the second quantity of antenna subarrays is based on the first quantity of antenna subarrays.

Figure 11:
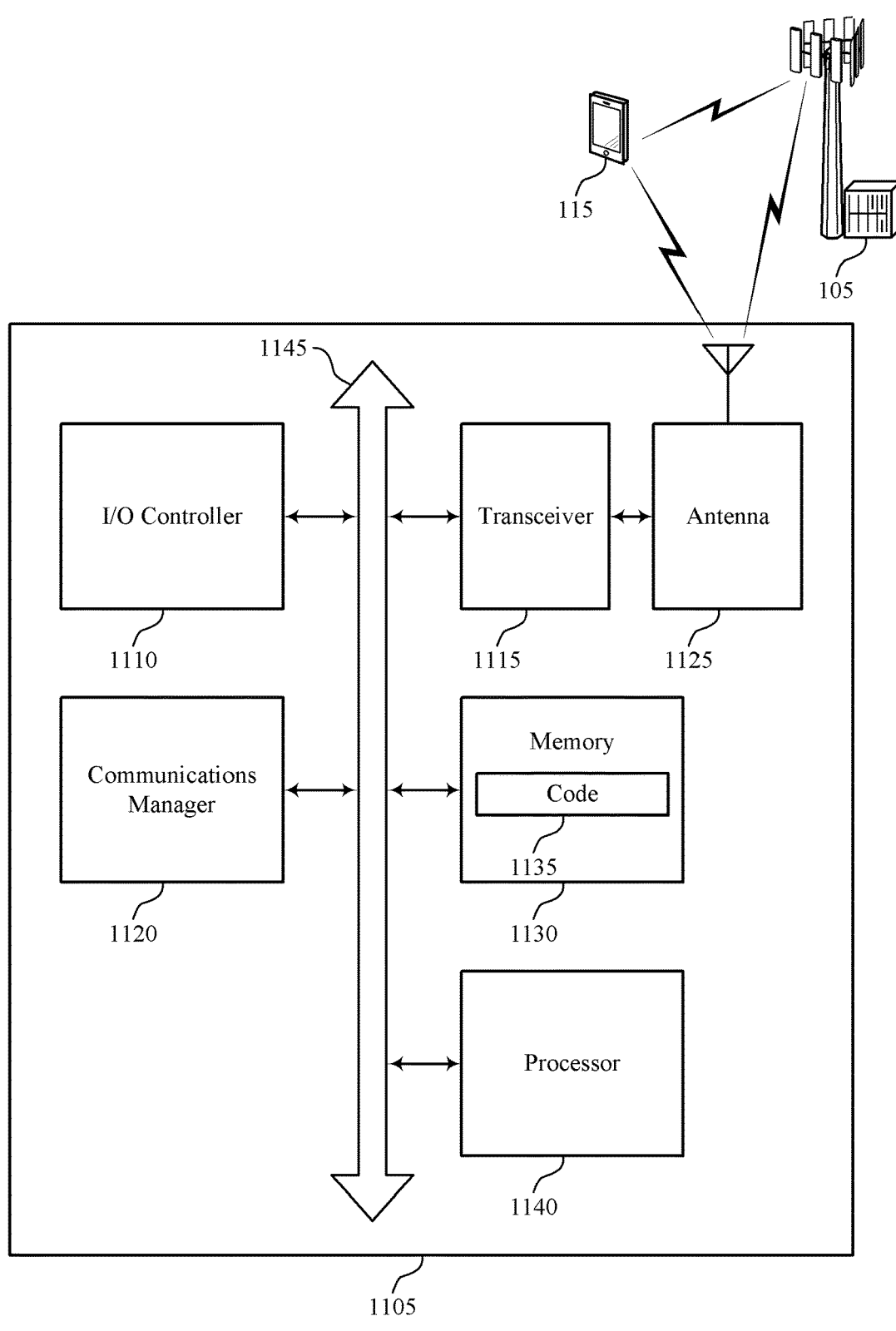
FIG. 11 shows a diagram of a system including a UE that supports non-integer multiple quantities of transmit and receive antenna subarrays in accordance with aspects of the present disclosure.

FIG. 11 shows a diagram of a system 1100 including a device 1105 that supports non-integer multiple quantities of transmit and receive antenna subarrays in accordance with aspects of the present disclosure. The device 1105 may be an example of or include the components of a device 805, a device 905, or a UE 115 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting non-integer multiple quantities of transmit and receive antenna subarrays). For example, the device 1105 or a component of the device 1105 may include a processor 1140 and memory 1130 coupled to the processor 1140, the processor 1140 and memory 1130 configured to perform various functions described herein.

The communications manager 1120 may support wireless communication at a first network node in accordance with aspects as disclosed herein. For example, the communications manager 1120 may be configured as or otherwise support a means for transmitting one or more reference signals to a second network node using a first circular antenna array that includes a first quantity of antenna subarrays, where each antenna subarray of the first circular antenna array includes one or more antenna elements. The communications manager 1120 may be configured as or otherwise support a means for receiving, from the second network node based on the one or more reference signals, a feedback message that indicates multiple sets of beamforming weights or information for determining the multiple sets of beamforming weights, where the multiple sets of beamforming weights are based on a second circular antenna array at the second network node including a second quantity of antenna subarrays that is different than the first quantity of antenna subarrays included in the first circular antenna array. The communications manager 1120 may be configured as or otherwise support a means for transmitting one or more signals concurrently to the second network node using the first circular antenna array and based on the multiple sets of beamforming weights, where each signal of the one or more signals is associated with a respective set of beamforming weights of the multiple sets of beamforming weights.

Additionally or alternatively, the communications manager 1120 may support wireless communication at a second network node in accordance with aspects as disclosed herein. For example, the communications manager 1120 may be configured as or otherwise support a means for receiving one or more reference signals from a first network node using a second circular antenna array that includes a second quantity of antenna subarrays, where each antenna subarray of the second circular antenna array includes one or more antenna elements. The communications manager 1120 may be configured as or otherwise support a means for transmitting, to the first network node based on the one or more reference signals, a feedback message that indicates multiple sets of beamforming weights or information for determining the multiple sets of beamforming weights, where the multiple sets of beamforming weights are based on a first circular antenna array at the first network node including a first quantity of antenna subarrays that is different than the second quantity of antenna subarrays included in the second circular antenna array. The communications manager 1120 may be configured as or otherwise support a means for receiving one or more signals concurrently from the first network node using the second circular antenna array and based on the multiple sets of beamforming weights, where each signal of the one or more signals is associated with a respective set of beamforming weights of the multiple sets of beamforming weights.

By including or configuring the communications manager 1120 in accordance with aspects as described herein, the device 1105 may support techniques for improved communication reliability, improved throughput, reduced power consumption, more efficient utilization of communication resources, improved coordination between devices, and longer battery life. For example, the device 1105 may include a first quantity of antenna subarrays and may support communications with a second device that includes a second quantity of antenna subarrays. The first and second quantities may not be integer multiples. By supporting communications between such devices, effects of aliasing may be reduced, which may improve throughput of communications and reduce processing and complexity associated with decoding the communications. Additionally or alternatively, the device 1105 may support approximation of beamforming vectors based on a weighted average of one or more OAM vectors. Such approximation techniques may reduce complexity and processing as compared with techniques in which the processor solves a channel response matrix. In some aspects, the device 1105 may transmit or receive a feedback message from a second device that indicates the beamforming vectors or information for the device 1105 to use to determine the beamforming vectors. The feedback information may improve coordination between devices, reduce latency, and reduce processing. For example, the device 1105 may refrain from performing one or more calculations if the feedback message indicates the beamforming vectors. In some aspects, an angular offset may be configured between an antenna subarray of the device 1105 and an antenna subarray of the other device, which may reduce aliasing, improve throughput, and improve data rates.

In some aspects, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some aspects, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of non-integer multiple quantities of transmit and receive antenna subarrays as described herein, or the processor 1140 and the memory 1130 may be otherwise configured to perform or support such operations.

Figure 12:
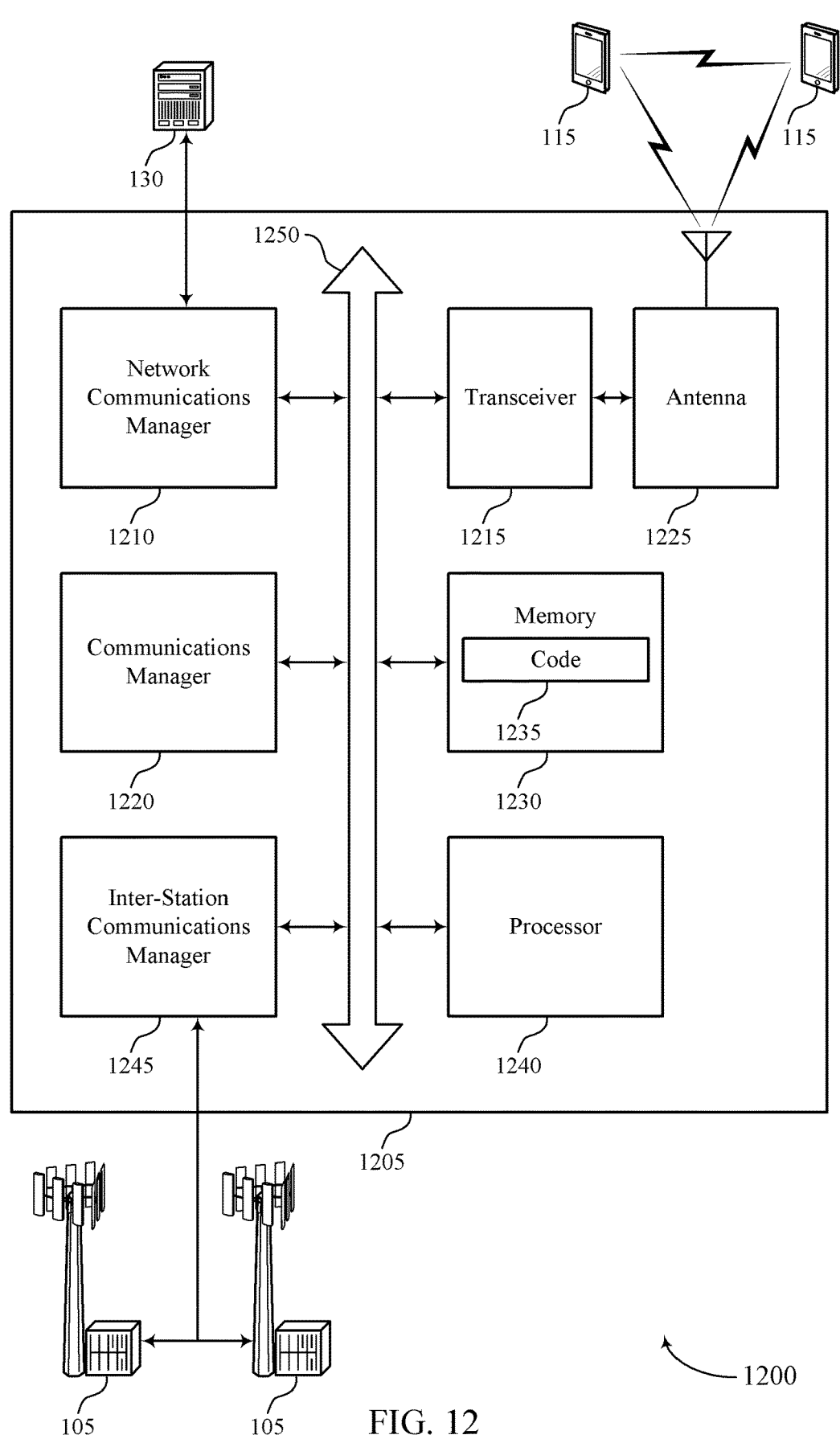
FIG. 12 shows a diagram of a system including a base station that supports non-integer multiple quantities of transmit and receive antenna subarrays in accordance with aspects of the present disclosure.

FIG. 12 shows a diagram of a system 1200 including a device 1205 that supports non-integer multiple quantities of transmit and receive antenna subarrays in accordance with aspects of the present disclosure. The device 1205 may be an example of or include the components of a device 805, a device 905, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter

815, a transmitter 915, a receiver 810, a receiver 910, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting non-integer multiple quantities of transmit and receive antenna subarrays). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some aspects, the inter-station communications manager 1245 may provide an X2 interface within an LTE/LTE-A wireless communications network technology to provide communication between base stations 105.

The communications manager 1220 may support wireless communication at a first network node in accordance with aspects as disclosed herein. For example, the communications manager 1220 may be configured as or otherwise support a means for transmitting one or more reference signals to a second network node using a first circular antenna array that includes a first quantity of antenna subarrays, where each antenna subarray of the first circular antenna array includes one or more antenna elements. The communications manager 1220 may be configured as or otherwise support a means for receiving, from the second network node based on the one or more reference signals, a feedback message that indicates multiple sets of beamforming weights or information for determining the multiple sets of beamforming weights, where the multiple sets of beamforming weights are based on a second circular antenna array at the second network node including a second quantity of antenna subarrays that is different than the first quantity of antenna subarrays included in the first circular antenna array. The communications manager 1220 may be configured as or otherwise support a means for transmitting one or more signals concurrently to the second network node using the first circular antenna array and based on the multiple sets of beamforming weights, where each signal of the one or more signals is associated with a respective set of beamforming weights of the multiple sets of beamforming weights.

Additionally or alternatively, the communications manager 1220 may support wireless communication at a second network node in accordance with aspects as disclosed herein. For example, the communications manager 1220 may be configured as or otherwise support a means for receiving one or more reference signals from a first network node using a second circular antenna array that includes a second quantity of antenna subarrays, where each antenna subarray of the second circular antenna array includes one or more antenna elements. The communications manager 1220 may be configured as or otherwise support a means for transmitting, to the first network node based on the one or more reference signals, a feedback message that indicates multiple sets of beamforming weights or information for determining the multiple sets of beamforming weights, where the multiple sets of beamforming weights are based on a first circular antenna array at the first network node including a first quantity of antenna subarrays that is different than the second quantity of antenna subarrays included in the second circular antenna array. The communications manager 1220 may be configured as or otherwise support a means for receiving one or more signals concurrently from the first network node using the second circular antenna array and based on the multiple sets of beamforming weights, where each signal of the one or more signals is associated with a respective set of beamforming weights of the multiple sets of beamforming weights.

By including or configuring the communications manager 1220 in accordance with aspects as described herein, the device 1205 may support techniques for improved communication reliability, improved throughput, reduced power consumption, more efficient utilization of communication resources, improved coordination between devices, and longer battery life. For example, the device 1205 may include a first quantity of antenna subarrays and may support communications with a second device that includes a second quantity of antenna subarrays. The first and second quantities may not be integer multiples. By supporting communications between such devices, effects of aliasing may be reduced, which may improve throughput of communications and reduce processing and complexity associated with decoding the communications. Additionally or alternatively, the device 1205 may support approximation of beamforming vectors based on a weighted average of one or more OAM vectors. Such approximation techniques may reduce complexity and processing as compared with techniques in which the processor solves a channel response matrix. In some aspects, the device 1205 may transmit or receive a feedback message from a second device that indicates the beamforming vectors or information for the device 1205 to use to determine the beamforming vectors. The feedback information may improve coordination between devices, reduce latency, and reduce processing. For example, the device 1205 may refrain from performing one or more calculations if the feedback message indicates the beamforming vectors. In some aspects, an angular offset may be configured between an antenna subarray of the device 1205 and an antenna subarray of the other device, which may reduce aliasing, improve throughput, and improve data rates.

In some aspects, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some aspects, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of non-integer multiple quantities of transmit and receive antenna subarrays as described herein, or the processor 1240 and the memory 1230 may be otherwise configured to perform or support such operations.

FIG. 13 shows a flowchart illustrating a method 1300 that supports non-integer multiple quantities of transmit and receive antenna subarrays in accordance with aspects of the present disclosure. The operations of the method 1300 may be implemented by a first network node or its components as described herein. For example, the operations of the method 1300 may be performed by a UE 115 or a base station 105 as described with reference to FIGS. 1 through 12. In some aspects, a UE or a base station may execute a set of instructions to control the functional elements of the UE or the base station to perform the described functions. Additionally or alternatively, the UE or the base station may perform aspects of the described functions using special-purpose hardware.

At 1305, the method may include transmitting one or more reference signals to a second network node using a first circular antenna array that includes a first quantity of antenna subarrays, where each antenna subarray of the first circular antenna array includes one or more antenna elements. The operations of 1305 may be performed in accordance with aspects as disclosed herein. In some aspects, aspects of the operations of 1305 may be performed by a reference signal component 1025 as described with reference to FIG. 10.

At 1310, the method may include receiving, from the second network node based on the one or more reference signals, a feedback message that indicates multiple sets of beamforming weights or information for determining the multiple sets of beamforming weights, wherein the multiple sets of beamforming weights are based on a second circular antenna array at the second network node including a second quantity of antenna subarrays that is different than the first quantity of antenna subarrays included in the first circular antenna array. The operations of 1310 may be performed in accordance with aspects as disclosed herein. In some aspects, aspects of the operations of 1310 may be performed by a feedback message component 1030 as described with reference to FIG. 10.

At 1315, the method may include transmitting one or more signals concurrently to the second network node using the first circular antenna array and based on the multiple sets of beamforming weights, where each signal of the one or more signals is associated with a respective set of beamforming weights of the multiple sets of beamforming weights. The operations of 1315 may be performed in accordance with aspects as disclosed herein. In some aspects, aspects of the operations of 1315 may be performed by a signal transmission component 1035 as described with reference to FIG. 10.

FIG. 14 shows a flowchart illustrating a method 1400 that supports non-integer multiple quantities of transmit and receive antenna subarrays in accordance with aspects of the present disclosure. The operations of the method 1400 may be implemented by a UE or a base station or its components as described herein. For example, the operations of the method 1400 may be performed by a UE 115 or a base station 105 as described with reference to FIGS. 1 through 12. In some aspects, a UE or a base station may execute a set of instructions to control the functional elements of the UE or the base station to perform the described functions. Additionally or alternatively, the UE or the base station may perform aspects of the described functions using special-purpose hardware.

At 1405, the method may include transmitting one or more reference signals to a second network node using a first circular antenna array that includes a first quantity of antenna subarrays, where each antenna subarray of the first circular antenna array comprises one or more antenna elements. The operations of 1405 may be performed in accordance with aspects as disclosed herein. In some aspects, aspects of the operations of 1405 may be performed by a reference signal component 1025 as described with reference to FIG. 10.

At 1410, the method may include receiving, from the second network node based on the one or more reference signals, a feedback message that indicates multiple sets of beamforming weights or information for determining the multiple sets of beamforming weights, where the multiple sets of beamforming weights are based on a second circular antenna array at the second network node including a second quantity of antenna subarrays that is different than the first quantity of antenna subarrays included in the first circular antenna array. The operations of 1410 may be performed in accordance with aspects as disclosed herein. In some aspects, aspects of the operations of 1410 may be performed by a feedback message component 1030 as described with reference to FIG. 10.

At 1415, the method may include determining the multiple sets of beamforming weights based on the information indicated via the feedback message, where the information indicates a channel response matrix associated with a channel between the first network node and the second network node, the channel response matrix based on the one or more reference signals. The operations of 1415 may be performed in accordance with aspects as disclosed herein. In some aspects, aspects of the operations of 1415 may be performed by a beamforming weight component 1050 as described with reference to FIG. 10.

At 1420, the method may include transmitting one or more signals concurrently to the second network node using the first circular antenna array and based on the multiple sets of beamforming weights, where each signal of the one or more signals is associated with a respective set of beamforming weights of the multiple sets of beamforming weights. The operations of 1420 may be performed in accordance with aspects as disclosed herein. In some aspects, aspects of the operations of 1420 may be performed by a signal transmission component 1035 as described with reference to FIG. 10.

FIG. 15 shows a flowchart illustrating a method 1500 that supports non-integer multiple quantities of transmit and receive antenna subarrays in accordance with aspects of the present disclosure. The operations of the method 1500 may be implemented by a first network node or its components as described herein. For example, the operations of the method 1500 may be performed by a UE 115 or a base station 105 as described with reference to FIGS. 1 through 12. In some aspects, a UE or a base station may execute a set of instructions to control the functional elements of the UE or the base station to perform the described functions. Additionally or alternatively, the UE or the base station may perform aspects of the described functions using special-purpose hardware.

At 1505, the method may include receiving, from the second network node, signaling that indicates the second quantity of antenna subarrays within the second circular antenna array of the second network node. The operations of 1505 may be performed in accordance with aspects as disclosed herein. In some aspects, aspects of the operations of 1505 may be performed by an antenna quantity component 1055 as described with reference to FIG. 10.

At 1510, the method may include transmitting one or more reference signals to a second network node using a first circular antenna array that includes a first quantity of antenna subarrays, where each antenna subarray of the first circular antenna array includes one or more antenna elements. The operations of 1510 may be performed in accordance with aspects as disclosed herein. In some aspects, aspects of the operations of 1510 may be performed by a reference signal component 1025 as described with reference to FIG. 10.

At 1515, the method may include receiving, from the second network node based on the one or more reference signals, a feedback message that indicates multiple sets of beamforming weights or information for determining the multiple sets of beamforming weights, where the multiple sets of beamforming weights are based on a second circular antenna array at the second network node including a second quantity of antenna subarrays that is different than the first quantity of antenna subarrays included in the first circular antenna array. The operations of 1515 may be performed in accordance with aspects as disclosed herein. In some aspects, aspects of the operations of 1515 may be performed by a feedback message component 1030 as described with reference to FIG. 10.

At 1520, the method may include transmitting one or more signals concurrently to the second network node using the first circular antenna array and based on the multiple sets of beamforming weights, where each signal of the one or more signals is associated with a respective set of beamforming weights of the multiple sets of beamforming weights. The operations of 1520 may be performed in accordance with aspects as disclosed herein. In some aspects, aspects of the operations of 1520 may be performed by a signal transmission component 1035 as described with reference to FIG. 10.

FIG. 16 shows a flowchart illustrating a method 1600 that supports non-integer multiple quantities of transmit and receive antenna subarrays in accordance with aspects of the present disclosure. The operations of the method 1600 may be implemented by a second network node or its components as described herein. For example, the operations of the method 1600 may be performed by a UE 115 or a base station 105 as described with reference to FIGS. 1 through 12. In some aspects, a UE or a base station may execute a set of instructions to control the functional elements of the UE or the base station to perform the described functions. Additionally or alternatively, the UE or the base station may perform aspects of the described functions using special-purpose hardware.

At 1605, the method may include receiving one or more reference signals from a first network node using a second circular antenna array that includes a second quantity of antenna subarrays, where each antenna subarray of the second circular antenna array includes one or more antenna elements. The operations of 1605 may be performed in accordance with aspects as disclosed herein. In some aspects, aspects of the operations of 1605 may be performed by a reference signal component 1025 as described with reference to FIG. 10.

At 1610, the method may include transmitting, to the first network node based on the one or more reference signals, a feedback message that indicates multiple sets of beamforming weights or information for determining the multiple sets of beamforming weights, where the multiple sets of beamforming weights are based on a first circular antenna array at the first network node including a first quantity of antenna subarrays that is different than the second quantity of antenna subarrays included in the second circular antenna array. The operations of 1610 may be performed in accordance with aspects as disclosed herein. In some aspects, aspects of the operations of 1610 may be performed by a feedback message component 1030 as described with reference to FIG. 10.

At 1615, the method may include receiving one or more signals concurrently from the first network node using the second circular antenna array and based on the multiple sets of beamforming weights, where each signal of the one or more signals is associated with a respective set of beamforming weights of the multiple sets of beamforming weights. The operations of 1615 may be performed in accordance with aspects as disclosed herein. In some aspects, aspects of the operations of 1615 may be performed by a signal reception component 1040 as described with reference to FIG. 10.

FIG. 17 shows a flowchart illustrating a method 1700 that supports non-integer multiple quantities of transmit and receive antenna subarrays in accordance with aspects of the present disclosure. The operations of the method 1700 may be implemented by a UE or a base station or its components as described herein. For example, the operations of the method 1700 may be performed by a UE 115 or a base station 105 as described with reference to FIGS. 1 through 12. In some aspects, a UE or a base station may execute a set of instructions to control the functional elements of the UE or the base station to perform the described functions. Additionally or alternatively, the UE or the base station may perform aspects of the described functions using special-purpose hardware.

At 1705, the method may include receiving one or more reference signals from a first network node using a second circular antenna array that includes a second quantity of antenna subarrays, where each antenna subarray of the second circular antenna array includes one or more antenna elements. The operations of 1705 may be performed in accordance with aspects as disclosed herein. In some aspects, aspects of the operations of 1705 may be performed by a reference signal component 1025 as described with reference to FIG. 10.

At 1710, the method may include estimating a channel response matrix associated with a channel between the first network node and the second network node based on the one or more reference signals. The operations of 1710 may be performed in accordance with aspects as disclosed herein. In some aspects, aspects of the operations of 1710 may be performed by a channel estimation component 1060 as described with reference to FIG. 10.

At 1715, the method may include transmitting, to the first network node based on the one or more reference signals, a feedback message that indicates multiple sets of beamforming weights or information for determining the multiple sets of beamforming weights, where the multiple sets of beamforming weights are based on a first circular antenna array at the first network node including a first quantity of antenna subarrays that is different than the second quantity of antenna subarrays included in the second circular antenna array. The operations of 1715 may be performed in accordance with aspects as disclosed herein. In some aspects, aspects of the operations of 1715 may be performed by a feedback message component 1030 as described with reference to FIG. 10.

At 1720, the method may include receiving one or more signals concurrently from the first network node using the second circular antenna array and based on the multiple sets of beamforming weights, where each signal of the one or more signals is associated with a respective set of beamforming weights of the multiple sets of beamforming weights. The operations of 1720 may be performed in accordance with aspects as disclosed herein. In some aspects, aspects of the operations of 1720 may be performed by a signal reception component 1040 as described with reference to FIG. 10.

Figure 18:
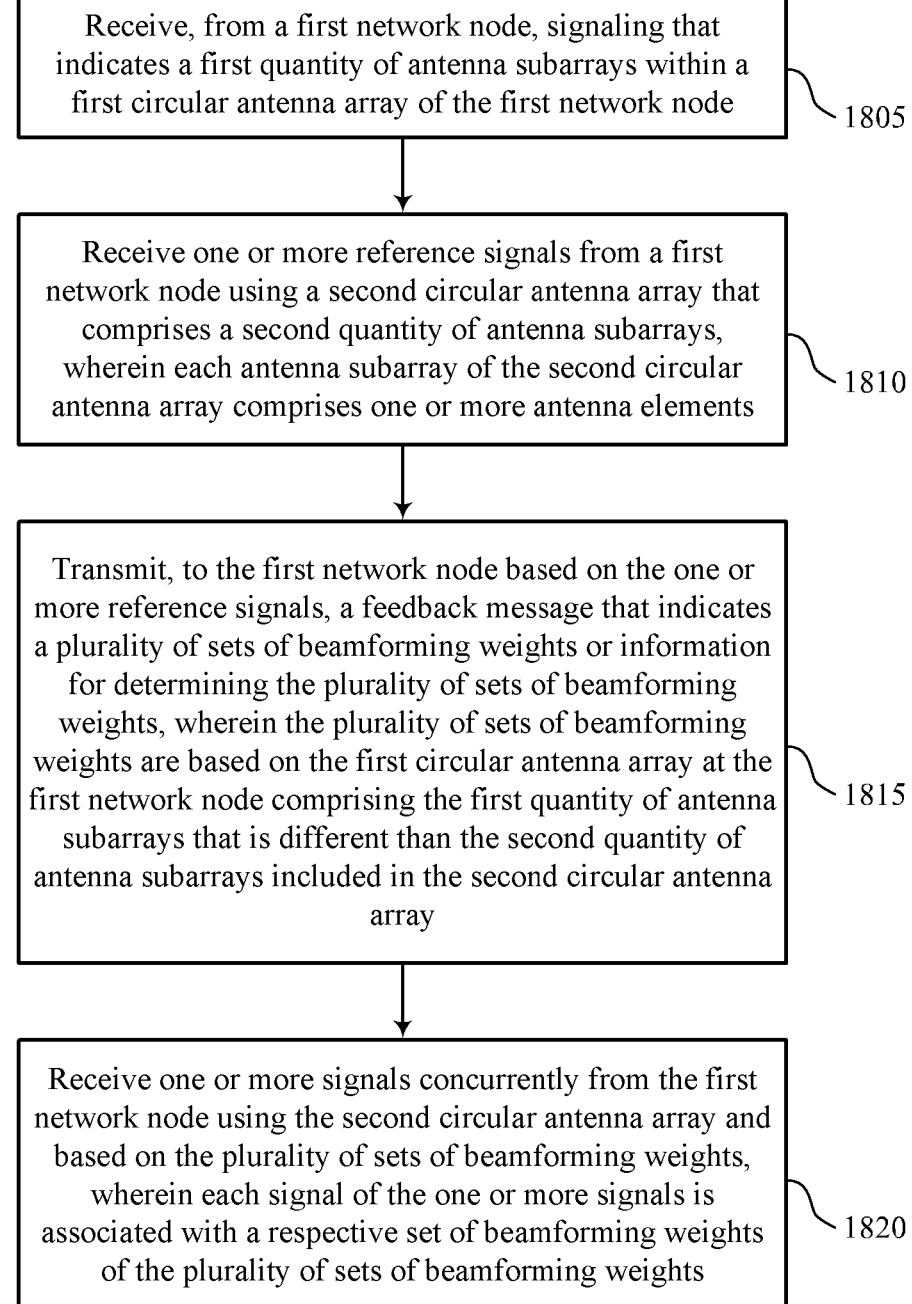

FIG. 18 shows a flowchart illustrating a method 1800 that supports non-integer multiple quantities of transmit and receive antenna subarrays in accordance with aspects of the present disclosure. The operations of the method 1800 may be implemented by a UE or a base station or its components as described herein. For example, the operations of the method 1800 may be performed by a UE 115 or a base station 105 as described with reference to FIGS. 1 through 12. In some aspects, a UE or a base station may execute a set of instructions to control the functional elements of the UE or the base station to perform the described functions. Additionally or alternatively, the UE or the base station may perform aspects of the described functions using special-purpose hardware.

At 1805, the method may include receiving, from a first network node, signaling that indicates a first quantity of antenna subarrays within a first circular antenna array of the first network node. The operations of 1805 may be performed in accordance with aspects as disclosed herein. In some aspects, aspects of the operations of 1805 may be performed by an antenna quantity component 1055 as described with reference to FIG. 10.

At 1810, the method may include receiving one or more reference signals from a first network node using a second circular antenna array that includes a second quantity of antenna subarrays, where each antenna subarray of the second circular antenna array includes one or more antenna elements. The operations of 1810 may be performed in accordance with aspects as disclosed herein. In some aspects, aspects of the operations of 1810 may be performed by a reference signal component 1025 as described with reference to FIG. 10.

At 1815, the method may include transmitting, to the first network node based on the one or more reference signals, a feedback message that indicates multiple sets of beamforming weights or information for determining the multiple sets of beamforming weights, where the multiple sets of beamforming weights are based on the first circular antenna array at the first network node including the first quantity of antenna subarrays that is different than the second quantity of antenna subarrays included in the second circular antenna array. The operations of 1815 may be performed in accordance with aspects as disclosed herein. In some aspects, aspects of the operations of 1815 may be performed by a feedback message component 1030 as described with reference to FIG. 10.

At 1820, the method may include receiving one or more signals concurrently from the first network node using the second circular antenna array and based on the multiple sets of beamforming weights, where each signal of the one or more signals is associated with a respective set of beamforming weights of the multiple sets of beamforming weights. The operations of 1820 may be performed in accordance with aspects as disclosed herein. In some aspects, aspects of the operations of 1820 may be performed by a signal reception component 1040 as described with reference to FIG. 10.

The following provides an overview of aspects of the present disclosure:

Aspect 1: A method for wireless communication at a first network node, comprising: transmitting one or more reference signals to a second network node using a first circular antenna array that comprises a first quantity of antenna subarrays, wherein each antenna subarray of the first circular antenna array comprises one or more antenna elements; receiving, from the second network node based on the one or more reference signals, a feedback message that indicates a plurality of sets of beamforming weights or information for determining the plurality of sets of beamforming weights, wherein the plurality of sets of beamforming weights are based on a second circular antenna array at the second network node comprising a second quantity of antenna subarrays that is different than the first quantity of antenna subarrays included in the first circular antenna array; and transmitting one or more signals concurrently to the second network node using the first circular antenna array and based on the plurality of sets of beamforming weights, wherein each signal of the one or more signals is associated with a respective set of beamforming weights of the plurality of sets of beamforming weights.

Aspect 2: The method of aspect 1, further comprising: determining the plurality of sets of beamforming weights based on the information indicated via the feedback message and the first quantity of antenna subarrays within the first circular antenna array being different than the second quantity of antenna subarrays within the second circular antenna array, wherein the information indicates a plurality of weighting factors for combining sets of OAM weights to form the plurality of sets of beamforming weights, and wherein each set of beamforming weights of the plurality of sets of beamforming weights corresponds to a respective set of OAM weights of the sets of OAM weights.

Aspect 3: The method of aspect 2, wherein determining the plurality of sets of beamforming weights comprises: grouping a second plurality of sets of OAM weights into a plurality of groups based on a least common multiple of the first quantity and the second quantity, wherein the second plurality of sets of OAM weights comprises a first quantity of sets that is equal to the first quantity of antenna subarrays within the first circular antenna array; and combining one or more sets of OAM weights in each group of the plurality of groups based on the plurality of weighting factors to obtain the plurality of sets of beamforming weights, wherein the plurality of sets of beamforming weights comprises a second quantity of sets that is equal to the second quantity of antenna subarrays within the second circular antenna array.

Aspect 4: The method of any of aspects 2 through 3, wherein each weighting factor of the plurality of weighting factors corresponds to a DFT value for a channel response associated with a channel between the first network node and the second network node, the channel response based on the one or more reference signals.

Aspect 5: The method of any of aspects 2 through 4, wherein the plurality of weighting factors comprises weighting factors associated with each combination of a respective first set of OAM weights of a first plurality of sets of OAM weights associated with the first network node and a respective second set of OAM weights of a second plurality of OAM weights associated with the second network node.

Aspect 6: The method of aspect 1, further comprising: determining the plurality of sets of beamforming weights based on the information indicated via the feedback message, wherein the information indicates a channel response matrix associated with a channel between the first network node and the second network node, the channel response matrix based on the one or more reference signals.

Aspect 7: The method of aspect 6, wherein determining the plurality of sets of beamforming weights comprises: calculating a plurality of singular vectors of the channel response matrix, wherein each singular vector of the plurality of singular vectors corresponds to a respective set of beamforming weights of the plurality of sets of beamforming weights.

Aspect 8: The method of aspect 1, wherein the feedback message indicates the plurality of sets of beamforming weights; and each set of beamforming weights of the plurality of sets of beamforming weights corresponds to a singular vector of a channel response matrix associated with a channel between the first network node and the second network node, the channel response matrix based on the one or more reference signals.

Aspect 9: The method of any of aspects 1 through 8, further comprising: transmitting, to the second network node, signaling that indicates the first quantity of antenna subarrays within the first circular antenna array of the first network node.

Aspect 10: The method of any of aspects 1 through 9, further comprising: receiving, from the second network node, signaling that indicates the second quantity of antenna subarrays within the second circular antenna array of the second network node.

Aspect 11: The method of any of aspects 1 through 10, further comprising: adjusting the first quantity of antenna subarrays within the first circular antenna array based on a condition of a channel between the first network node and the second network node, a type of the first network node, a capability of the first network node, power consumption of the first network node, or any combination thereof.

Aspect 12: The method of any of aspects 1 through 11, wherein each antenna subarray of the first quantity of antenna subarrays within the first circular antenna array of the first network node is located at a respective first angular offset relative to a first axis that bisects the first circular antenna array; each antenna subarray of the second quantity of antenna subarrays within the second circular antenna array of the second network node is located at a respective second angular offset relative to a second axis that bisects the second circular antenna array and is parallel to the first axis, each respective second angular offset different than each respective first angular offset; and a difference between the respective first angular offset for a first antenna subarray of the first quantity of antenna subarrays and the respective second angular offset for a second antenna subarray of the second quantity of antenna subarrays is based on the first quantity of antenna subarrays.

Aspect 13: The method of any of aspects 1 through 12, wherein the first quantity of antenna subarrays included in the first circular antenna array is not an integer multiple of the second quantity of antenna subarrays included in the second circular antenna array; and the second quantity of antenna subarrays included in the second circular antenna array is not an integer multiple of the first quantity of antenna subarrays included in the first circular antenna array.

Aspect 14: The method of aspect 13, wherein the first quantity of antenna subarrays included in the first circular antenna array and the second quantity of antenna subarrays included in the second circular antenna array are mutually prime.

Aspect 15: The method of any of aspects 1 through 14, wherein transmitting the one or more signals comprises: applying, for each signal of the one or more signals, the respective set of beamforming weights for the signal to the first quantity of antenna subarrays within the first circular antenna array, wherein a quantity of beamforming weights in each set of the plurality of sets of beamforming weights is equal to the first quantity of antenna subarrays in the first circular antenna array; and transmitting the one or more signals using the first circular antenna array based on applying the respective set of beamforming weights for each signal, wherein the respective set of beamforming weights corresponds to a respective set of OAM weights of a plurality of sets of OAM weights.

Aspect 16: A method for wireless communication at a second network node, comprising: receiving one or more reference signals from a first network node using a second circular antenna array that comprises a second quantity of antenna subarrays, wherein each antenna subarray of the second circular antenna array comprises one or more antenna elements; transmitting, to the first network node based on the one or more reference signals, a feedback message that indicates a plurality of sets of beamforming weights or information for determining the plurality of sets of beamforming weights, wherein the plurality of sets of beamforming weights are based on a first circular antenna array at the first network node comprising a first quantity of antenna subarrays that is different than the second quantity of antenna subarrays included in the second circular antenna array; and receiving one or more signals concurrently from the first network node using the second circular antenna array and based on the plurality of sets of beamforming weights, wherein each signal of the one or more signals is associated with a respective set of beamforming weights of the plurality of sets of beamforming weights.

Aspect 17: The method of aspect 16, further comprising: transmitting the feedback message comprising the information for determining the plurality of sets of beamforming weights, wherein the information indicates a plurality of weighting factors for combining sets of OAM weights to form the plurality of sets of beamforming weights based on the first quantity of antenna subarrays within the first circular antenna array being different than the second quantity of antenna subarrays within the second circular antenna array, and wherein each set of beamforming weights of the plurality of sets of beamforming weights corresponds to a respective set of OAM weights of the sets of OAM weights.

Aspect 18: The method of aspect 17, further comprising: estimating a channel response matrix associated with a channel between the first network node and the second network node based on the one or more reference signals; and calculating a plurality of discrete Fourier transform vectors of the channel response matrix, wherein each weighting factor of the plurality of weighting factors corresponds to a respective discrete Fourier transform vector of the plurality of discrete Fourier transform vectors.

Aspect 19: The method of any of aspects 17 through 18, wherein the plurality of weighting factors comprises weighting factors associated with each combination of a respective first set of OAM weights of a first plurality of sets of OAM weights associated with the first network node and a respective second set of OAM weights of a second plurality of OAM weights associated with the second network node.

Aspect 20: The method of aspect 16, further comprising: estimating a channel response matrix associated with a channel between the first network node and the second network node based on the one or more reference signals; and transmitting the feedback message comprising the information for determining the plurality of sets of beamforming weights, wherein the information comprises an indication of the channel response matrix.

Aspect 21: The method of aspect 20, wherein each set of beamforming weights of the plurality of sets of beamforming weights corresponds to a respective singular vector of a plurality of singular vectors of the channel response matrix.

Aspect 22: The method of aspect 16, further comprising: estimating a channel response matrix associated with a channel between the first network node and the second network node based on the one or more reference signals; calculating a plurality of singular vectors of the channel response matrix, wherein each singular vector of the plurality of singular vectors corresponds to a respective set of beamforming weights of the plurality of sets of beamforming weights; and transmitting the feedback message that indicates the plurality of sets of beamforming weights based on calculating the plurality of singular vectors.

Aspect 23: The method of any of aspects 16 through 22, further comprising: receiving, from the first network node, signaling that indicates the first quantity of antenna subarrays within the first circular antenna array of the first network node.

Aspect 24: The method of any of aspects 16 through 23, further comprising: transmitting, to the first network node, signaling that indicates the second quantity of antenna subarrays within the second circular antenna array of the second network node.

Aspect 25: The method of any of aspects 16 through 24, further comprising: adjusting the second quantity of antenna subarrays within the second circular antenna array based on a condition of a channel between the first network node and the second network node, a type of the second network node, a capability of the second network node, power consumption of the second network node, or any combination thereof.

Aspect 26: The method of any of aspects 16 through 25, wherein each antenna subarray of the first quantity of antenna subarrays within the first circular antenna array of the first network node is located at a respective first angular offset relative to a first axis that bisects the first circular antenna array; each antenna subarray of the second quantity of antenna subarrays within the second circular antenna array of the second network node is located at a respective second angular offset relative to a second axis that bisects the second circular antenna array and is parallel to the first axis, each respective second angular offset different than each respective first angular offset; and a difference between the respective first angular offset for a first antenna subarray of the first quantity of antenna subarrays and the respective second angular offset for a second antenna subarray of the second quantity of antenna subarrays is based on the first quantity of antenna subarrays.

Aspect 27: An apparatus for wireless communication at a first network node, comprising a memory; a first circular antenna array comprising a first quantity of antenna subarrays, wherein each antenna subarray of the first circular antenna array comprises one or more antenna elements; and at least one processor coupled to the memory, wherein the at least one processor is configured to cause the first network node to perform a method of any of aspects 1 through 15.

Aspect 28: An apparatus for wireless communication at a first network node, comprising at least one means for performing a method of any of aspects 1 through 15.

Aspect 29: A non-transitory computer-readable medium storing code for wireless communication at a first network node, the code comprising instructions executable by a processor to perform a method of any of aspects 1 through 15.

Aspect 30: An apparatus for wireless communication at a second network node, comprising a memory; a second circular antenna array comprising a second quantity of antenna subarrays, wherein each antenna subarray of the second circular antenna array comprises one or more antenna elements; and at least one processor coupled to the memory, wherein the at least one processor is configured to cause the second network node to perform a method of any of aspects 16 through 26.

Aspect 31: An apparatus for wireless communication at a second network node, comprising at least one means for performing a method of any of aspects 16 through 26.

Aspect 32: A non-transitory computer-readable medium storing code for wireless communication at a second network node, the code comprising instructions executable by a processor to perform a method of any of aspects 16 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other aspects and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As described herein, a node, which may be referred to as a node, a network node, a network entity, or a wireless node, may be a base station (e.g., any base station described herein), a UE (e.g., any UE described herein), a network controller, an apparatus, a device, a computing system, one or more components, and/or another suitable processing entity configured to perform any of the techniques described herein. For example, a network node may be a UE. As another example, a network node may be a base station. As another example, a network node may be an IAB node, a DU, a CU, an RU, or any component of a base station. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these aspects. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE being configured to receive information from a base station also discloses that a first network node being configured to receive information from a second network node, the first network node may refer to a first UE, a first base station, a first apparatus, a first device, a first computing system, a first one or more components, a first processing entity, or the like configured to receive the information; and the second network node may refer to a second UE, a second base station, a second apparatus, a second device, a second computing system, a first one or more components, a first processing entity, or the like. A network node may be any system, device, or apparatus described herein.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, signal, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, signaled, or transmitted by the first network node.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of information, one or more conditions, one or more factors, or the like. For example, the phrase "based on A" (where "A" may be information, a condition, a factor, or the like) may be interpreted as: "based at least on A." In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database, or another data structure), ascertaining, and the like. Also, "determining" can include receiving (such as receiving information), accessing (such as accessing data in a memory) and the like. Also, "determining" can include resolving, selecting, choosing, establishing and other such similar actions.

In the figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the aspects that may be implemented or that are within the scope of the claims. The terms "example" or "aspect" used herein means "serving as an example, instance, or illustration," and not "preferred" or "advantageous over other examples or aspects." The detailed description includes specific details for the purpose of providing an understanding of the described techniques. These techniques, however, may be practiced without these specific details.

The description herein enables a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the aspects and designs described herein but is to be accorded the broadest scope consistent with the principles and novel features disclosed herein.

What is claimed is:

1. A first network node for wireless communication, comprising:
   a memory;
   a first circular antenna array comprising a first quantity of antenna subarrays, wherein each antenna subarray of the first circular antenna array comprises one or more antenna elements; and
   at least one processor coupled to the memory, wherein the at least one processor is configured to cause the first network node to:
      transmit one or more reference signals to a second network node using the first circular antenna array;
      receive, from the second network node based on the one or more reference signals, a feedback message that indicates a plurality of sets of beamforming weights or information for determining the plurality of sets of beamforming weights, wherein the plurality of sets of beamforming weights are based on a second circular antenna array at the second network node comprising a second quantity of antenna subarrays that is different than the first quantity of antenna subarrays included in the first circular antenna array; and
      transmit one or more signals concurrently to the second network node using the first circular antenna array and based on the plurality of sets of beamforming weights, wherein each signal of the one or more signals is associated with a respective set of beamforming weights of the plurality of sets of beamforming weights.

2. The first network node of claim 1, wherein the at least one processor is configured to cause the first network node to:
   determine the plurality of sets of beamforming weights based on the information indicated via the feedback message and the first quantity of antenna subarrays within the first circular antenna array being different than the second quantity of antenna subarrays within the second circular antenna array, wherein the information indicates a plurality of weighting factors for combining sets of orbital angular momentum weights to form the plurality of sets of beamforming weights, and wherein each set of beamforming weights of the plurality of sets of beamforming weights corresponds to a respective set of orbital angular momentum weights of the sets of orbital angular momentum weights.

3. The first network node of claim 2, wherein, to determine the plurality of sets of beamforming weights, the at least one processor is configured to cause the first network node to:

group a second plurality of sets of orbital angular momentum weights into a plurality of groups based on a least common multiple of the first quantity and the second quantity, wherein the second plurality of sets of orbital angular momentum weights comprises a first quantity of sets that is equal to the first quantity of antenna subarrays within the first circular antenna array; and combine one or more sets of orbital angular momentum weights in each group of the plurality of groups based on the plurality of weighting factors to obtain the plurality of sets of beamforming weights, wherein the plurality of sets of beamforming weights comprises a second quantity of sets that is equal to the second quantity of antenna subarrays within the second circular antenna array.

4. The first network node of claim 2, wherein each weighting factor of the plurality of weighting factors corresponds to a discrete Fourier transform value for a channel response associated with a channel between the first network node and the second network node, the channel response based on the one or more reference signals.

5. The first network node of claim 2, wherein the plurality of weighting factors comprises weighting factors associated with each combination of a respective first set of orbital angular momentum weights of a first plurality of sets of orbital angular momentum weights associated with the first network node and a respective second set of orbital angular momentum weights of a second plurality of orbital angular momentum weights associated with the second network node.

6. The first network node of claim 1, wherein the at least one processor is configured to cause the first network node to:

determine the plurality of sets of beamforming weights based on the information indicated via the feedback message, wherein the information indicates a channel response matrix associated with a channel between the first network node and the second network node, the channel response matrix based on the one or more reference signals.

7. The first network node of claim 6, wherein, to determine the plurality of sets of beamforming weights, the at least one processor is configured to cause the first network node to:

calculate a plurality of singular vectors of the channel response matrix, wherein each singular vector of the plurality of singular vectors corresponds to a respective set of beamforming weights of the plurality of sets of beamforming weights.

8. The first network node of claim 1, wherein:

the feedback message indicates the plurality of sets of beamforming weights; and each set of beamforming weights of the plurality of sets of beamforming weights corresponds to a singular vector of a channel response matrix associated with a channel between the first network node and the second network node, the channel response matrix based on the one or more reference signals.

9. The first network node of claim 1, wherein the at least one processor is configured to cause the first network node to:

transmit, to the second network node, signaling that indicates the first quantity of antenna subarrays within the first circular antenna array of the first network node.

10. The first network node of claim 1, wherein the at least one processor is configured to cause the first network node to:

receive, from the second network node, signaling that indicates the second quantity of antenna subarrays within the second circular antenna array of the second network node.

11. The first network node of claim 1, wherein the at least one processor is configured to cause the first network node to:

adjust the first quantity of antenna subarrays within the first circular antenna array based on a condition of a channel between the first network node and the second network node, a type of the first network node, a capability of the first network node, power consumption of the first network node, or any combination thereof.

12. The first network node of claim 1, wherein:

each antenna subarray of the first quantity of antenna subarrays within the first circular antenna array of the first network node is located at a respective first angular offset relative to a first axis that bisects the first circular antenna array;

each antenna subarray of the second quantity of antenna subarrays within the second circular antenna array of the second network node is located at a respective second angular offset relative to a second axis that bisects the second circular antenna array and is parallel to the first axis, each respective second angular offset different than each respective first angular offset; and a difference between the respective first angular offset for a first antenna subarray of the first quantity of antenna subarrays and the respective second angular offset for a second antenna subarray of the second quantity of antenna subarrays is based on the first quantity of antenna subarrays.

13. The first network node of claim 1, wherein:

the first quantity of antenna subarrays included in the first circular antenna array is not an integer multiple of the second quantity of antenna subarrays included in the second circular antenna array; and the second quantity of antenna subarrays included in the second circular antenna array is not an integer multiple of the first quantity of antenna subarrays included in the first circular antenna array.

14. The first network node of claim 13, wherein the first quantity of antenna subarrays included in the first circular antenna array and the second quantity of antenna subarrays included in the second circular antenna array are mutually prime.

15. The first network node of claim 1, wherein, to transmit the one or more signals, the at least one processor is configured to cause the first network node to:

apply, for each signal of the one or more signals, the respective set of beamforming weights for the signal to the first quantity of antenna subarrays within the first circular antenna array, wherein a quantity of beamforming weights in each set of the plurality of sets of beamforming weights is equal to the first quantity of antenna subarrays in the first circular antenna array; and transmitting the one or more signals using the first circular antenna array based on applying the respective set of beamforming weights for each signal, wherein the respective set of beamforming weights corresponds to a respective set of orbital angular momentum weights of a plurality of sets of orbital angular momentum weights.

16. A second network node for wireless communication, comprising:

a memory;

a second circular antenna array comprising a second quantity of antenna subarrays, wherein each antenna subarray of the second circular antenna array comprises one or more antenna elements; and at least one processor coupled to the memory, wherein the at least one processor is configured to cause the second network node to:

receive one or more reference signals from a first network node using the second circular antenna array;

transmit, to the first network node based on the one or more reference signals, a feedback message that indicates a plurality of sets of beamforming weights or information for determining the plurality of sets of beamforming weights, wherein the plurality of sets of beamforming weights are based on a first circular antenna array at the first network node comprising a first quantity of antenna subarrays that is different than the second quantity of antenna subarrays included in the second circular antenna array; and receive one or more signals concurrently from the first network node using the second circular antenna array and based on the plurality of sets of beamforming weights, wherein each signal of the one or more signals is associated with a respective set of beamforming weights of the plurality of sets of beamforming weights.

17. The second network node of claim 16, wherein the at least one processor is configured to cause the second network node to:

transmit the feedback message comprising the information for determining the plurality of sets of beamforming weights, wherein the information indicates a plurality of weighting factors for combining sets of orbital angular momentum weights to form the plurality of sets of beamforming weights based on the first quantity of antenna subarrays within the first circular antenna array being different than the second quantity of antenna subarrays within the second circular antenna array, and wherein each set of beamforming weights of the plurality of sets of beamforming weights corresponds to a respective set of orbital angular momentum weights of the sets of orbital angular momentum weights.

18. The second network node of claim 17, wherein the at least one processor is configured to cause the second network node to:

estimate a channel response associated with a channel between the first network node and the second network node based on the one or more reference signals; and calculate a plurality of discrete Fourier transform values for the channel response, wherein each weighting factor of the plurality of weighting factors corresponds to a respective discrete Fourier transform value of the plurality of discrete Fourier transform values.

19. The second network node of claim 17, wherein the plurality of weighting factors comprises weighting factors associated with each combination of a respective first set of orbital angular momentum weights of a first plurality of sets of orbital angular momentum weights associated with the first network node and a respective second set of orbital angular momentum weights of a second plurality of orbital angular momentum weights associated with the second network node.

20. The second network node of claim 16, wherein the at least one processor is configured to cause the second network node to:

estimate a channel response matrix associated with a channel between the first network node and the second network node based on the one or more reference signals; and transmit the feedback message comprising the information for determining the plurality of sets of beamforming weights, wherein the information comprises an indication of the channel response matrix.

21. The second network node of claim 20, wherein each set of beamforming weights of the plurality of sets of beamforming weights corresponds to a respective singular vector of a plurality of singular vectors of the channel response matrix.

22. The second network node of claim 16, wherein the at least one processor is configured to cause the second network node to:

estimate a channel response matrix associated with a channel between the first network node and the second network node based on the one or more reference signals;

calculate a plurality of singular vectors of the channel response matrix, wherein each singular vector of the plurality of singular vectors corresponds to a respective set of beamforming weights of the plurality of sets of beamforming weights; and transmit the feedback message that indicates the plurality of sets of beamforming weights based on calculating the plurality of singular vectors.

23. The second network node of claim 16, wherein the at least one processor is configured to cause the second network node to:

receive, from the first network node, signaling that indicates the first quantity of antenna subarrays within the first circular antenna array of the first network node.

24. The second network node of claim 16, wherein the at least one processor is configured to cause the second network node to:

transmit, to the first network node, signaling that indicates the second quantity of antenna subarrays within the second circular antenna array of the second network node.

25. The second network node of claim 16, wherein the at least one processor is configured to cause the second network node to:

adjust the second quantity of antenna subarrays within the second circular antenna array based on a condition of a channel between the first network node and the second network node, a type of the second network node, a capability of the second network node, power consumption of the second network node, or any combination thereof.

26. The second network node of claim 16, wherein:

each antenna subarray of the first quantity of antenna subarrays within the first circular antenna array of the first network node is located at a respective first angular offset relative to a first axis that bisects the first circular antenna array;

each antenna subarray of the second quantity of antenna subarrays within the second circular antenna array of the second network node is located at a respective second angular offset relative to a second axis that bisects the second circular antenna array and is parallel to the first axis, each respective second angular offset different than each respective first angular offset; and a difference between the respective first angular offset for a first antenna subarray of the first quantity of antenna subarrays and the respective second angular offset for a second antenna subarray of the second quantity of antenna subarrays is based on the first quantity of antenna subarrays.

27. A method for wireless communication at a first network node, comprising:

transmitting one or more reference signals to a second network node using a first circular antenna array that comprises a first quantity of antenna subarrays, wherein each antenna subarray of the first circular antenna array comprises one or more antenna elements;

receiving, from the second network node based on the one or more reference signals, a feedback message that indicates a plurality of sets of beamforming weights or information for determining the plurality of sets of beamforming weights, wherein the plurality of sets of beamforming weights are based on a second circular antenna array at the second network node comprising a second quantity of antenna subarrays that is different than the first quantity of antenna subarrays included in the first circular antenna array; and transmitting one or more signals concurrently to the second network node using the first circular antenna array and based on the plurality of sets of beamforming weights, wherein each signal of the one or more signals is associated with a respective set of beamforming weights of the plurality of sets of beamforming weights.

28. The method of claim 27, further comprising:

determining the plurality of sets of beamforming weights based on the information indicated via the feedback message and the first quantity of antenna subarrays within the first circular antenna array being different than the second quantity of antenna subarrays within the second circular antenna array, wherein the information indicates a plurality of weighting factors for combining sets of orbital angular momentum weights to form the plurality of sets of beamforming weights, and wherein each set of beamforming weights of the plurality of sets of beamforming weights corresponds to a respective set of orbital angular momentum weights of the sets of orbital angular momentum weights.

29. A method for wireless communication at a second network node, comprising:

receiving one or more reference signals from a first network node using a second circular antenna array that comprises a second quantity of antenna subarrays, wherein each antenna subarray of the second circular antenna array comprises one or more antenna elements;

transmitting, to the first network node based on the one or more reference signals, a feedback message that indicates a plurality of sets of beamforming weights or information for determining the plurality of sets of beamforming weights, wherein the plurality of sets of beamforming weights are based on a first circular antenna array at the first network node comprising a first quantity of antenna subarrays that is different than the second quantity of antenna subarrays included in the second circular antenna array; and receiving one or more signals concurrently from the first network node using the second circular antenna array and based on the plurality of sets of beamforming weights, wherein each signal of the one or more signals is associated with a respective set of beamforming weights of the plurality of sets of beamforming weights.

30. The method of claim 29, further comprising:

transmitting the feedback message comprising the information for determining the plurality of sets of beamforming weights, wherein the information indicates a plurality of weighting factors for combining sets of orbital angular momentum weights to form a plurality of sets of beamforming weights based on the first quantity of antenna subarrays within the first circular antenna array being different than the second quantity of antenna subarrays within the second circular antenna array, and wherein each set of beamforming weights of the plurality of sets of beamforming weights corresponds to a respective set of orbital angular momentum weights of the sets of orbital angular momentum weights.

* * * * *